(12) United States Patent
Jing et al.

(10) Patent No.: US 12,734,601 B2
(45) Date of Patent: Sep. 15, 2026

(54) WIRE BONDING SYSTEMS, WIRE REPLACEMENT SYSTEMS, AND RELATED METHODS

(71) Applicant: KULICKE AND SOFFA INDUSTRIES, INC., Fort Washington, PA (US)

(72) Inventors: Wei Jing, Singapore (SG); Kumar Manoj Venna, Singapore (SG); Jianxu Ma, Singapore (SG); Kay Soon Goh, Singapore (SG); Wei Su, Singapore (SG); Dong Zhang, Singapore (SG); Jesse S. Parish, North Wales, PA (US)

(73) Assignee: Kulicke and Soffa Industries, Inc., Fort Washington, PA (US)

( * ) Notice: Subject to any disclaimer, the term of this patent is extended or adjusted under 35 U.S.C. 154(b) by 0 days.

(21) Appl. No.: 18/947,209

(22) Filed: Nov. 14, 2024

(65) Prior Publication Data

US 2025/0162060 A1 May 22, 2025

Related U.S. Application Data

(60) Provisional application No. 63/601,299, filed on Nov. 21, 2023.

(51) Int. Cl.
*B23K 20/00* (2006.01)
*B23K 101/32* (2006.01)

(52) U.S. Cl.
CPC ........ *B23K 20/004* (2013.01); *B23K 2101/32* (2018.08)

(58) Field of Classification Search
CPC ........... H01L 2224/78301; H01L 24/78; H01L 2224/85205; H01L 2224/48;
(Continued)

(56) References Cited

U.S. PATENT DOCUMENTS 3,542,277 A * 11/1970 Wendell .................. H01L 24/78 228/55
3,672,556 A * 6/1972 Diepeveen .......... H10P 72/0444 228/49.5

(Continued)

FOREIGN PATENT DOCUMENTS

CN 116197328 A 6/2023
EP 3651187 A 5/2018

(Continued)

OTHER PUBLICATIONS

Computer English translation of Jindo et al. (KR2017-0093101A) (Year: 2017).*

(Continued)

*Primary Examiner* — Erin B Saad
(74) *Attorney, Agent, or Firm* — Christopher M. Spletzer, Sr.

(57) ABSTRACT

A wire bonding system is provided. The wire bonding system includes a bond head assembly configured to carry a wire bonding tool; and a wire replacement system configured to (i) remove a wire portion engaged with the wire bonding tool, the wire portion being part of a wire supply on the wire bonding system, and (ii) to replace the wire portion to be engaged with the wire bonding tool.

20 Claims, 44 Drawing Sheets

(58) Field of Classification Search
CPC ........ H01L 21/67138; H01L 2224/789; B23K 20/004; B23K 20/005; B23K 20/007; B23K 3/063
See application file for complete search history.

(56) References Cited

U.S. PATENT DOCUMENTS

| | | | | |
|---|---|---|---|---|
| 4,550,871 | A * | 11/1985 | Chan .................. | H01R 43/0207 228/180.5 |
| 4,903,883 | A | 2/1990 | Thurlemann et al. | |
| 5,031,821 | A * | 7/1991 | Kaneda ................ | B23K 20/007 228/180.5 |
| 5,699,951 | A * | 12/1997 | Miyoshi ............... | B23K 20/004 228/55 |
| 8,672,210 | B2 * | 3/2014 | Kim ........................ | H01L 24/78 228/180.5 |
| 11,239,197 | B2 | 2/2022 | Song et al. | |
| 11,717,912 | B2 | 8/2023 | Uchida | |
| 2003/0085256 | A1 * | 5/2003 | Senba ..................... | H01L 24/48 228/112.1 |
| 2006/0219754 | A1 * | 10/2006 | Clauberg ............... | B23K 20/24 228/8 |
| 2009/0091006 | A1 * | 4/2009 | Pirkle ..................... | H01L 24/92 228/1.1 |
| 2015/0243627 | A1 * | 8/2015 | Akiyama ................ | H01L 24/85 228/102 |
| 2016/0358883 | A1 | 12/2016 | Yoshino et al. | |
| 2018/0294245 | A1 * | 10/2018 | Kim ......................... | B23K 3/02 |
| 2022/0187353 | A1 | 6/2022 | DeAngelis et al. | |
| 2022/0270937 | A1 | 8/2022 | Gillotti et al. | |
| 2025/0174837 | A1 * | 5/2025 | Frey .................... | H01M 50/516 |

FOREIGN PATENT DOCUMENTS

| | | |
|---|---|---|
| JP | 2016127174 | 7/2016 |
| KR | 10-2000-0055554 A | 9/2000 |
| KR | 20080050978 | 6/2008 |
| KR | 20200126447 | 11/2020 |
| TW | I735183 | 8/2021 |
| WO | 2019-008803 A | 1/2019 |

OTHER PUBLICATIONS

Computer English translation of Kanasaki et al. (JP2008-141025A) (Year: 2008).*

International Search Report for PCT application No. PCT/US2024/055856 completed Mar. 6, 2025.

* cited by examiner

X
Z
114
114b
110
114a
110
110
110
120'

WIRE BONDING SYSTEMS, WIRE REPLACEMENT SYSTEMS, AND RELATED METHODS

CROSS-REFERENCE TO RELATED APPLICATION

This application claims the benefit of U.S. Provisional Application No. 63/601,299 filed on Nov. 21, 2023, the content of which is incorporated herein by reference.

FIELD

The invention relates to wire bonding systems, and in particular, to wire bonding systems including wire replacement systems and/or wire bonding tool replacement systems.

BACKGROUND

In the processing and packaging of semiconductor devices, wire bonding continues to be the primary method of providing electrical interconnection between two locations within a package (e.g., between a die pad of a semiconductor die and a lead of a leadframe). More specifically, using a wire bonder (also known as a wire bonding system) wire loops are formed between respective locations to be electrically interconnected. The primary methods of forming wire loops are ball bonding and wedge bonding. In forming the bonds between (a) the ends of the wire loop and (b) the bond site (e.g., a die pad, a lead, etc.) varying types of bonding energy may be used, including, for example, ultrasonic energy, thermosonic energy, thermocompressive energy, amongst others. Wire bonding systems (e.g., stud bumping machines) are also used to form conductive bumps from portions of wire.

Replacement of a portion of wire on a wire bonding system, and/or replacements of a wire bonding tool on a wire bonding system, often results in significant delays or machine downtime. Thus, it would be desirable to provide improved wire bonding systems for addressing such concerns.

SUMMARY

According to an exemplary embodiment of the invention, a wire bonding system is provided. The wire bonding system includes a bond head assembly configured to carry a wire bonding tool. The wire bonding system also includes a wire replacement system configured to (i) remove a wire portion engaged with the wire bonding tool, the wire portion being part of a wire supply on the wire bonding system, and (ii) replace the wire portion to be engaged with the wire bonding tool.

According to another exemplary embodiment of the invention, a wire replacement system for replacing a wire portion on a wire bonding system is provided. The wire replacement system includes a clamping mechanism configured to clamp the wire portion, the clamping mechanism including a threading portion for threading the wire portion through a wire bonding tool of the wire bonding system.

According to other embodiments of the invention, the wire bonding system and/or the wire replacement system recited in the two immediately preceding paragraphs may have any one or more of the following features: the wire replacement system includes a clamping mechanism configured to clamp wire; the clamping mechanism includes (i) a fixed clamp portion and (ii) a moving clamp portion disposed adjacent the fixed clamp portion, the moving clamp portion being configured to move with respect to the fixed clamp portion in at least one direction; the clamping mechanism includes a spring configured to actuate the moving clamp portion with respect to the fixed clamp portion; a movable arm assembly configured to move the clamping mechanism; the clamping mechanism is carried by a moveable arm assembly; the clamping mechanism includes a threading portion for threading wire; the clamping mechanism includes a gripping portion for gripping wire, a cutting portion for partially cutting wire, and a threading portion for threading wire; the clamping mechanism includes a tool clamping portion for clamping the wire bonding tool; the wire replacement system is configured to remove the wire bonding tool from the bond head assembly; a wire bonding tool source configured to provide a plurality of wire bonding tools, the wire replacement system being configured to replace the wire bonding tool at the bond head assembly with one of the plurality of wire bonding tools from the wire bonding tool source; the wire replacement system is configured to replace the wire portion by re-engaging the wire portion with the wire bonding tool; the wire replacement system is configured to replace the wire portion by engaging another wire portion with the wire bonding tool; a receptacle for receiving the wire portion after it is removed by the wire replacement system; the clamping mechanism includes an image registration feature, the image registration feature providing a reference for determining a position of the clamping mechanism; a vision system configured to determine the position of the clamping mechanism by collecting an image of the image registration feature; an optical path between the vision system and the image registration feature includes a reflective optical element; and an optical path between the vision system and the image registration feature includes a refractive optical element.

According to another exemplary embodiment of the invention, a method of replacing a wire portion on a wire bonding system is provided. The method includes the steps of: (a) providing a bond head assembly configured to carry a wire bonding tool, the wire portion being engaged with the wire bonding tool, the wire portion be part of a wire supply on the wire bonding system; (b) removing the wire portion from the wire bonding tool with a wire replacement system; and (c) replacing the wire portion to the wire bonding tool using the wire replacement system.

According to other embodiments of the invention, the method recited in the immediately preceding paragraph may have any one or more of the following features: the wire replacement system includes a clamping mechanism configured to clamp wire; the clamping mechanism includes (i) a fixed clamp portion and (ii) a moving clamp portion disposed adjacent the fixed clamp portion, the moving clamp portion being configured to move with respect to the fixed clamp portion in at least one direction; the clamping mechanism includes a spring configured to actuate the moving clamp portion with respect to the fixed clamp portion; the clamping mechanism is carried by a moveable arm assembly; the clamping mechanism includes a gripping portion for gripping wire, a cutting portion for partially cutting wire, and a threading portion for threading wire; the clamping mechanism includes a tool clamping portion for clamping the wire bonding tool; the wire replacement system is configured to remove the wire bonding tool from the bond head assembly; the wire replacement system includes a wire bonding tool source configured to provide a plurality of wire bonding tools, the wire replacement system being configured to replace the wire bonding tool at the bond head assembly with one of the plurality of wire bonding tools from the wire bonding tool source; the wire replacement system includes a receptacle for receiving the wire portion after it is removed in step (b); step (b) includes a substep (b1) partially cutting the wire supply with a clamping mechanism of the wire replacement system to create an incision, the incision defining an end of the wire portion to be replaced on the wire bonding system, the incision being formed at a location on the wire bonding system between a wire clamp and the wire bonding tool; step (b) includes, after substep (b1), a substep (b2) pulling the wire portion to move a position of the incision closer to the wire bonding tool; step (b) includes, after substep (b2), a substep (b3) breaking the wire portion from the wire supply at the incision by pulling the wire with the clamping mechanism while the wire clamp is closed; a cutting portion of the clamping mechanism is used in connection with substep (b1); removing the wire bonding tool and providing another wire bonding tool to the bond head assembly with the wire replacement system between steps (b) and (c); step (c) includes a wire threading process; step (c) includes threading another wire portion through one of the wire bonding tool and another wire bonding tool in connection with the wire threading process; step (c) includes threading the wire portion through one of the wire bonding tool and another wire bonding tool in connection with the wire threading process; the wire threading process includes using a threading portion of a clamping mechanism of the wire replacement system; the wire threading process includes the steps of pulling an end portion of the wire supply, with a clamping mechanism, through the wire bonding tool; the clamping mechanism pulls the end portion of the wire supply through the wire bonding tool using multiple motions of the clamping mechanism; the wire threading process includes substeps (i) gripping the end portion of the wire supply with the clamping mechanism; (ii) opening a wire clamp, (iii) moving the clamping mechanism such that the end portion of the wire supply is moved downward, and (iv) closing the wire clamp; each of substeps (i)-(iv) is repeated until the end portion of the wire supply is pulled through the wire bonding tool; and each of substeps (i)-(iv) is repeated until the end portion of the wire supply is pulled through the wire bonding tool, and a wire tail having a predetermined length has been formed below the wire bonding tool.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION

Figure 1A:
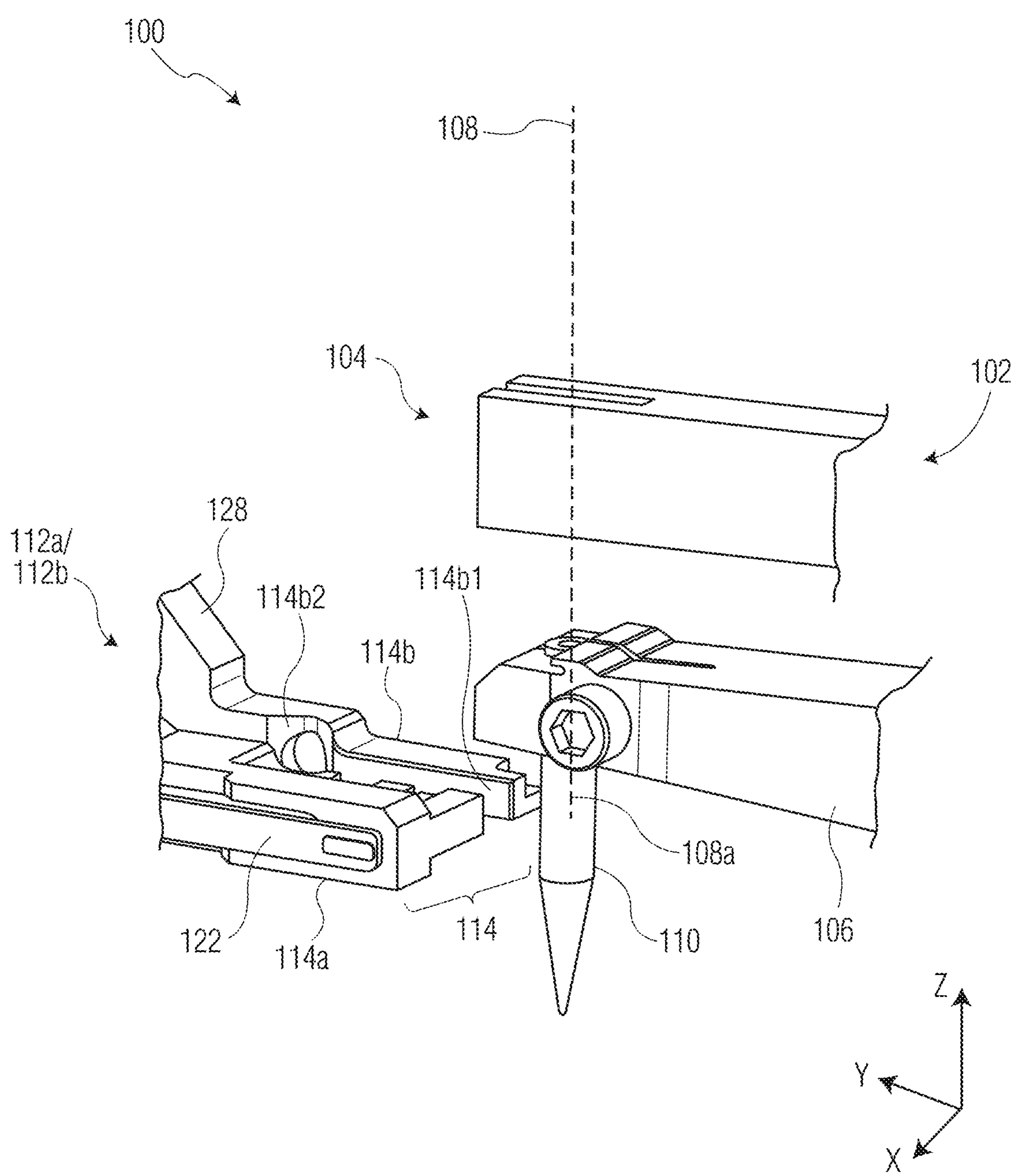
FIGS. 1A-1F are various perspective views of portions of a wire bonding system in accordance with an exemplary embodiment of the invention.

Various wire bonding systems (and components thereof) and related methods are provided herein. In certain embodiments, a wire bonding system includes a wire bonding tool replacement system. In certain embodiments, the wire bonding tool replacement system can be configured to automatically replace a wire bonding tool (e.g., a capillary). The wire bonding tool replacement system can be configured to: accurately position a clamping mechanism (e.g., a "gripper") to clamp the wire bonding tool on a bonding system (e.g., a bonding machine, a "bonder", etc.); loosen a screw (e.g., a "cap screw" or other tightening mechanism) with a robotic wrench; and/or remove a used wire bonding tool from a transducer (e.g., an ultrasonic transducer) of a wire bonding system. In certain embodiments, the wire bonding tool replacement system can be configured to: pick up a new wire bonding tool from a wire bonding tool source (e.g., a capillary supply); insert the new wire bonding tool into a wire bonding tool hole of a transducer; and/or tighten (e.g., automatically tighten) the screw prior to subsequent wire bonding operations. In certain embodiments, the wire bonding tool replacement system can be configured to provide real-time communication with a bonding system (e.g., a computer of a bonding system) in connection with: positioning a clamping mechanism with a target wire bonding tool; positioning a wire bonding tool; and/or positioning a wrench (e.g., in connection with a servo and/or robotic wrench arm assembly). In certain embodiments, the wire bonding tool replacement system can be configured to provide feedback control in connection with robotic positioning. In certain embodiments, open/short circuit detection can be used in connection with wire bonding tool replacement (e.g., wire bonding tool removal, wire bonding tool pick-up, wire bonding tool insertion, screw tightening/loosening, etc.).

Certain embodiments of the invention provide certain advantages, such as automatically replacing wire bonding tools, thereby reducing labor hours (e.g., manual labor hours).

Certain embodiments of the invention provide a wire bonding system including a wire replacement system configured to (i) remove a wire portion engaged with the wire bonding tool and (ii) to replace the wire portion (e.g., replace with the same wire portion, replace with another wire portion). Certain embodiments provide automatic wire threading with a robotic mechanism (e.g., during wire bonding tool changing operations in wire bonding systems).

Certain embodiments include: performing a partial cut (e.g., a "half-cut incision") in a wire (e.g., at a location between wire clamp and transducer) using a cutter mechanism (e.g., a blade, a cutting portion of a clamping mechanism, etc.); moving a clamping mechanism (e.g., a gripper) beneath a wire bonding tool; pulling down the wire to position the partial cut/incision at/near the middle of an inner hole of the wire bonding tool; closing a wire clamp of a bond head assembly and the clamping mechanism; pulling down on the wire with the clamping mechanism such that the wire breaks at the partial cut/incision; completing the wire threading process after removing the wire bonding tool; and/or inserting another (e.g., new) wire bonding tool. Other embodiments include: removing a wire portion engaged with the wire bonding tool, and replacing the wire portion (e.g., after replacement of the wire bonding tool) with the same wire portion without cutting and/or breaking the wire portion.

Certain embodiments of the invention provide certain advantages, such as automatically completing wire threading (e.g., in connection with wire bonding tool replacement), thereby reducing labor hours (e.g., manual labor hours). Other advantages include breaking the wire consistently to secure a wire tail position just beneath a transducer surface inside a hole of the wire bonding tool. Certain methods do not require an additional mechanism to fix the wire positioning against the hole of the wire bonding tool, but may provide high success rates nevertheless (e.g., due in part from a highly reliable alignment calibration from a wire bonding system set up).

Referring now to the drawings, a wire bonding system 100 is illustrated in FIG. 1A. Wire bonding system 100 includes a bond head assembly 102 (illustrated in part) configured to carry a wire bonding tool 110. Bond head assembly 102 is illustrated including a wire clamp 104 and a transducer 106. Wire clamp 104 is configured to switch between (i) allowing a wire supply 108 to pass freely, and (ii) gripping wire supply 108 to prevent relative motion between wire supply 108 and bond head assembly 102. The invention is not limited to any particular operation of wire clamp 104 (e.g., wire clamp 104 may move one portion relative to another to grip wire supply 108, wire clamp 104 may move multiple portions relative to one another to grip wire supply 108, etc.). Wire supply 108 is illustrated disposed through both wire clamp 104 (e.g., in a closed configuration) and transducer 106. Wire supply 108 may be continuous with a wire source (e.g., a wire spool of the wire bonding system). A wire portion 108*a* of wire supply 108 is illustrated disposed through wire bonding tool 110.

Wire bonding system 100 also includes a wire bonding tool replacement system 112*a* (illustrated in part). It should be understood that wire bonding tool replacement system 112*a* shares many of the same elements and aspects as a wire replacement system 112*b* and/or a wire replacement system 112*b*' described elsewhere herein (e.g., FIGS. 4A-4D, FIGS. 5A-5H, FIGS. 6A-6E, FIGS. 7A-7F, etc.) in connection with wire bonding systems 300 and 600. For example, both wire bonding tool replacement system 112*a* and wire replacement system 112*b* include a clamping mechanism 114.

Wire bonding tool replacement system 112*a* is configured to replace wire bonding tool 110 with another wire bonding tool (e.g., another wire bonding tool 110, or a different type of wire bonding tool). Wire bonding tool replacement system 112*a* is illustrated including clamping mechanism 114 for clamping and/or removing wire bonding tool 110 from bond head assembly 102. Clamping mechanism 114 is illustrated carried by a moveable arm assembly 128 (illustrated in part).

Clamping mechanism 114 may be configured for clamping wire bonding tool 110 (e.g., to remove wire bonding tool 110 from bond head assembly 102). In certain embodiments, clamping mechanism 114 may be configured to include a clamping portion (e.g., a first clamp portion 114*a* and/or a second clamp portion 114*b*). In certain embodiments, clamping mechanism 114 includes (i) a gripping portion for gripping wire supply 108, (ii) a cutting portion for partially cutting wire supply 108, (iii) a threading portion for threading wire supply 108, and/or (iv) a tool clamping portion for clamping wire bonding tool 110.

Clamping mechanism 114 is illustrated including first clamp portion 114*a* (e.g., a moving clamp portion) and adjacent second clamp portion 114*b* (e.g., a fixed clamp portion). Second clamp portion 114*b* is illustrated including gripping portion 114*b*1 (e.g., for gripping and/or clamping wire supply 108 and/or wire bonding tool 110) and a tool clamping portion 114*b*2 (e.g., for clamping wire bonding tool 110). It should be understood that in certain embodiments, each clamp portion 114*a*/114*b* may include one or more gripper portions and tool clamping portions. First clamp portion 114*a* may be configured to move with respect to second clamp portion 114*b* in at least one direction (e.g., laterally along the x-axis).

Wire bonding tool replacement system 112*a* is configured to provide a clamping force sufficient to support, hold, remove, and/or replace wire bonding tool 110 in connection with a clamping operation and/or a wire bonding tool replacement operation. In certain embodiments, clamping mechanism 114 may include a spring 122 (e.g., a leaf spring) for providing a clamping force in connection with a clamping operation. Spring 122 may be configured to actuate at least part of first clamp portion 114*a* (e.g., a moving clamp portion, a gripping portion, a cutting portion, a threading portion, a tool clamping portion) with respect to second clamp portion 114*b* (e.g., a fixed clamp portion).

Figure 1B:
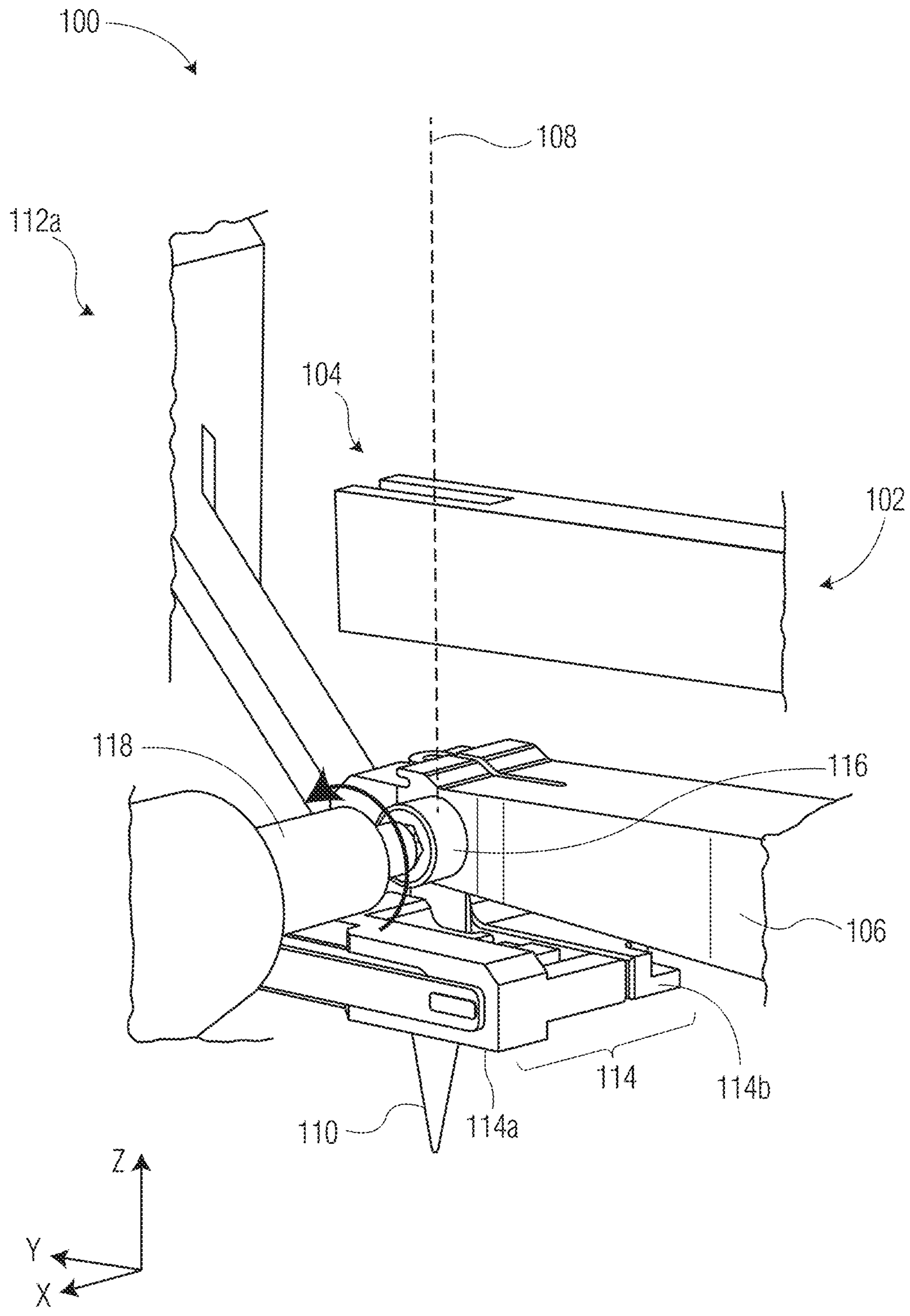

Referring now to FIG. 1B, wire bonding tool replacement system 112*a* and clamping mechanism 114 are illustrated having been moved (i.e., along the y-axis) beneath transducer 106 and around wire bonding tool 110. A wrench 118 (e.g., a cap screw wrench) is illustrated rotating about the x-axis to loosen a screw 116 (e.g., a cap screw), thereby loosening transducer 106 to release wire bonding tool 110. Prior to (or simultaneously with) tightening transducer 106, clamping mechanism 114 may clamp wire bonding tool 110 (e.g., moving first clamp portion 114*a* with respect to second clamp portion 114*b*) with a desired clamping force. In certain embodiments, wrench 118 can be included in wire bonding tool replacement system 112*a* (e.g., controlled by a common computing system in connection with clamping mechanism 114).

Figure 1C:
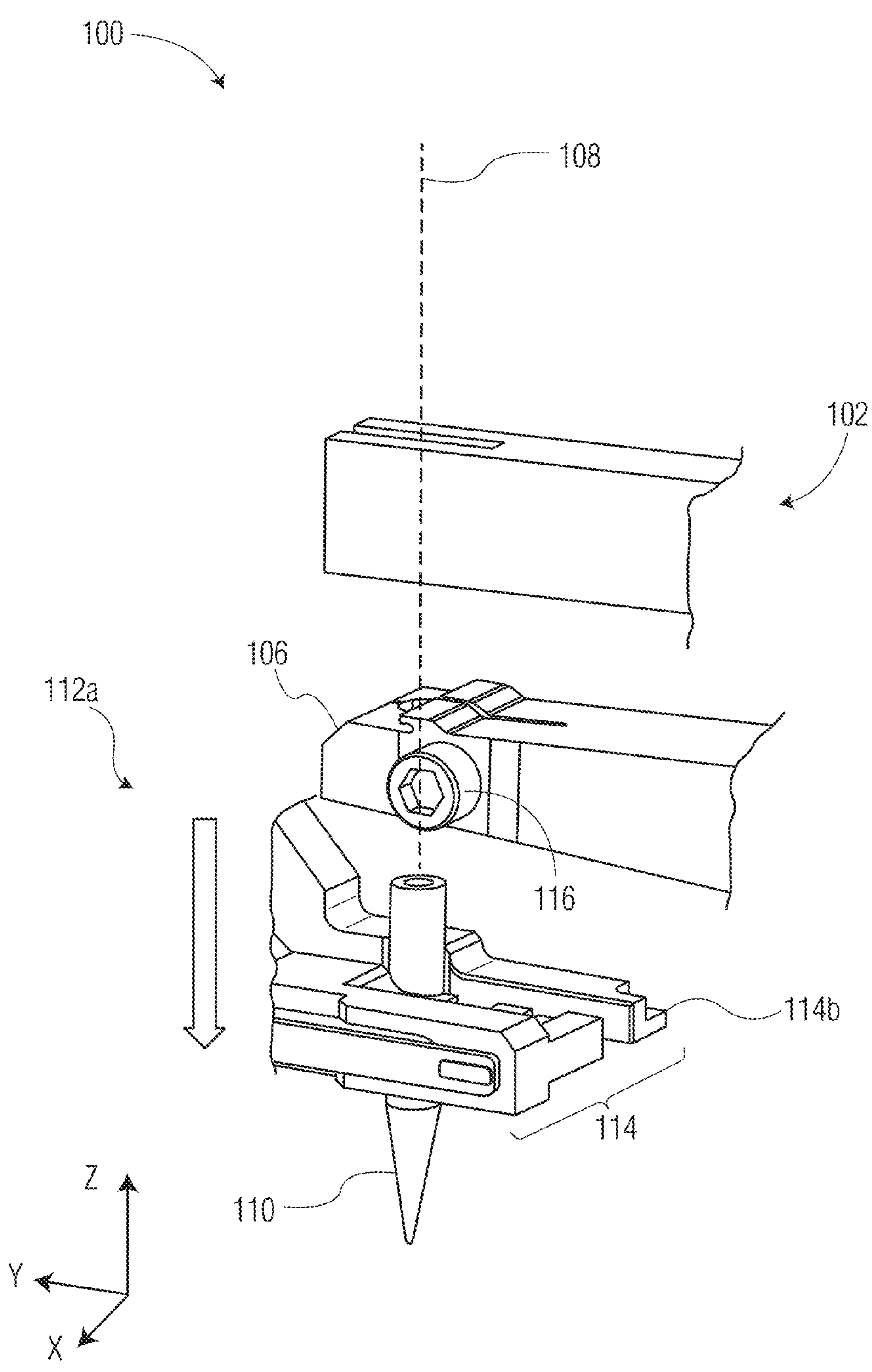

Referring now to FIG. 1C, wire bonding tool replacement system 112*a* and clamping mechanism 114 are illustrated moving wire bonding tool 110 away from (i.e., along the z-axis) bond head assembly 102 and transducer 106. After removing wire bonding tool 110 (e.g., a "used" or damaged wire bonding tool), wire bonding tool replacement system 112*a* can discard wire bonding tool 110.

Figure 1D:
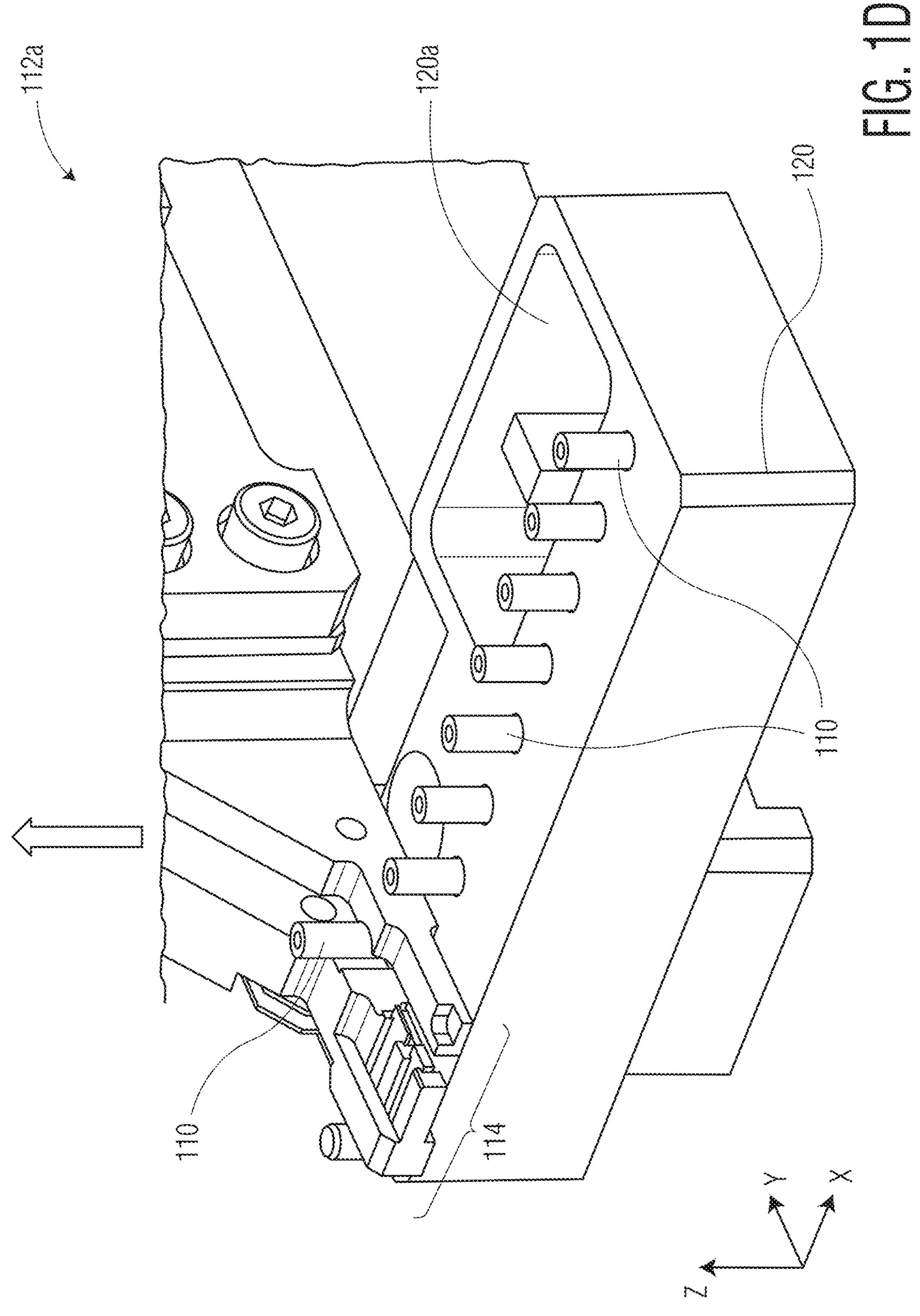

Referring now to FIG. 1D, wire bonding tool replacement system 112*a* and clamping mechanism 114 are illustrated removing a wire bonding tool 110 from (i.e., along the z-axis) a wire bonding tool source 120. Wire bonding tool source 120 defines a receptacle 120*a* for waste (e.g., used wire bonding tools 110, a portion of wire after it is removed by the wire replacement system, as in FIGS. 4A-4D and 5A-5H). Clamping mechanism 114 is illustrated clamping wire bonding tool 110 (e.g., a "new" or undamaged wire bonding tool) and beginning to move wire bonding tool 110 away from wire bonding tool source 120 (i.e., along the z-axis).

Clamping mechanism 114 is configured for retrieving wire bonding tool 110 from wire bonding tool source 120, and for carrying wire bonding tool 110 to bond head assembly 102. Such a configuration may include sizing certain clamping portions such that clamping mechanism 114 can retrieve one of a plurality of wire bonding tools 110. Such a configuration may also include mechanically coupling portions of clamping mechanism 114 to a motion system (e.g., of wire bonding tool replacement system 112*a*) for moving clamping mechanism 114 across a range of motion (e.g., from bond head assembly 102 to wire bonding tool source 120). Such a motion system can be configured to implement computer-readable instructions; such computer-readable instructions may include information related to: the plurality of wire bonding tools 110 (e.g., positional or dimensional information of each of the plurality of wire bonding tools 110) and motion profiles, and/or predetermined events (e.g., a number of bonding operations; time since installation; other information related to automatic replacement of the wire bonding tool upon the occurrence of a predetermined event; etc.).

Although FIG. 1D illustrates wire bonding tool source 120 in a particular configuration, the invention is not limited thereto. Other configurations of a wire bonding tool source are contemplated. For example, any number of slots for the plurality of wire bonding tools 110 is contemplated. A wire bonding tool source may be configured to hold wire bonding tools 110 at a top side rather than at the bottom side as illustrated in FIG. 1D. Such a wire bonding tool source is illustrated and described herein (e.g., see FIGS. 2A-2D). Wire bonding tools can be provided individually or as part of a cartridge (e.g., see FIGS. 2C-2D). A wire bonding tool source may be included as part of a wire bonding tool replacement system and/or a wire replacement system (e.g., structurally integrated, electrically integrated) or separate from a wire bonding tool replacement system. A receptacle is not required.

Figure 1E:
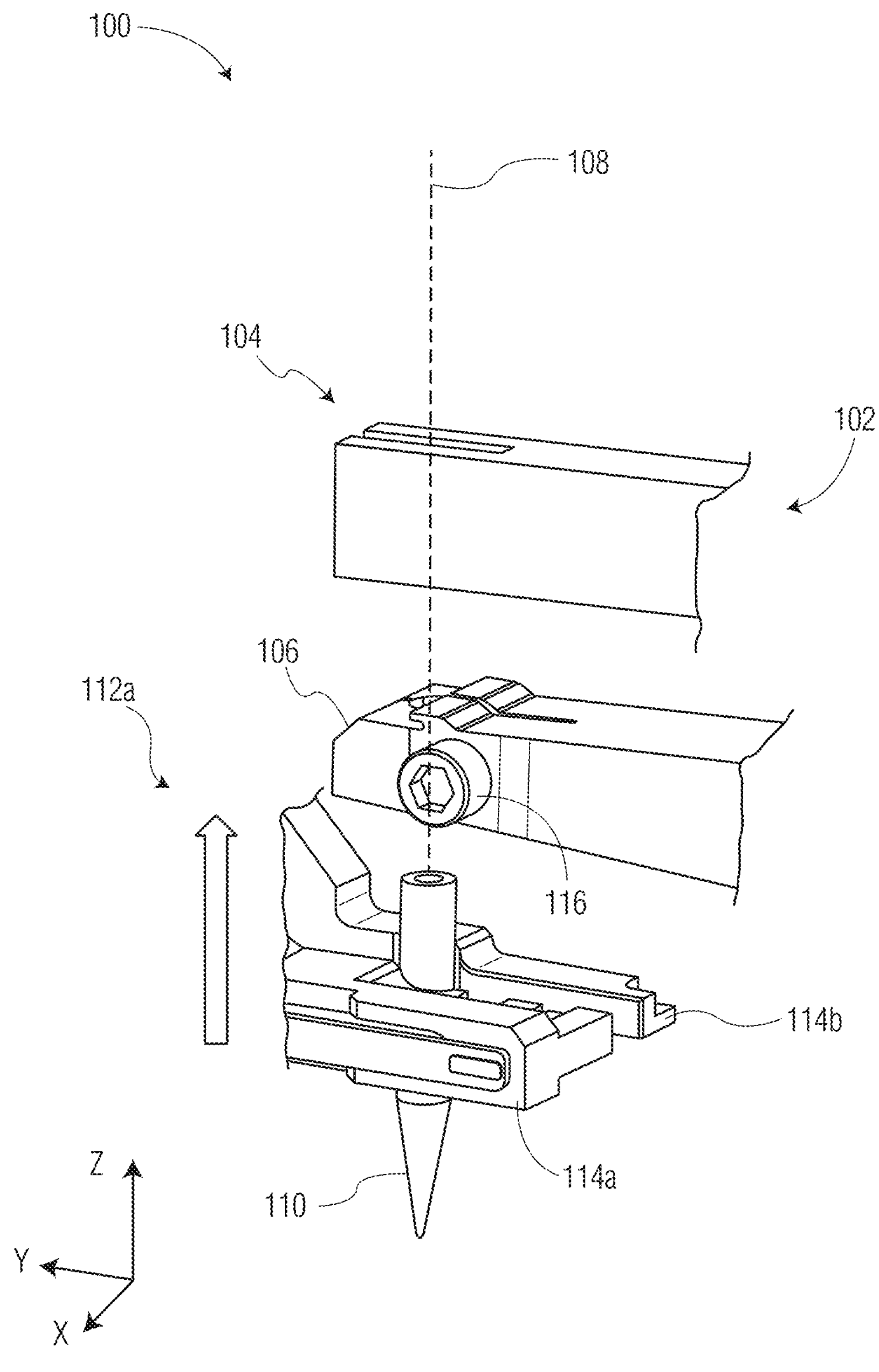

Referring now to FIG. 1E, wire bonding tool replacement system 112*a* and clamping mechanism 114 are illustrated moving wire bonding tool 110 (i.e., along the z-axis) beneath transducer 106.

Figure 1F:
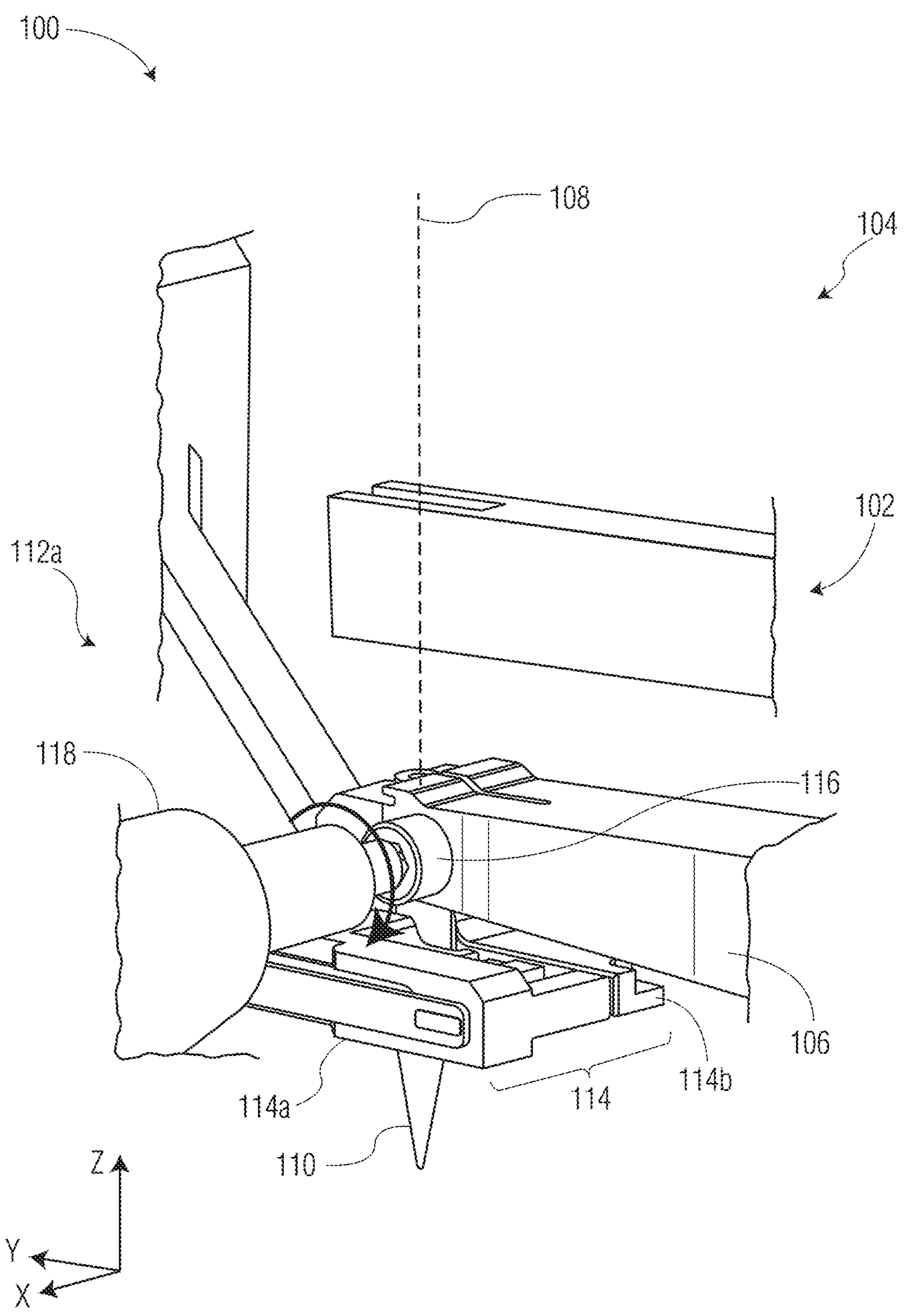

Referring now to FIG. 1F, wire bonding tool 110 is disposed within transducer 106. Wrench 118 (e.g., a cap screw wrench) is illustrated rotating about the x-axis to tighten screw 116 (e.g., a cap screw), thereby tightening transducer 106 to grip wire bonding tool 110. After tightening transducer 106 (and/or simultaneously), clamping mechanism 114 may unclamp from wire bonding tool 110 (e.g., moving first clamp portion 114*a* with respect to second clamp portion 114*b*).

Although wire bonding tool replacement system 112*a*/wire replacement system 112*b* can be included in a single wire bonding system (e.g., a single wire bonding machine), the invention is not so limited. In certain embodiments, wire bonding tool replacement system 112*a*/wire replacement system 112*b* can be configured to be removed from wire bonding system 100 and used in connection with another wire bonding system. In certain embodiments, wire bonding tool replacement system 112*a*/wire replacement system 112*b* can be moved automatically (e.g., via a robot) between a plurality of wire bonding systems.

Figures 2A, 2B:
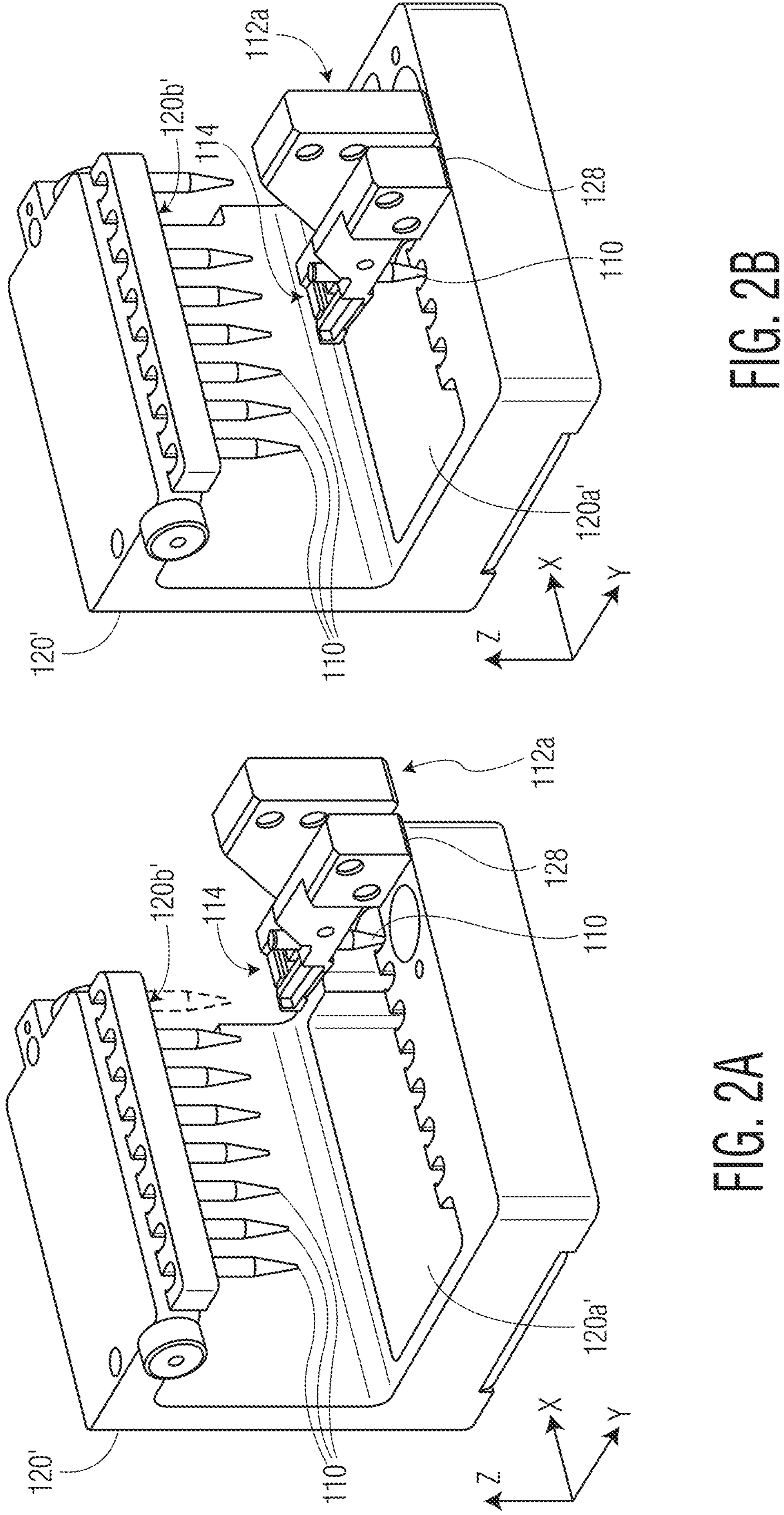
FIGS. 2A-2B are perspective views of a wire bonding tool source in accordance with an exemplary embodiment of the invention.
Figures 2C, 2D:
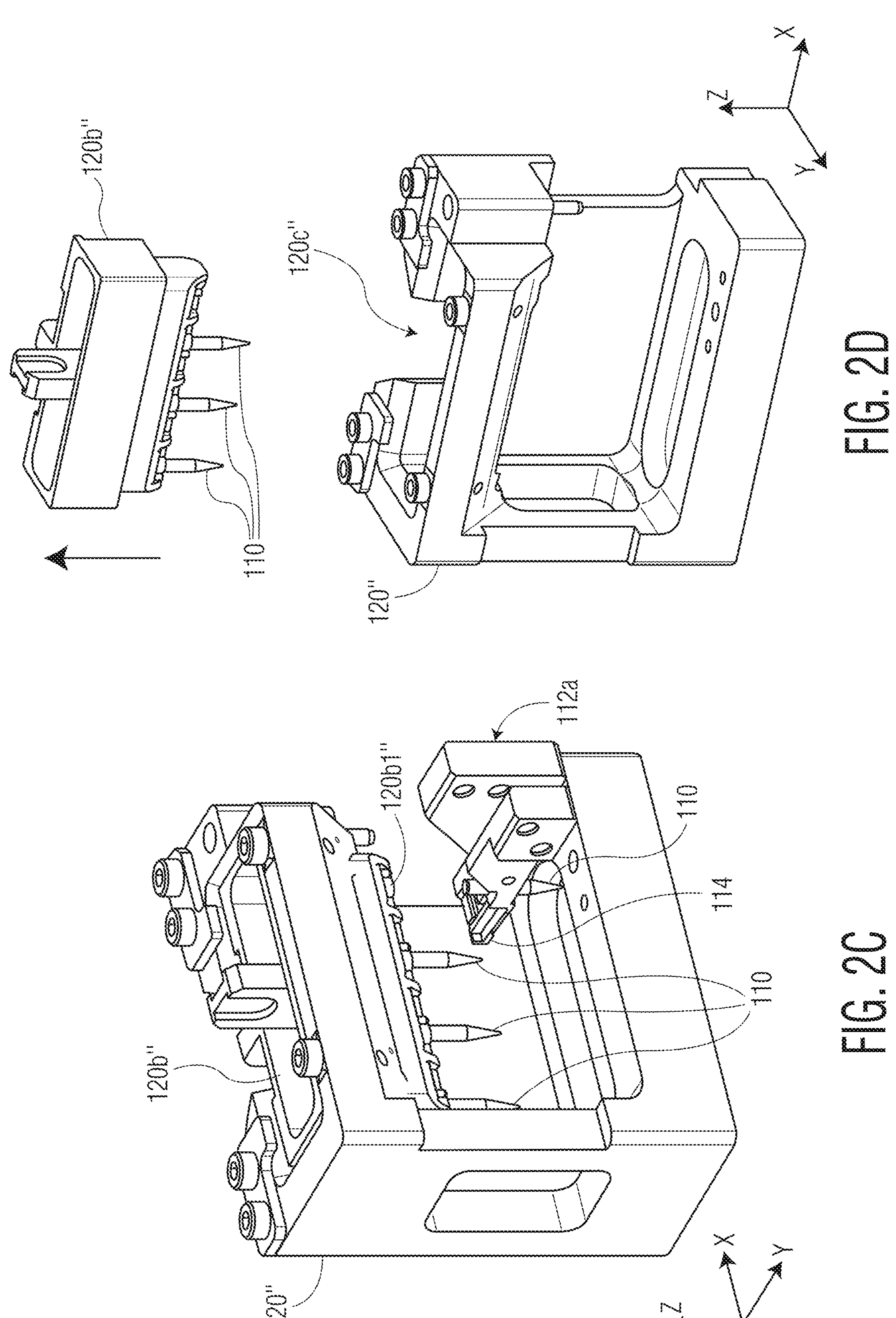
FIGS. 2C-2D are perspective views of another wire bonding tool source in accordance with an exemplary embodiment of the invention.

Referring now to FIGS. 2A-2D, wire bonding tool sources that may be used in place of wire bonding tool source 120 are illustrated. In particular, FIGS. 2A and 2B illustrate a wire bonding tool source 120', and FIGS. 2C and 2D illustrate a wire bonding tool source 120". Wire bonding tool sources 120' and 120" are configured to simultaneously (i) provide the plurality of wire bonding tools 110 (e.g., each of the plurality of wire bonding tools 110 may be installed in a slot of wire bonding tool source 120'/120"), and (ii) provide a receptacle (such as a receptacle 120*a'* defined by wire bonding tool source 120', or an empty slot 120*b'* or 120*b*1") to receive wire bonding tools from a wire bonding system (e.g., to receive used wire bonding tools, etc.).

FIG. 2A illustrates wire replacement system 112*b'* interacting with wire bonding tool source 120' (wire replacement system 112*b'* will be described in connection with FIGS. 6A-6E) (where wire replacement system 112*b'* is configured to replace wire bonding tool 110). Wire replacement system 112*b'* is carrying wire bonding tool 110 with clamping mechanism 114' (e.g., a used wire bonding tool 110 that has been removed from transducer 106, as in FIG. 1C). Wire replacement system 112*b'* is aligned with empty slot 120*b'* so that wire bonding tool 110 (e.g., a used wire bonding tool) can be installed into empty slot 120*b'*. By receiving wire bonding tool 110 in this manner, empty slot 120*b'* serves as a receptacle (as opposed to using receptacle 120*a'*) for receiving wire bonding tool 110 (e.g., a used wire bonding tool) to remove waste from a wire bonding system.

While FIG. 2A illustrates the use of empty slot 120*b'* to receive wire bonding tool 110, the invention is not so limited. It is contemplated that receptacle 120*a'* may be used to receive at least one of (i) wire bonding tools (e.g., used wire bonding tools), and (ii) wire (e.g., wire portion 108*a* after it has been removed, as in FIGS. 5E-5F, described herein).

In FIG. 2B, wire bonding tool 110 has been inserted into empty slot 120*b'*, and wire replacement system 112*b'* has removed another wire bonding tool 110 from wire bonding tool source 120', creating a new empty slot 120*b'* (e.g., wherein another "used" wire bonding tool 110 can be inserted into new empty slot 120*b'*). Wire replacement system 112*b'* may install wire bonding tool 110 into the transducer of a wire bonding system (e.g., see FIGS. 1E and 1F).

When some or all of the plurality of wire bonding tools 110 have been removed from wire bonding tool source 120' (and possibly replaced with used wire bonding tools 110), wire bonding tool source 120' may be removed from wire replacement system 112*b'*. Alternatively, used wire bonding tools 110 may be removed and/or replaced individually (e.g., manually or via an automated process).

In FIG. 2C, wire bonding tool source 120" includes a wire bonding tool cartridge 120*b"* that contains a plurality of wire bonding tools 110 and an empty slot 120*b*1". Wire bonding tool cartridge 120*b"* is an example of a mechanism used to hold the plurality of wire bonding tools 110, such that the plurality of wire bonding tools 110 can be loaded into wire bonding tool source 120" efficiently. FIG. 2C illustrates wire replacement system 112*b'* (including clamping portion 114) inserting wire bonding tool 110 into empty slot 120*b*1" (e.g., in a similar manner as described in connection with FIGS. 2A and 2B).

In FIG. 2D, wire bonding tool cartridge 120*b"* is being removed from wire bonding tool source 120", revealing a cartridge dock 120*c"* defined by wire bonding tool source 120". Cartridge dock 120*c"* is configured to receive another wire bonding tool cartridge 120*b"*. After removal, wire bonding tool cartridge 120*b"* may be disposed of or reloaded with other/new wire bonding tools (e.g., manually or via an automated process). Wire bonding tool cartridge 120*b"* may be configured to include a cover to protect the plurality of wire bonding tools 110 from damage during shipping and handling.

Although FIGS. 2A-2D illustrate wire replacement system 112*b*' interacting with wire bonding tool sources 120', 120", the invention is not limited thereto. That is, any wire bonding tool replacement system or wire replacement system within the scope of the invention (e.g., wire bonding tool replacement system 112*a*, wire replacement system 112*b*, etc.) may be utilized to interact with any wire bonding tool source within the scope of the invention (e.g., wire bonding tool sources 120', 120").

Figure 3A:
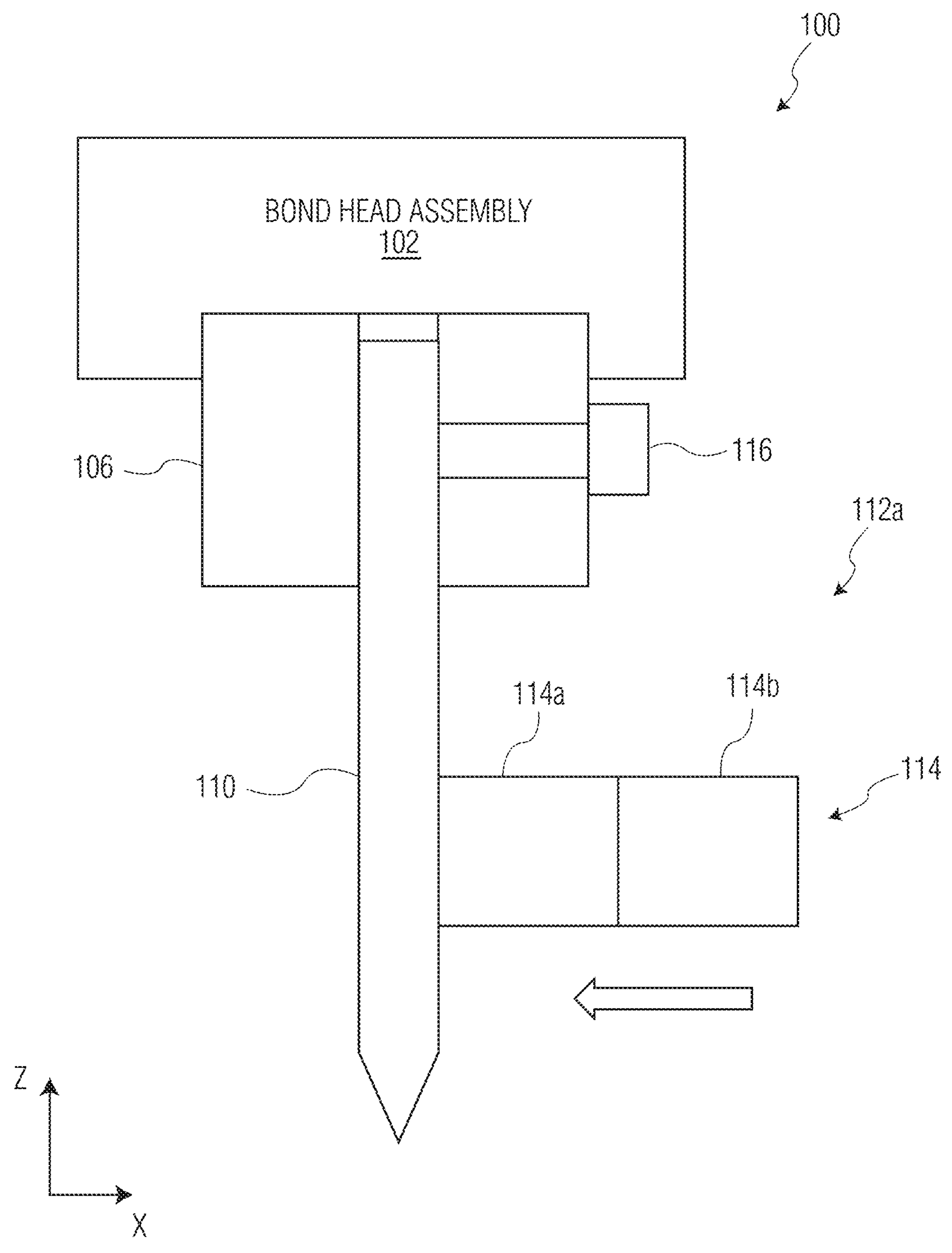
FIGS. 3A-3H are various block diagram side views of the wire bonding system of FIGS. 1A-1F.
Figure 3B:
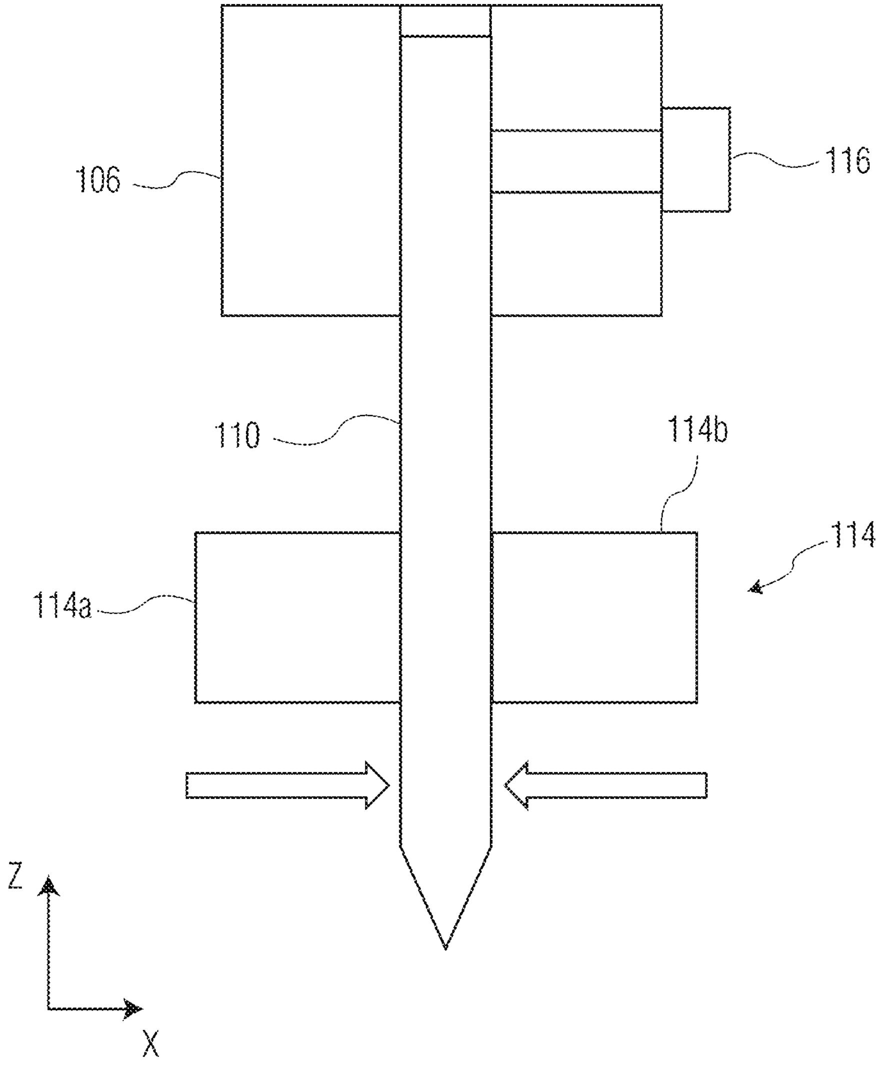

Referring now to FIGS. 3A-3H, various block diagram side views of select portions of wire bonding system 100 are illustrated. Referring specifically to FIG. 3A, wire bonding system 100 is illustrated including bond head assembly 102 (including transducer 106). Wire bonding tool 110 is illustrated being carried by bond head assembly 102 and disposed within transducer 106. Wire bonding system 100 also includes wire bonding tool replacement system 112*a* (illustrated in part). Wire bonding tool replacement system 112*a* is configured to replace wire bonding tool 110 with another wire bonding tool (e.g., another wire bonding tool 110). Wire bonding tool replacement system 112*a* is illustrated including clamping mechanism 114 for clamping and removing wire bonding tool 110 from bond head assembly 102. Clamping mechanism 114 includes first clamp portion 114*a* (e.g., a moving clamp portion), and second clamp portion 114*b* (e.g., a fixed clamp portion) adjacent first clamp portion 114*a*. In FIG. 3B, clamping mechanism 114 is illustrated gripping wire bonding tool 110.

Figure 3C:
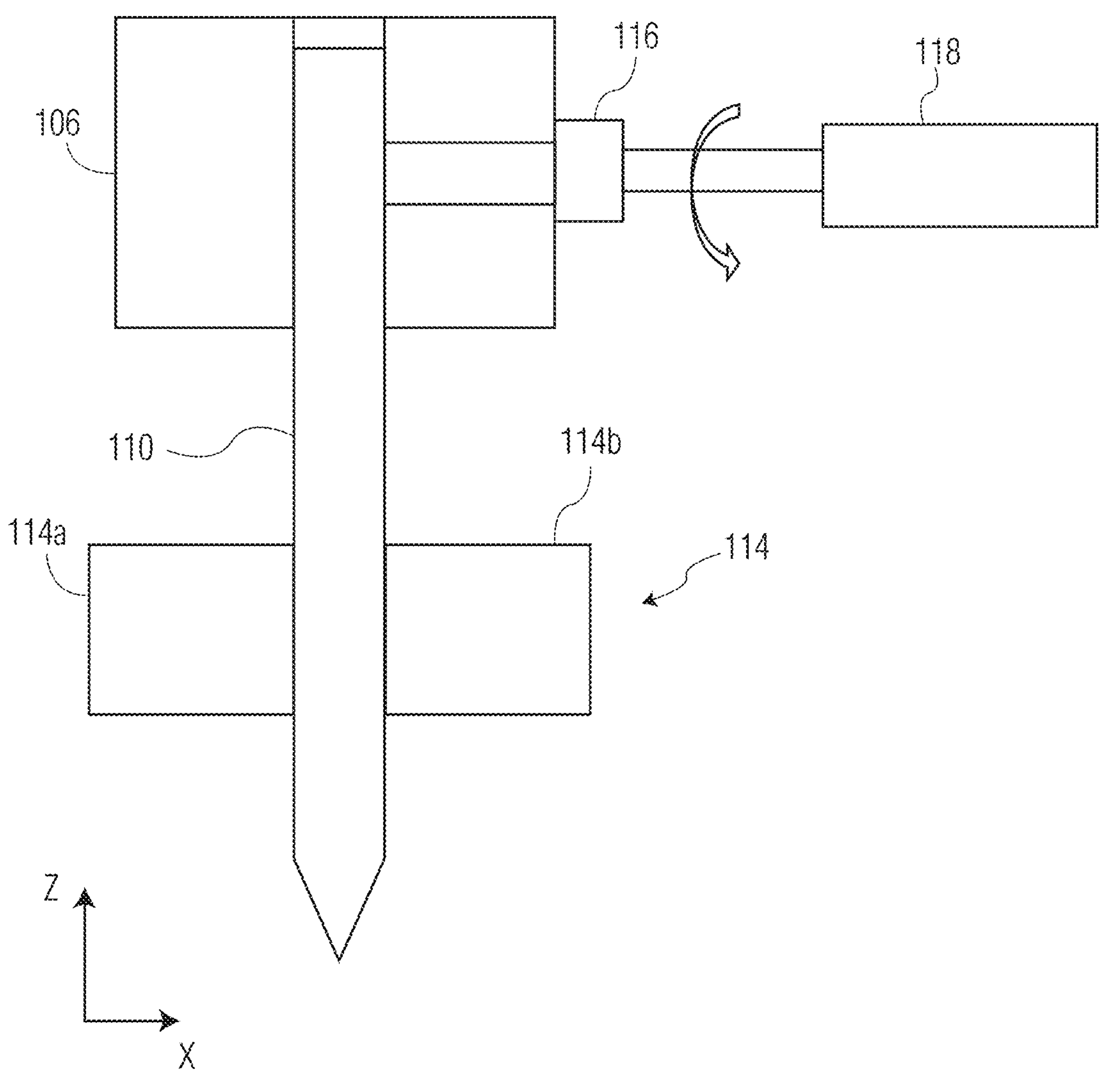

Referring now to FIG. 3C, wrench 118 (e.g., a cap screw wrench) is illustrated rotating about the x-axis to loosen screw 116 (e.g., a cap screw), thereby loosening transducer 106 to release wire bonding tool 110. Prior to loosening transducer 106 (and/or simultaneously), clamping mechanism 114 may clamp wire bonding tool 110 (e.g., moving first clamp portion 114*a* with respect to second clamp portion 114*b*).

Figure 3D:
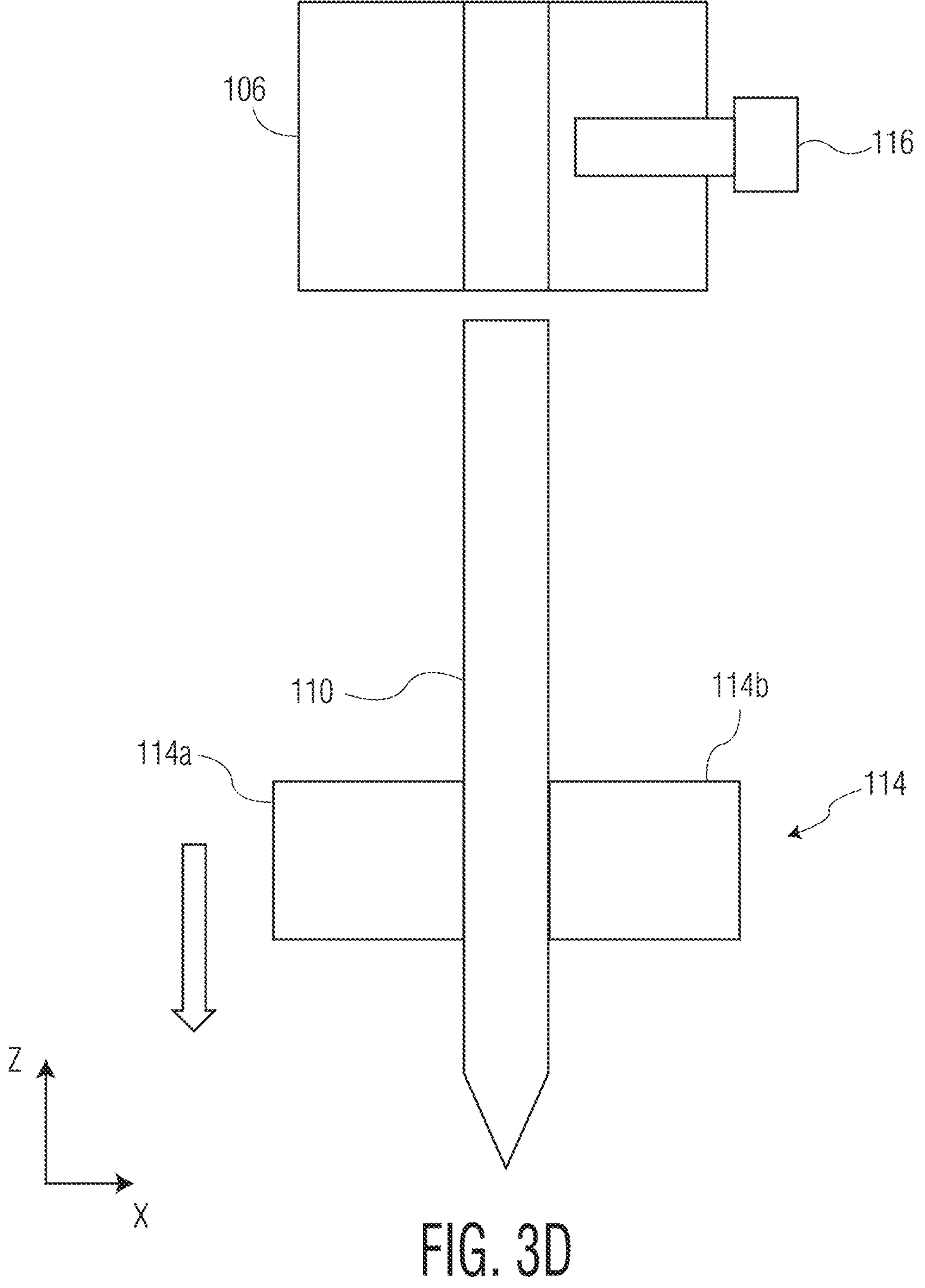

Referring now to FIG. 3D, clamping mechanism 114 is illustrated moving wire bonding tool 110 away from (i.e., along the z-axis) bond head assembly 102 and transducer 106. Wire bonding tool 110 can be disposed of prior to retrieving another wire bonding tool.

Figure 3E:
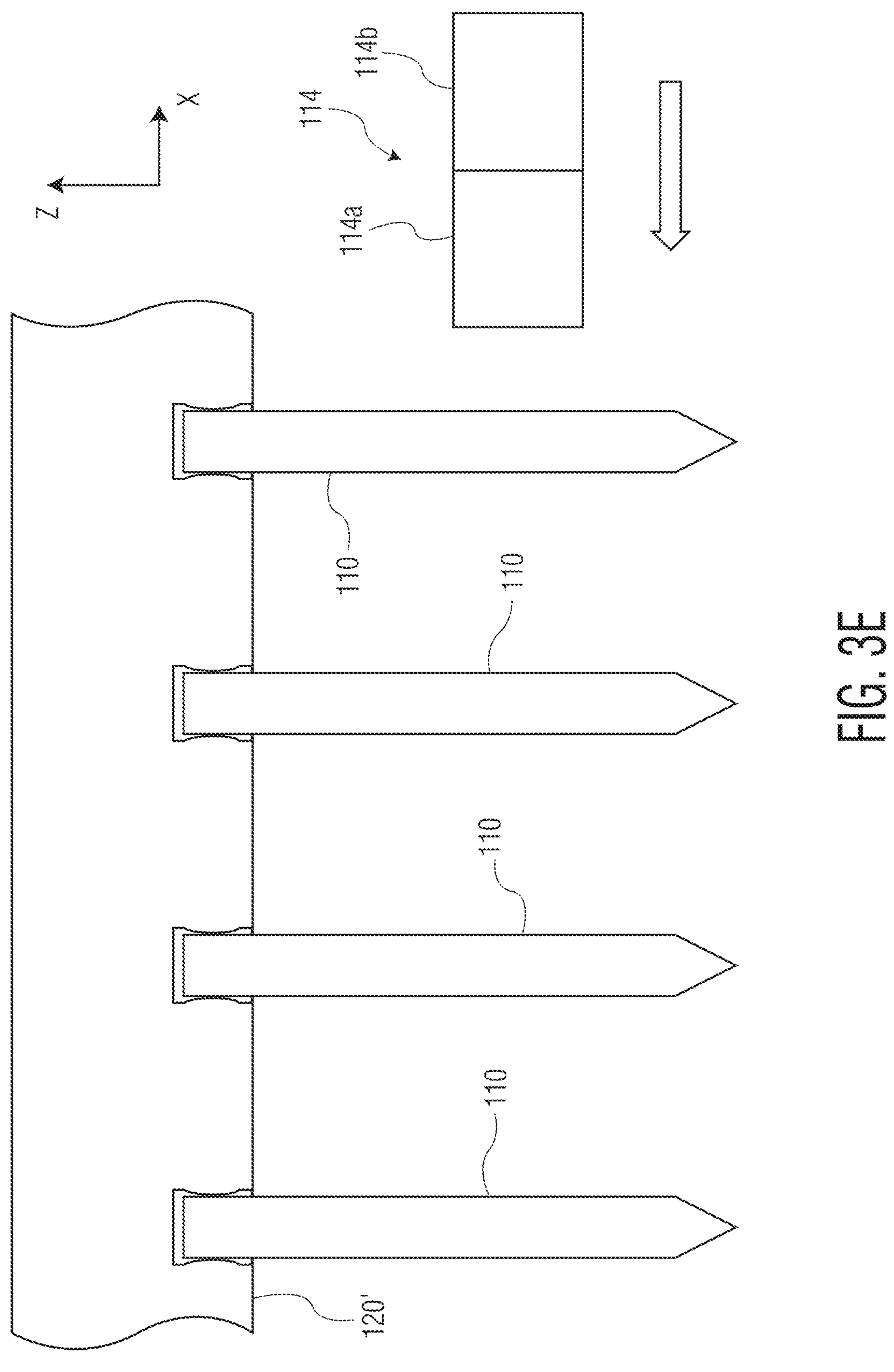
Figure 3F:
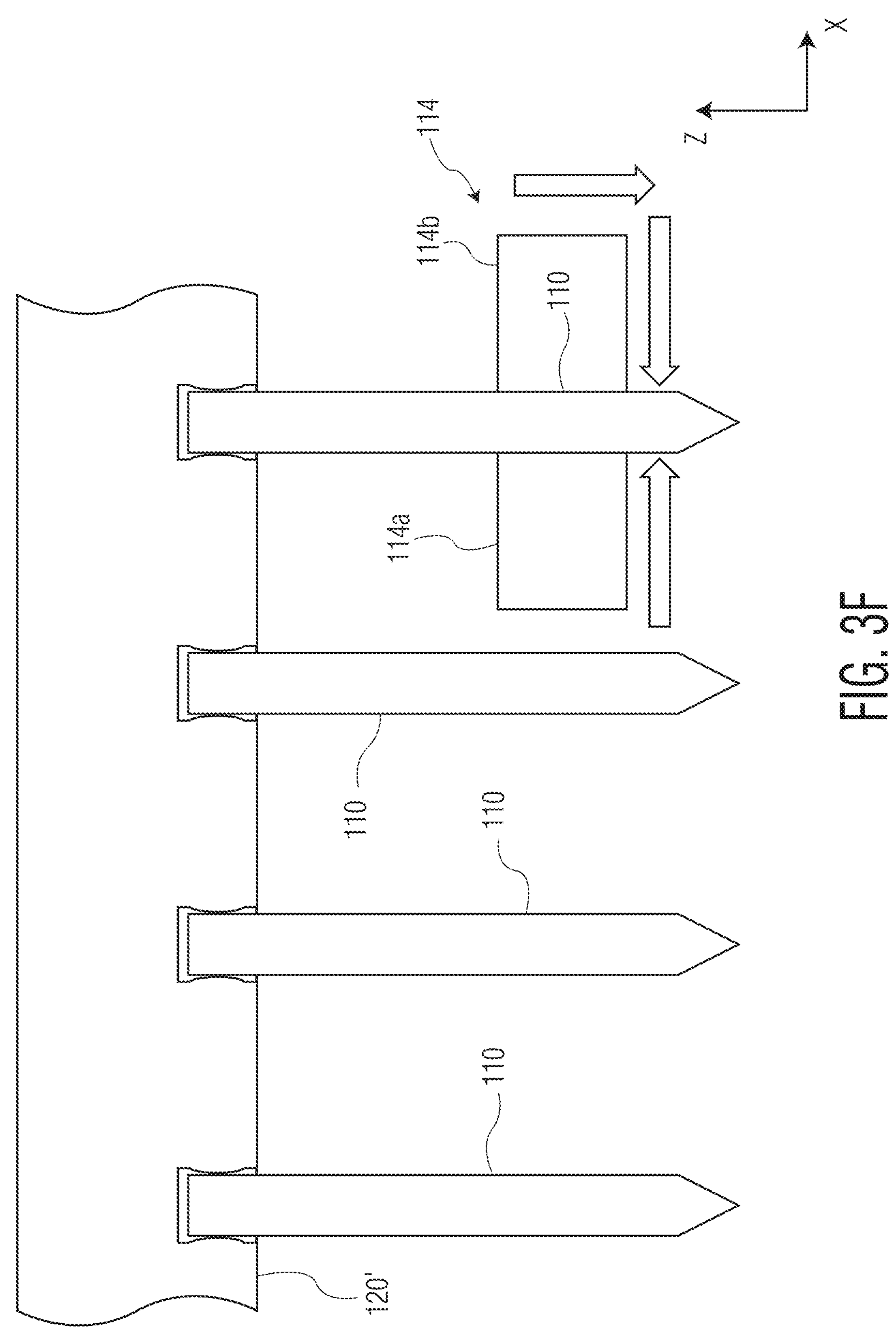

Referring now to FIG. 3E, wire bonding tool source 120' is illustrated including a plurality of wire bonding tools 110 (i.e., in the block diagram representation in FIGS. 3E-3F, only four wire bonding tools 110, and corresponding slots, are shown). Second clamp portion 114*b* is illustrated adjacent to wire bonding tool source 120'.

Referring now to FIG. 3F, clamping mechanism 114 is illustrated removing a wire bonding tool 110 from (i.e., along the z-axis) wire bonding tool source 120'.

Figure 3G:
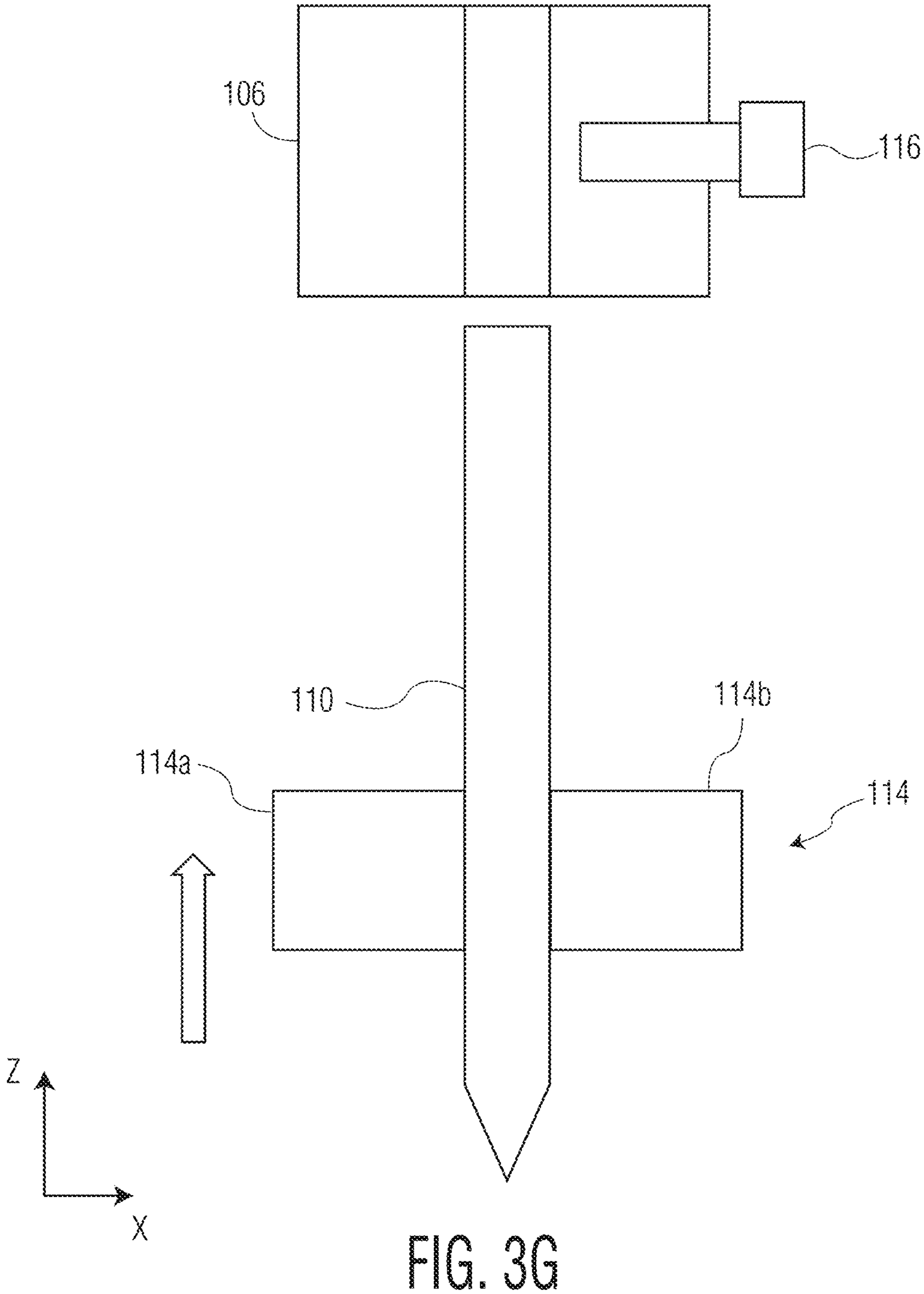

Referring now to FIG. 3G, clamping mechanism 114 is illustrated moving wire bonding tool 110 (i.e., along the z-axis) beneath transducer 106.

Figure 3H:
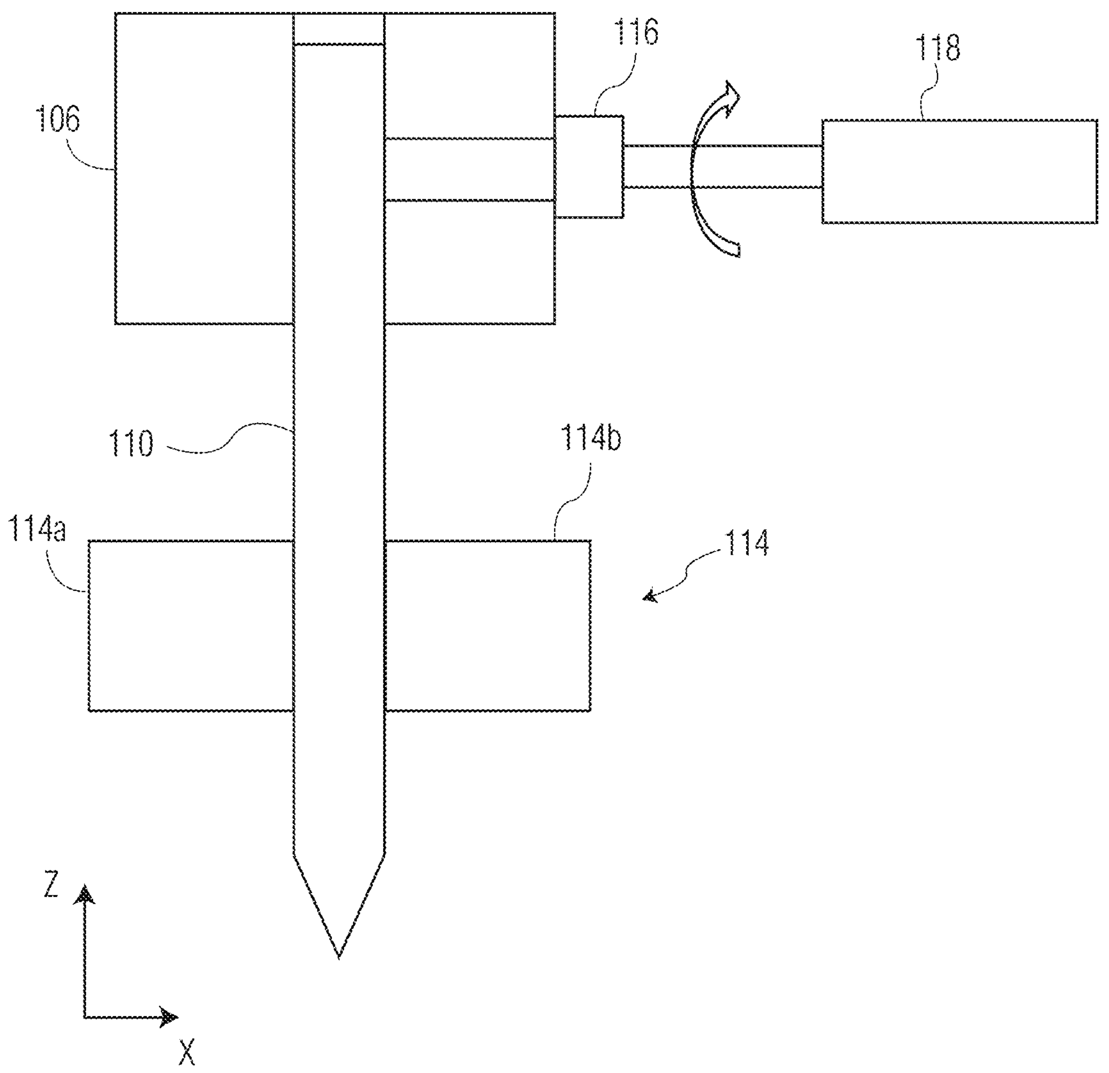

Referring now to FIG. 3H, wire bonding tool 110 is illustrated disposed within transducer 106. Wrench 118 (e.g., a cap screw wrench) is illustrated rotating about the x-axis to tighten screw 116 (e.g., a cap screw), thereby tightening transducer 106 to grip wire bonding tool 110. After tightening transducer 106 (and/or simultaneously), clamping mechanism 114 may unclamp from wire bonding tool 110 (e.g., moving first clamp portion 114*a* with respect to second clamp portion 114*b*).

Although wire bonding system 100 (described in connection with FIGS. 1A-1F and 3A-3H) is configured to remove and replace (e.g., automatically) a wire bonding tool, the invention is not so limited. For example, a similar wire bonding system can be used in connection with removing and replacing wire (e.g., automatically). Moveable arm assembly 128 and/or clamping mechanism 114 can be configured for removing wire from wire bonding tool 110, and for replacing wire in connection with replacement of wire bonding tool 110. In one aspect, clamping mechanism can include (i) a gripping portion for gripping wire, (ii) a cutting portion for partially cutting wire, and (iii) a threading portion for threading wire (in addition to a tool clamping portion for clamping the wire bonding tool).

Figure 4A:
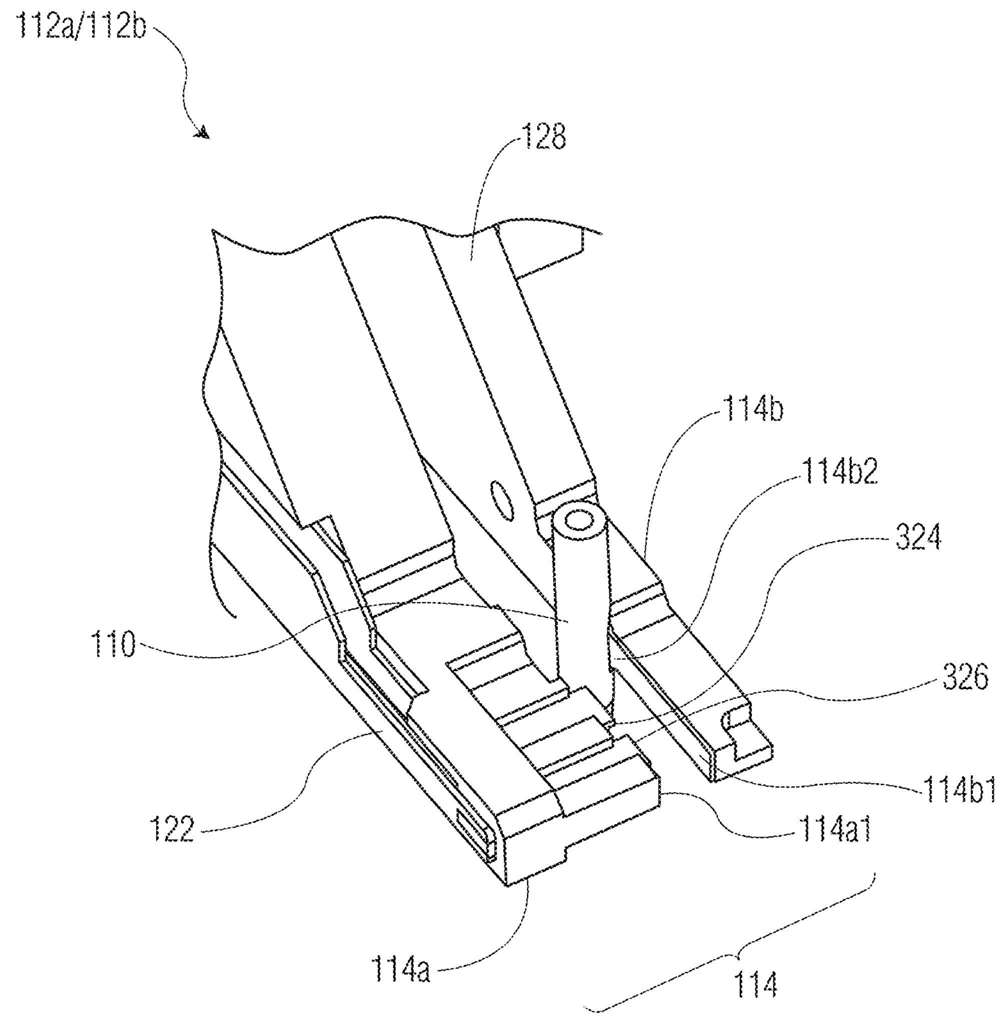
FIGS. 4A-4D are various perspective views of elements of another wire bonding system in accordance with an exemplary embodiment of the invention.
Figure 4A:
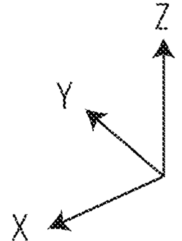

Referring now to FIG. 4A, wire replacement system 112*b* of a wire bonding system 300 is illustrated (illustrated in part). It should be understood that wire replacement system 112*b* shares many of the same elements and aspects as wire bonding tool replacement system 112*a* described elsewhere herein (e.g., FIGS. 1A-1D, FIGS. 3A-3H, etc.) in connection with wire bonding system 100. For example, FIG. 4A illustrates various elements of clamping mechanism 114—including illustrating wire bonding tool 110 being clamped by clamping mechanism 114.

Wire replacement system 112*b* is configured to (i) remove a portion of a wire engaged with wire bonding tool 110, and (ii) to replace the wire portion (e.g., with the same wire portion, or with another wire portion). Wire replacement system 112*b* includes clamping mechanism 114 configured to clamp wire.

Clamping mechanism 114 is illustrated including first clamp portion 114*a* (e.g., a moving clamp portion) and second clamp portion 114*b* (e.g., a fixed clamp portion) disposed adjacent first clamp portion 114*a*. Clamping mechanism 114 is illustrated including spring 122 configured to actuate a moving clamp portion (e.g., first clamp portion 114*a*) with respect to a fixed clamp portion (e.g., second clamp portion 114*b*). Clamping mechanism 114 is illustrated including gripping portions 114*a*1/114*b*1 for gripping wire. Clamping mechanism 114 is illustrated including a cutting portion 324 for cutting wire (e.g., fully cutting wire, half cutting wire, partially cutting wire, creating an incision, etc.). Clamping mechanism 114 is illustrated including a threading portion 326 for threading wire. Clamping mechanism 114 is illustrated including tool clamping portion 114*b*2 for clamping wire bonding tool 110. In certain embodiments, clamping mechanism 114 may be carried by moveable arm assembly 128.

Moveable arm assembly 128 is configured to move clamping mechanism 114 independent of bond head assembly 102 and/or an X-Y table that carries bond head assembly 102. Thus, clamping mechanism 114 is distinguished from wire clamp 104 in that wire clamp 104 is part of bond head assembly 102, and thus cannot be moved independently from bond head assembly 102. Moveable arm assembly 128 may have its own motion system/positioning system, e.g., wherein the motion system/positioning system is housed within wire bonding tool replacement system 112*a*/wire replacement system 112*b*.

Figure 4B:
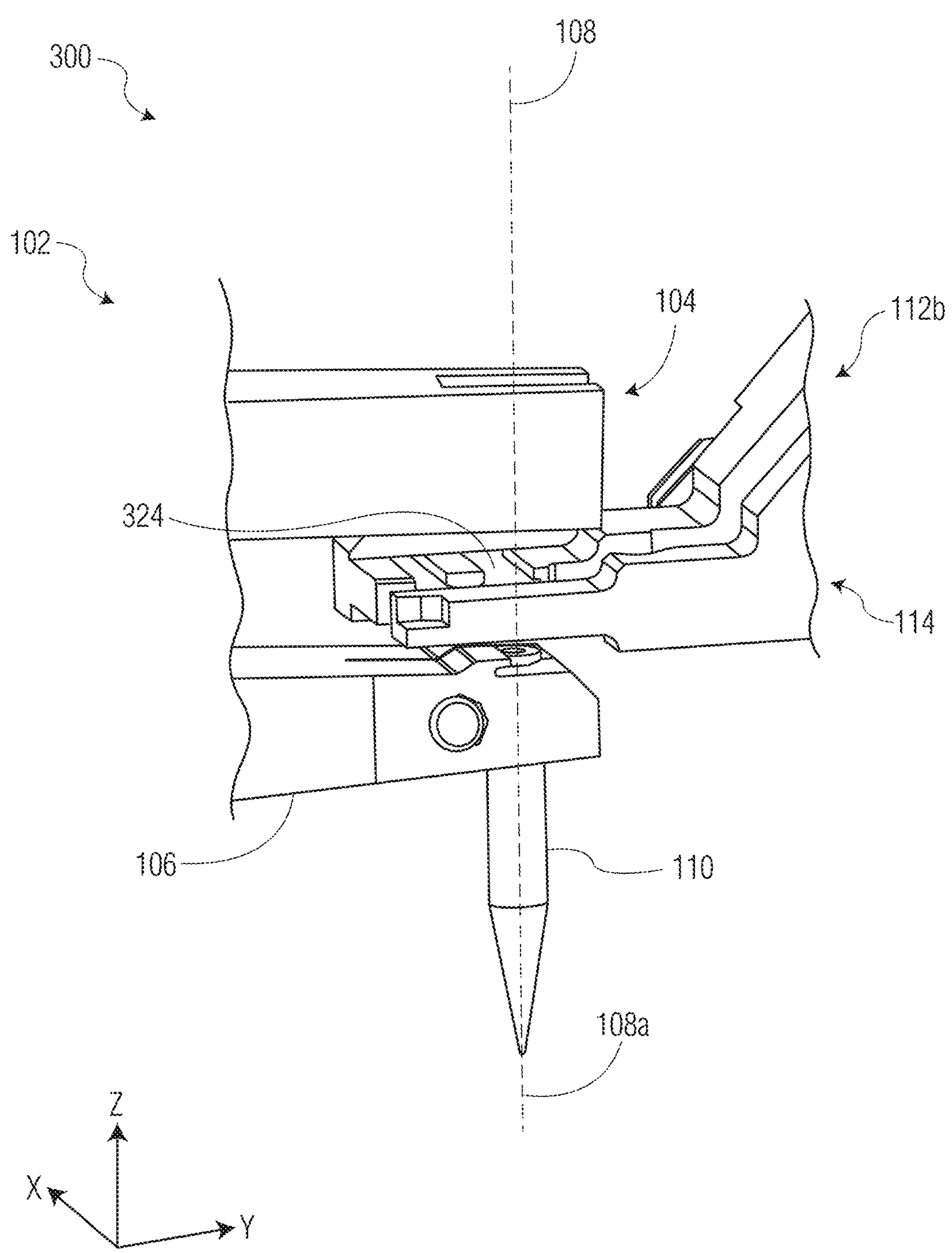

Referring now to FIG. 4B, wire bonding system 300 is illustrated. Wire bonding system 300 includes bond head assembly 102 (illustrated in part) configured to carry wire bonding tool 110. Bond head assembly 102 is illustrated including wire clamp 104 and transducer 106. Wire supply 108 is illustrated disposed through both wire clamp 104 and transducer 106. Wire portion 108*a* of wire supply 108 is illustrated disposed through wire bonding tool 110.

Wire bonding system 300 also includes wire replacement system 112*b* (illustrated in part) configured to (i) remove a portion of wire engaged with wire bonding tool and (ii) to replace the wire portion (e.g., with the same wire portion or with another wire portion). It should be understood that while wire replacement system 112*b* may primarily replace wire, the invention is not so limited; in certain embodiments, wire replacement system 112*b* may be configured to provide (or remove) wire bonding tool 110 to (or from) bond head assembly 102. It should be understood that wire bonding tool 110 may have been provided to transducer 106 (of bond head assembly 102) by wire replacement system 112*b*.

In FIG. 4B, wire replacement system 112*b* is illustrated cutting wire supply 108 with cutting portion 324 (e.g., a "half-cut blade") to partially cut (e.g., "half cutting") wire supply 108. Clamping mechanism 114 has been positioned (e.g., along the z-axis while in an "open" configuration) and then closed to perform a cutting operation to form a "half-cut" (or partial sever) on wire supply 108. It should be understood that cutting portion 324 may be spring controlled (e.g., using spring 122) and may provide a clamping force which is different from a gripping force or cutting force. Wire clamp 104 may be in a "closed" configuration during this cutting operation.

After cutting wire supply 108, wire clamp 104 may be opened (i.e., in an "opened" configuration) and clamping mechanism 114 of wire replacement system 112*b* can be moved away from wire clamp 104 (i.e., down or along the z-axis) to feed wire supply 108 through wire bonding tool 110.

Figure 4C:
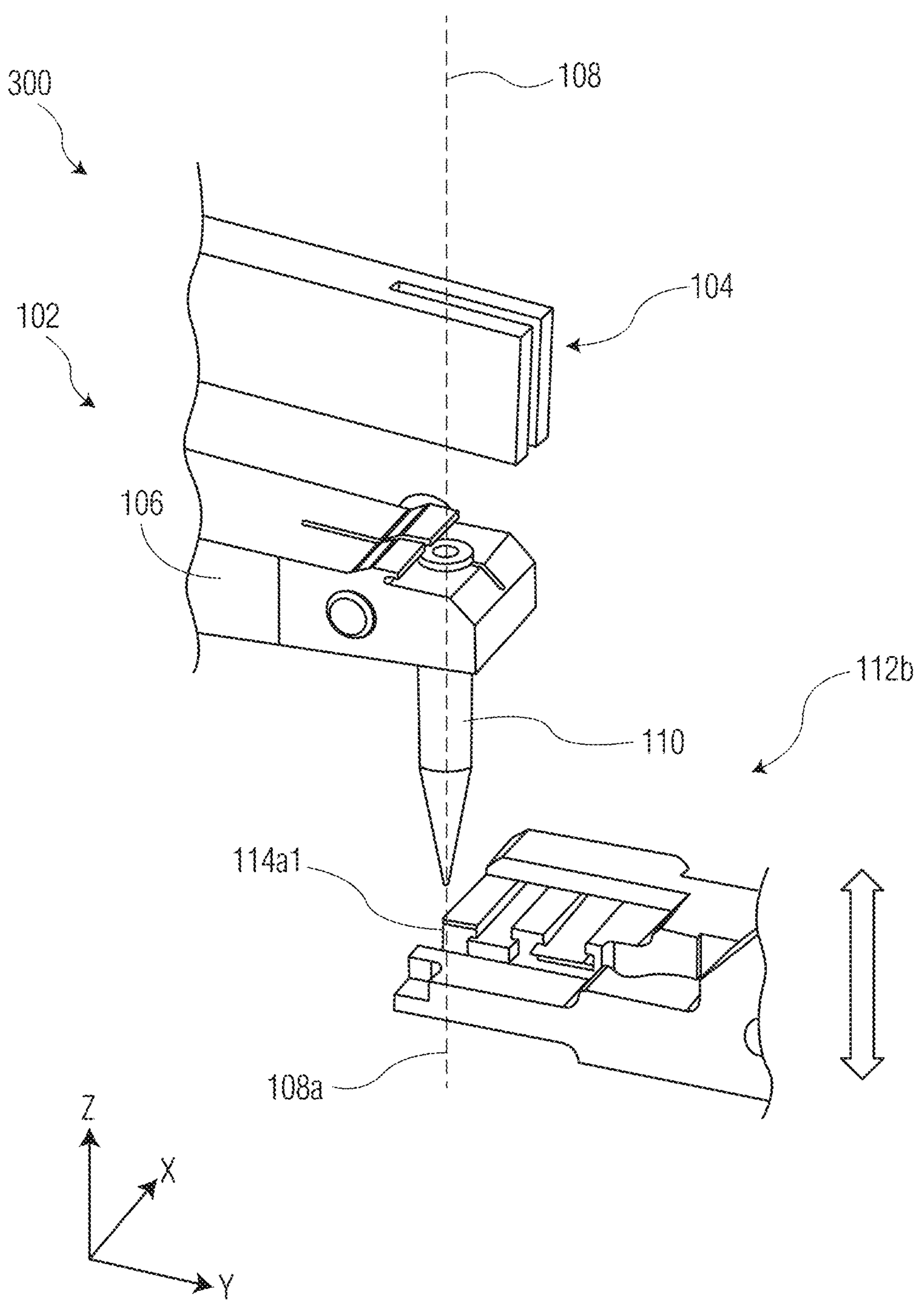

In FIG. 4C, a cutting operation and first wire feed operation have been completed. Clamping mechanism 114 of wire replacement system 112*b* is illustrated having been moved below wire bonding tool 110. Clamping mechanism 114 can grip wire portion 108*a* with gripping portion 114*a*1 (and gripping portion 114*b*1, not illustrated) and feed wire supply 108 in connection with a feeding operation. Such a feeding operation can be repeated for a plurality of cycles (e.g., two cycles, three cycles, etc.). Such a feeding operation includes opening and closing wire clamp 104 in connection with each cycle. At the end of the feeding operation, the partial cut is approximately aligned with the top of wire bonding tool 110. Then, wire clamp 104 is closed and clamping mechanism 114 can pull on wire supply 108 (e.g., along the z-axis) such that wire supply 108 breaks at the partial cut/incision. In certain embodiments, a new wire bonding tool can be provided after breaking wire supply 108 at the partial cut/incision.

Figure 4D:
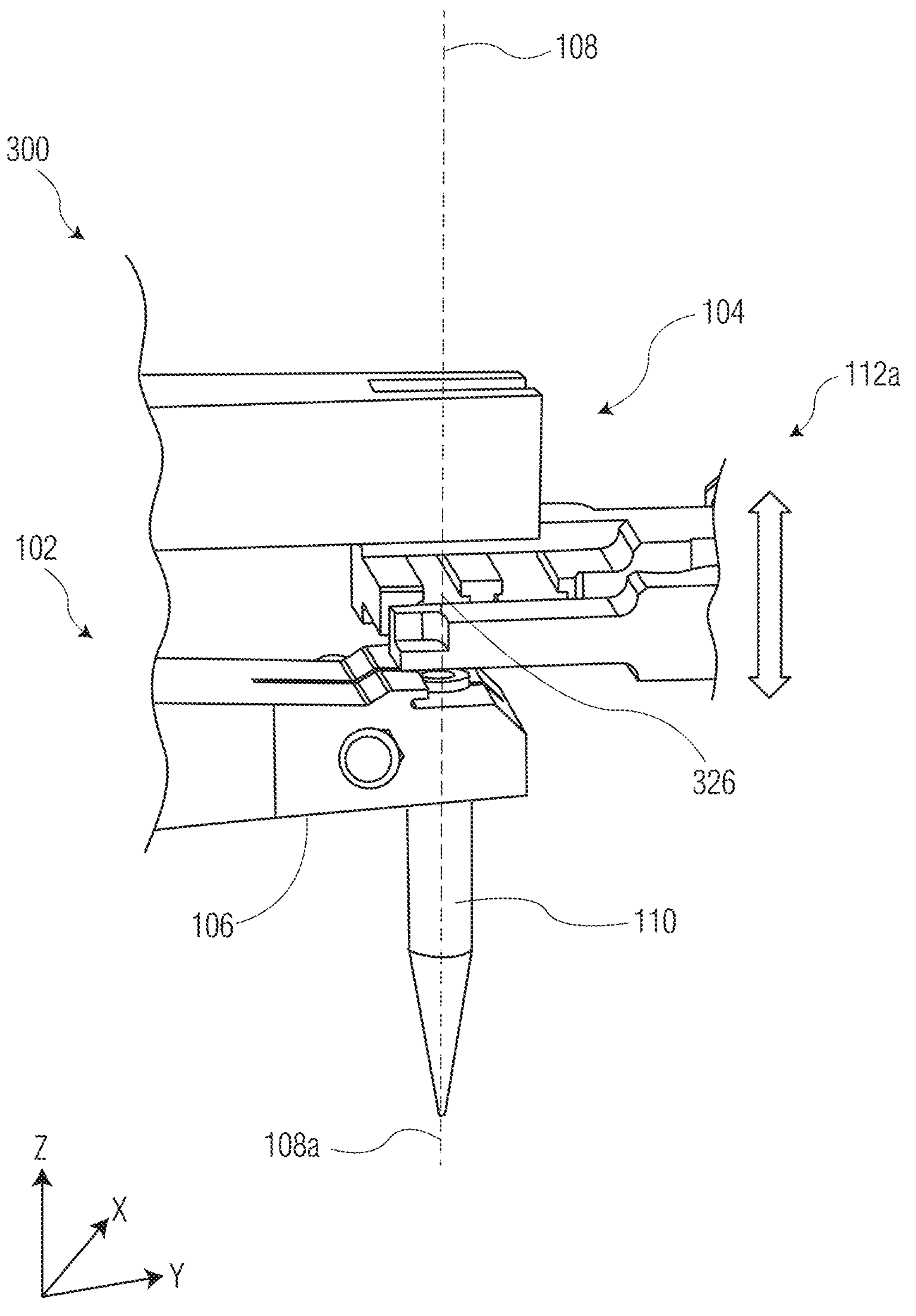

In FIG. 4D, wire supply 108 has been broken at the partial cut/incision and clamping mechanism 114 of wire replacement system 112*b* is illustrated having been moved above transducer 106. Clamping mechanism 114 is illustrated closed around wire supply 108 using threading portion 326 (e.g., a threading blade). Clamping mechanism 114 can move away from wire clamp 104 in connection with a threading process. Such a threading process can be repeated for a plurality of cycles (e.g., two cycles, three cycles, etc.). Such a threading process includes opening and closing wire clamp 104 in connection with each cycle. Such a threading process is repeated until wire portion 108*a* extends to a desired length (e.g., such that wire portion 108*a* extends out from wire bonding tool 110, as shown in FIG. 4D). At the end of the threading process, wire clamp 104 is closed.

FIGS. 5A-5H illustrate various cross-sectional block diagrams of portions of wire bonding system 300 and/or wire replacement system 112*b*, in connection with certain exemplary embodiments of the invention.

Figure 5A:
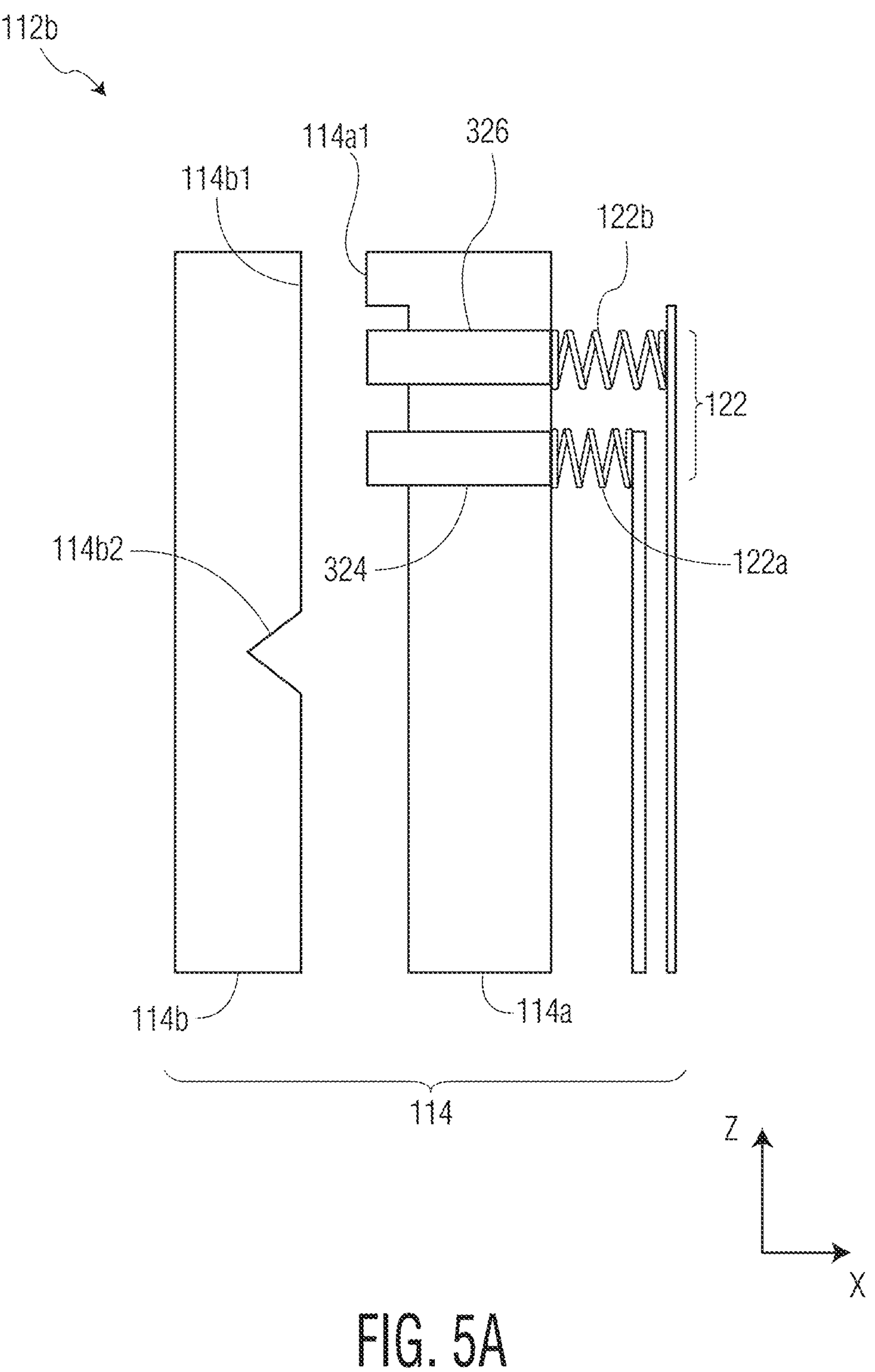
FIGS. 5A-5H are various block diagram side views of elements of the wire bonding system of FIGS. 3A-3D.

In FIG. 5A, clamping mechanism 114 of wire replacement system 112*b* is illustrated. Clamping mechanism 114 is illustrated including first clamp portion 114*a* (a moving clamp portion) and second clamp portion 114*b* (e.g., a fixed clamp portion) disposed adjacent to first clamp portion 114*a*. First clamp portion 114*a* is configured to move with respect to second clamp portion 114*b* in at least one direction. Clamping mechanism 114 is illustrated including a gripping portion 114*a*1 for gripping wire, a cutting portion 324 for cutting (e.g., half cutting) wire, and a threading portion 326 for threading wire. Clamping mechanism 114 is illustrated including tool clamping portion 114*b*2 for clamping a tool (e.g., wire bonding tool 110).

Clamping mechanism 114 is illustrated including a spring 122 configured to actuate first clamp portion 114*a* with respect to second clamp portion 114*b*. Spring 122 is illustrated including a plurality of springs, including spring 122*a* (configured to provide a cutting force for cutting portion 324) and spring 122*b* (configured to provide a gripping force for threading portion 326). Cutting portion 324 and threading portion 326 may be spring controlled with different mechanical forces from each other (e.g., different spring constants).

Figure 5B:
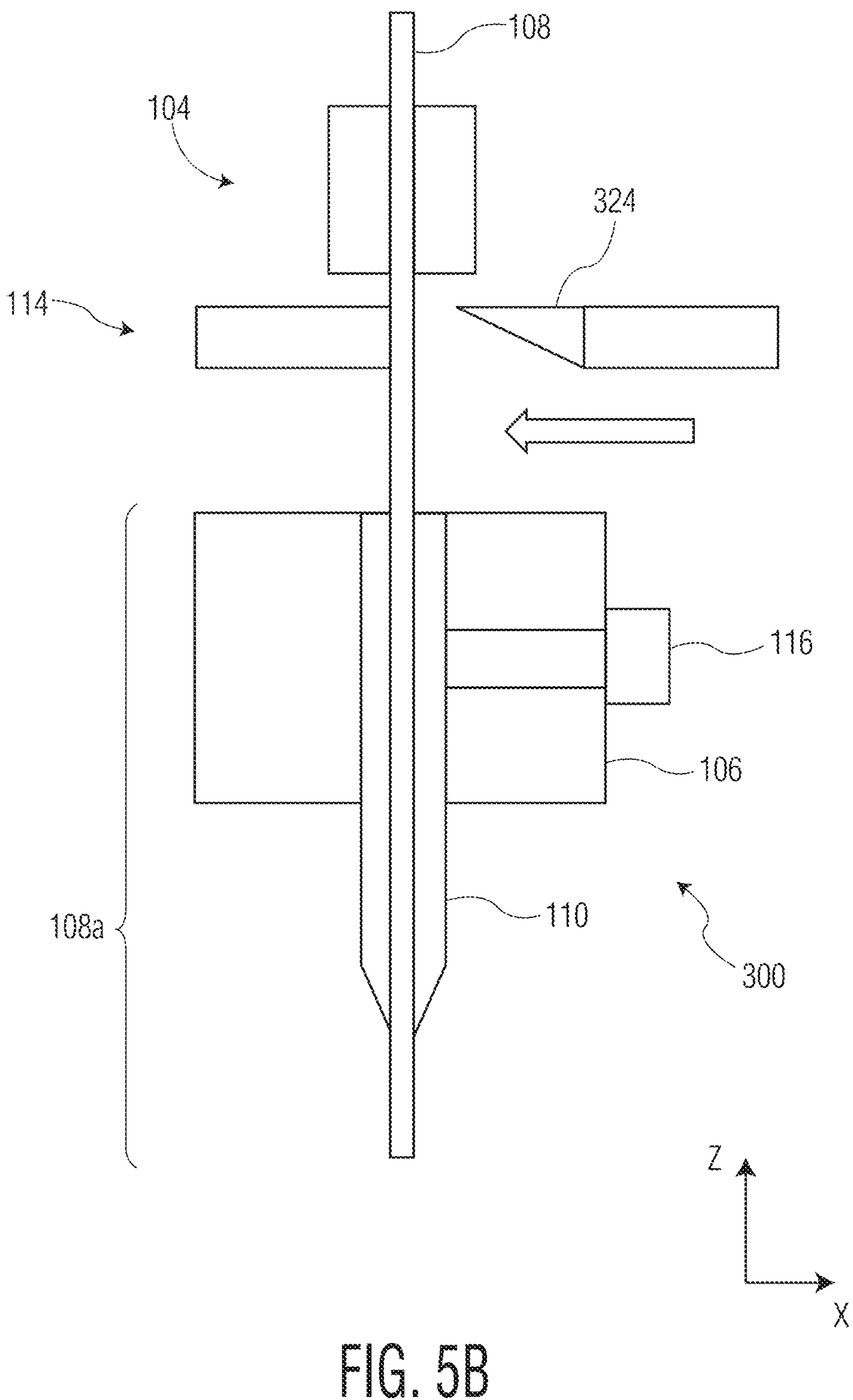

In FIG. 5B, clamping mechanism 114 is illustrated disposed above transducer 106 prior to a cutting operation. Cutting portion 324 is illustrated adjacent wire supply 108 with clamping mechanism 114 in an "open" position prior to a cutting operation. Wire clamp 104 is illustrated in a "closed" position.

Figure 5C:
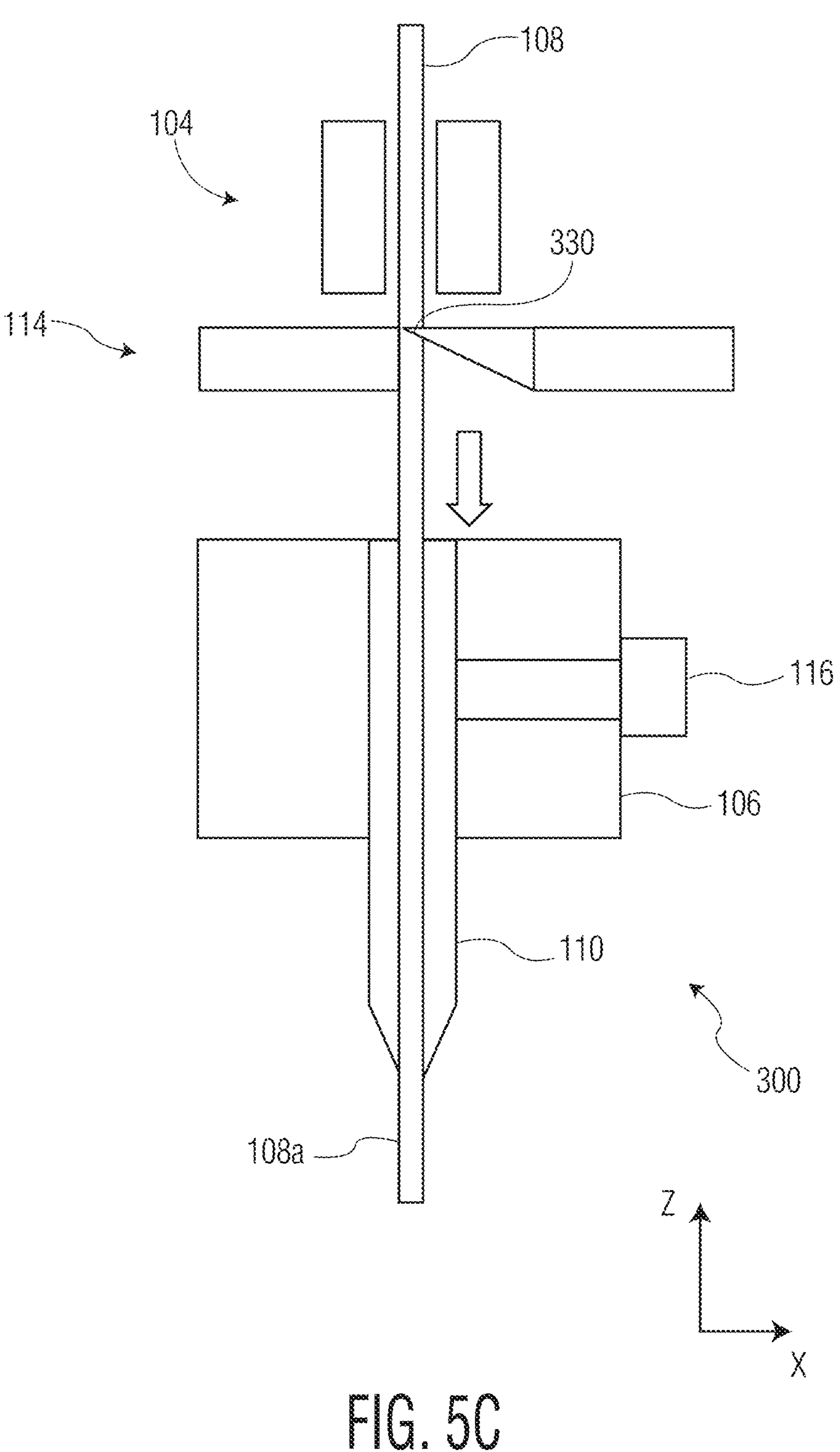

In FIG. 5C, clamping mechanism 114 has been closed in connection with a cutting operation. Clamping mechanism 114 of wire replacement system 112*b* is illustrated partially cutting wire supply 108 to create an incision 330. Incision 330 defines an end of wire portion 108*a* to be replaced on wire bonding system 300. Incision 330 has been formed at a location on wire bonding system 300 between wire clamp 104 and wire bonding tool 110. Clamping mechanism 114 may subsequently be moved (e.g., down along the z-axis) in connection with a first feeding operation.

Figure 5D:
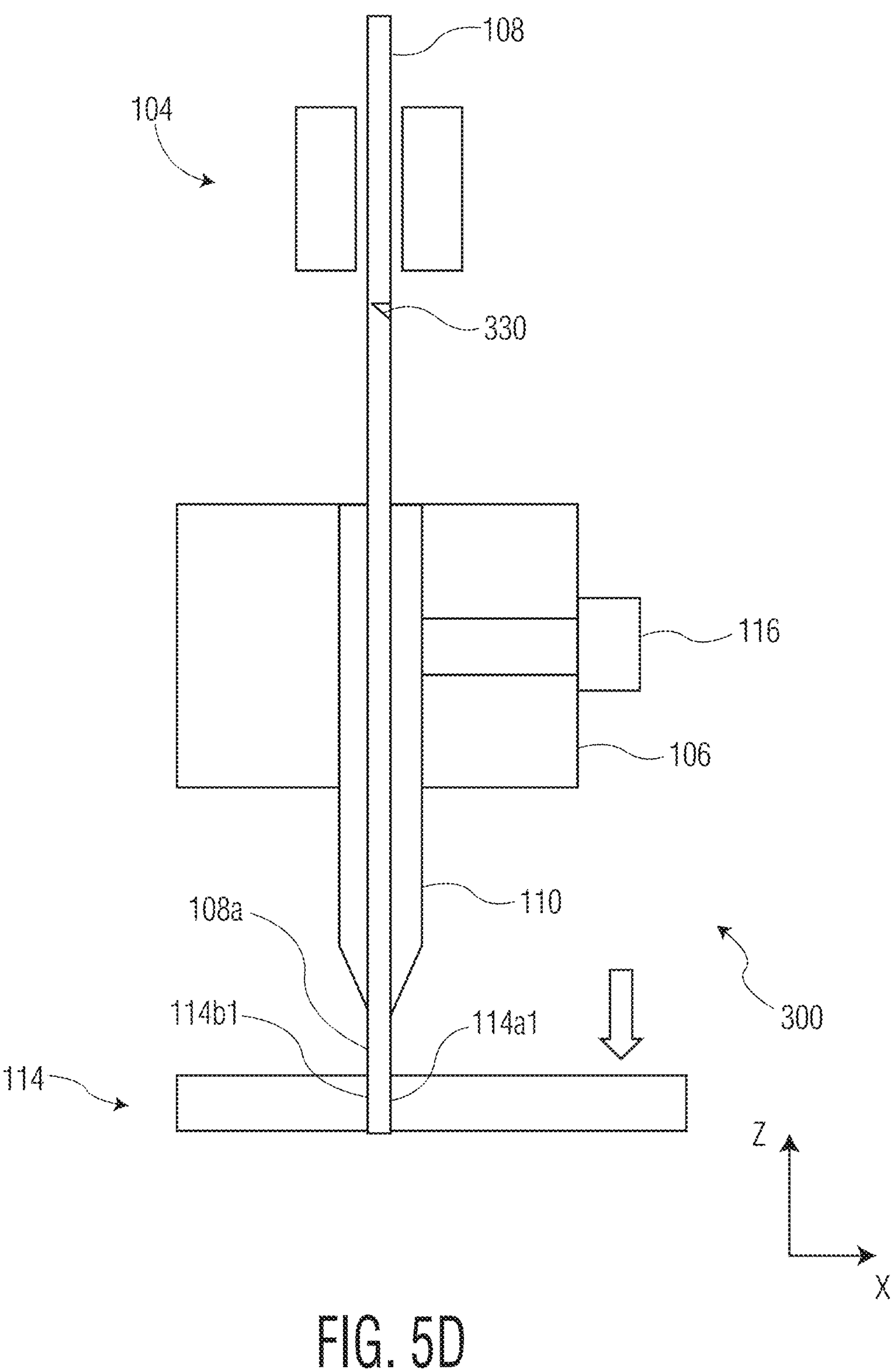

In FIG. 5D, incision 330 has been formed. Clamping mechanism 114 is illustrated having been moved (e.g., down along the z-axis) below wire bonding tool 110 and disposed adjacent wire supply 108. Clamping mechanism 114 has been positioned such that gripping portions 114*a*1/114*b*1 are contacting and clamping wire supply 108. Clamping mechanism 114 is illustrated moving farther downward (i.e., along the z-axis) in connection with a feeding operation. Such a feeding operation can be repeated for a plurality of cycles (e.g., two cycles, three cycles, etc.). Such a feeding operation includes opening and closing wire clamp 104 in connection with each cycle.

Figure 5E:
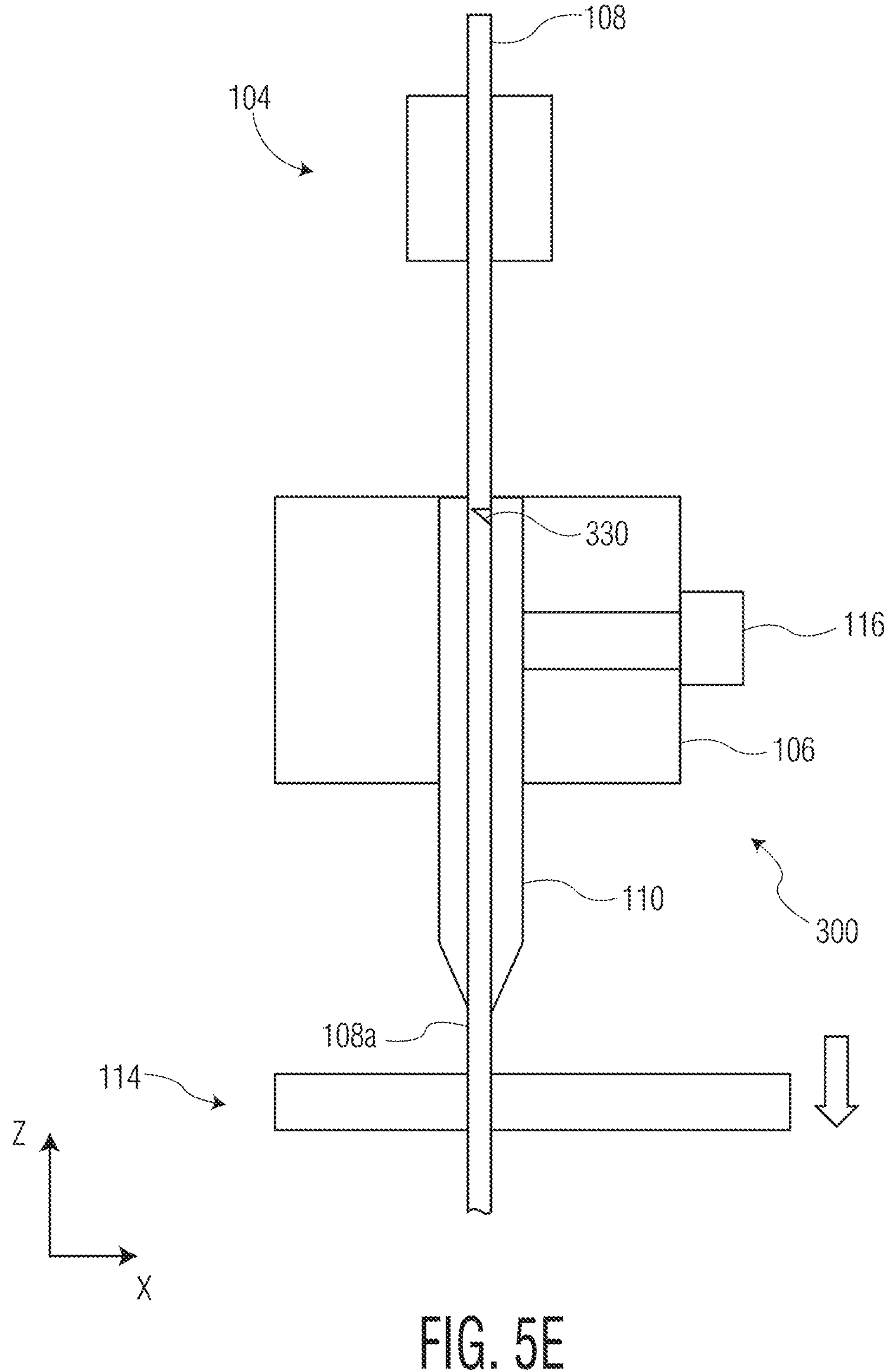

In FIG. 5E, the feeding operation has been completed, and incision 330 is approximately aligned with the top of wire bonding tool 110. Wire clamp 104 is closed and clamping mechanism 114 can pull on wire portion 108*a* (e.g., along the z-axis) such that wire supply 108 breaks at incision 330.

Figure 5F:
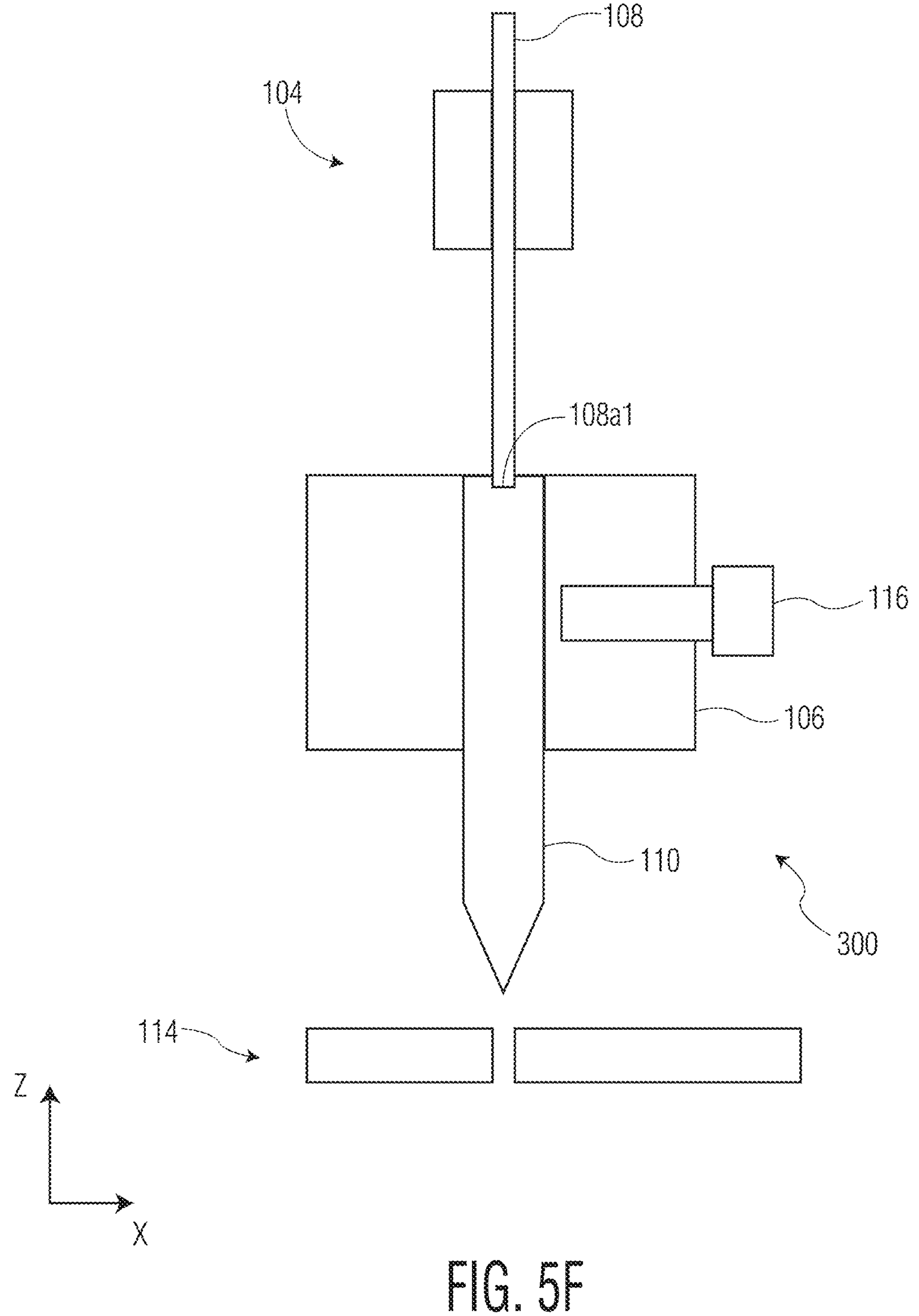

In FIG. 5F, wire portion 108*a* has been removed, thereby forming a new wire end portion 108*a*1. The removed wire portion 108*a* may be disposed of in a receptacle (e.g., for waste, such as used wire bonding tools or wire) of wire replacement system 112*b* (e.g., receptacle 120*a* of FIG. 1D).

Figure 5G:
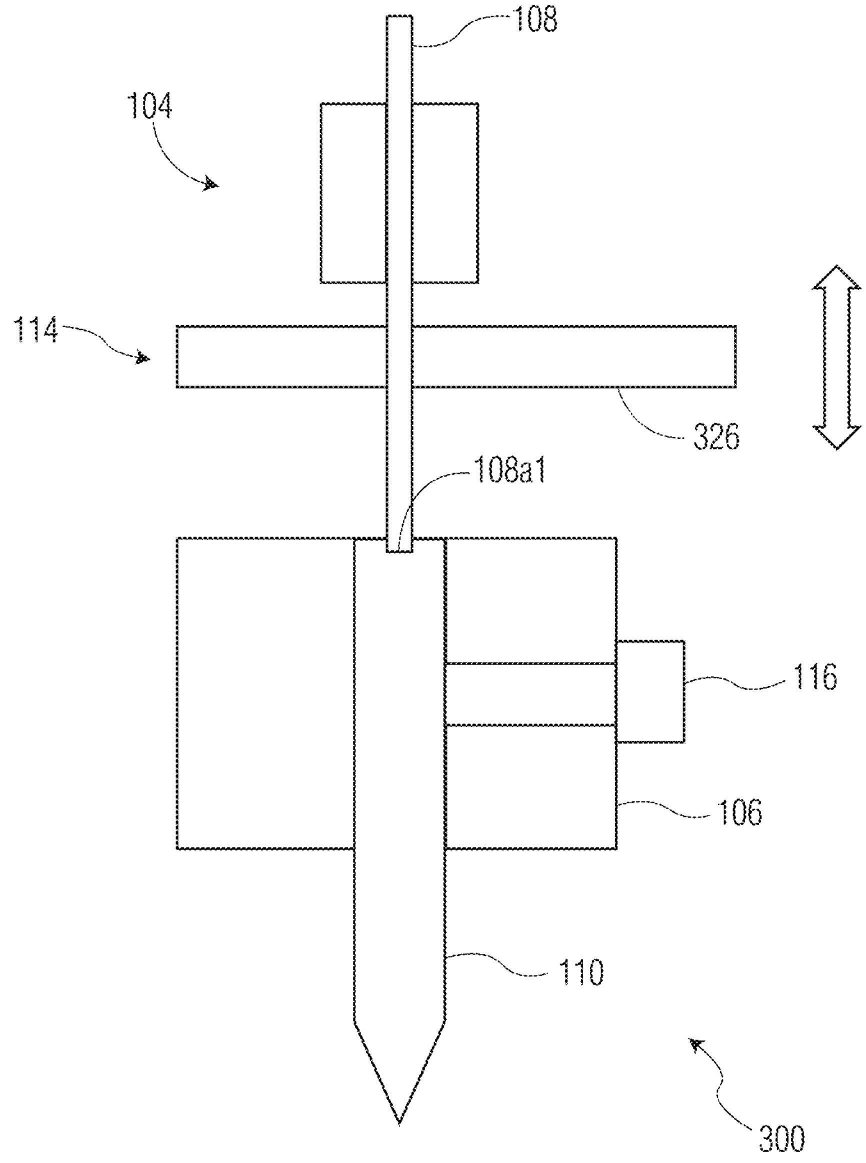
Figure 5G:
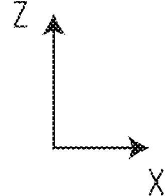

In FIG. 5G, another wire bonding tool 110 has been provided (e.g., using a process described in connection with FIGS. 1A-1F and/or FIGS. 3A-3H). Clamping mechanism 114 has been moved between wire clamp 104 and transducer 106 such that threading portion 326 is positioned to conduct a threading process. The threading process includes pulling an end portion of wire supply 108 through wire bonding tool 110 with clamping mechanism 114. For example, clamping mechanism 114 may grip the end portion of wire supply 108. Then, with wire clamp 104 open, clamping mechanism 114 may be moved such that the end portion of wire supply 108 is moved downward. Then, clamping mechanism 114 may open, wire clamp 104 may close, and clamping mechanism 114 may move upward relative to wire supply 108 and wire clamp 104. The threading process can be repeated for a plurality of cycles (e.g., two cycles, three cycles, etc.). Such a threading process includes opening and closing wire clamp 104 in connection with each cycle. Such a threading process is repeated until wire portion 108*a* extends to a desired length (e.g., such that wire portion 108*a* extends out from wire bonding tool 110; such that an adequate wire tail of a desired length is formed, etc.). At the end of the threading process, wire clamp 104 is closed.

Figure 5H:
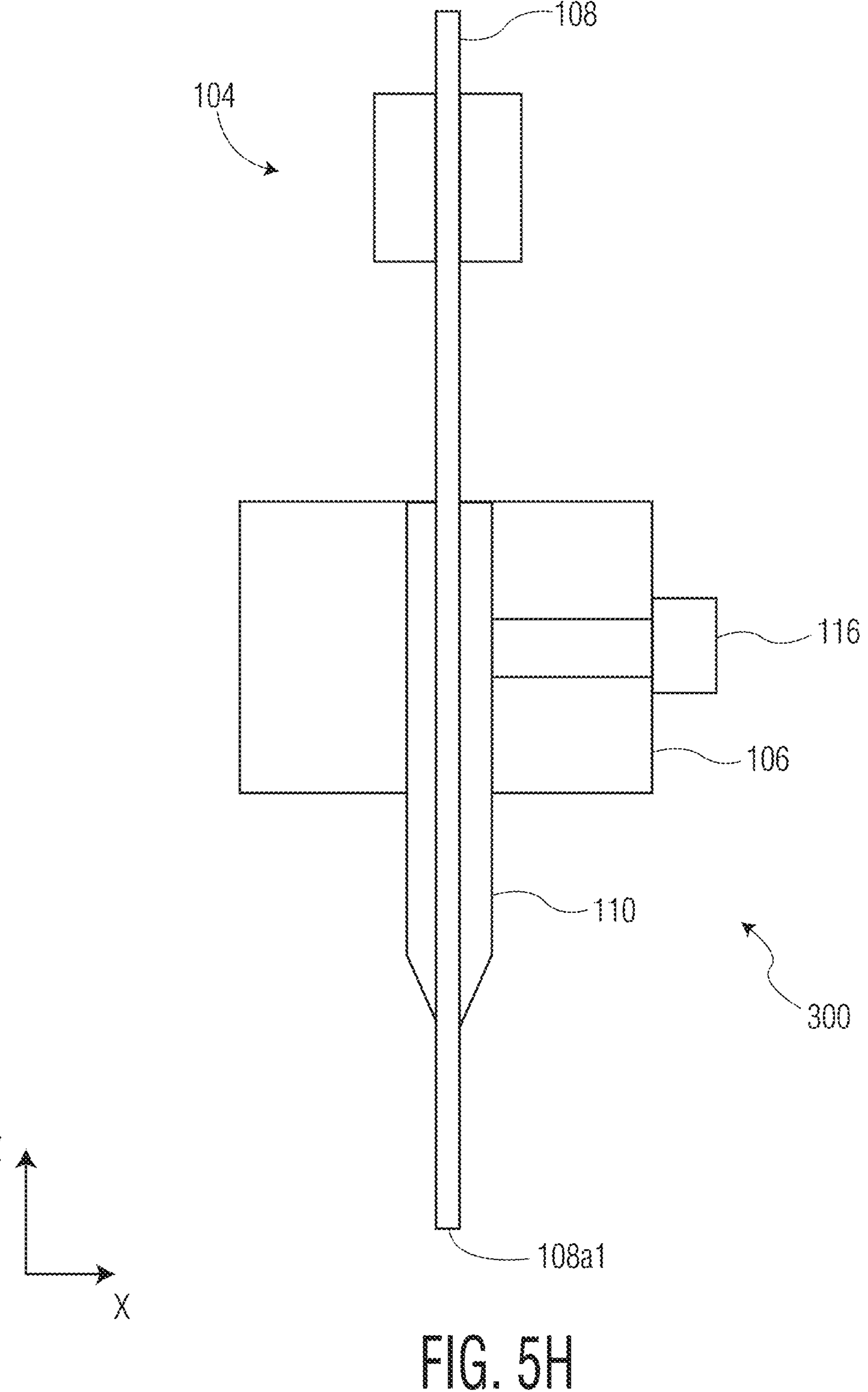

In FIG. 5H, the threading process has been concluded and new wire end portion 108*a*1 is now threaded through wire bonding tool 110.

While FIGS. 4A-4D and 5A-5H illustrate and describe a process of using a half-cut to facilitate the removal of a portion of a wire during a wire bonding tool replacement process, the invention is not so limited. FIGS. 6A-6E illustrate an exemplary process of removing a portion of a wire from a wire bonding tool without cutting the wire on a wire bonding system 600. Each of FIGS. 6A-6E illustrate wire supply 108 disposed through: (i) a clamping mechanism 114' of wire replacement system 112*b*'; (ii) bond head assembly 102, including wire clamp 104 and transducer 106; and (iii) wire bonding tool 110 (before wire supply 108 is removed from wire bonding tool 110).

Figure 6A:
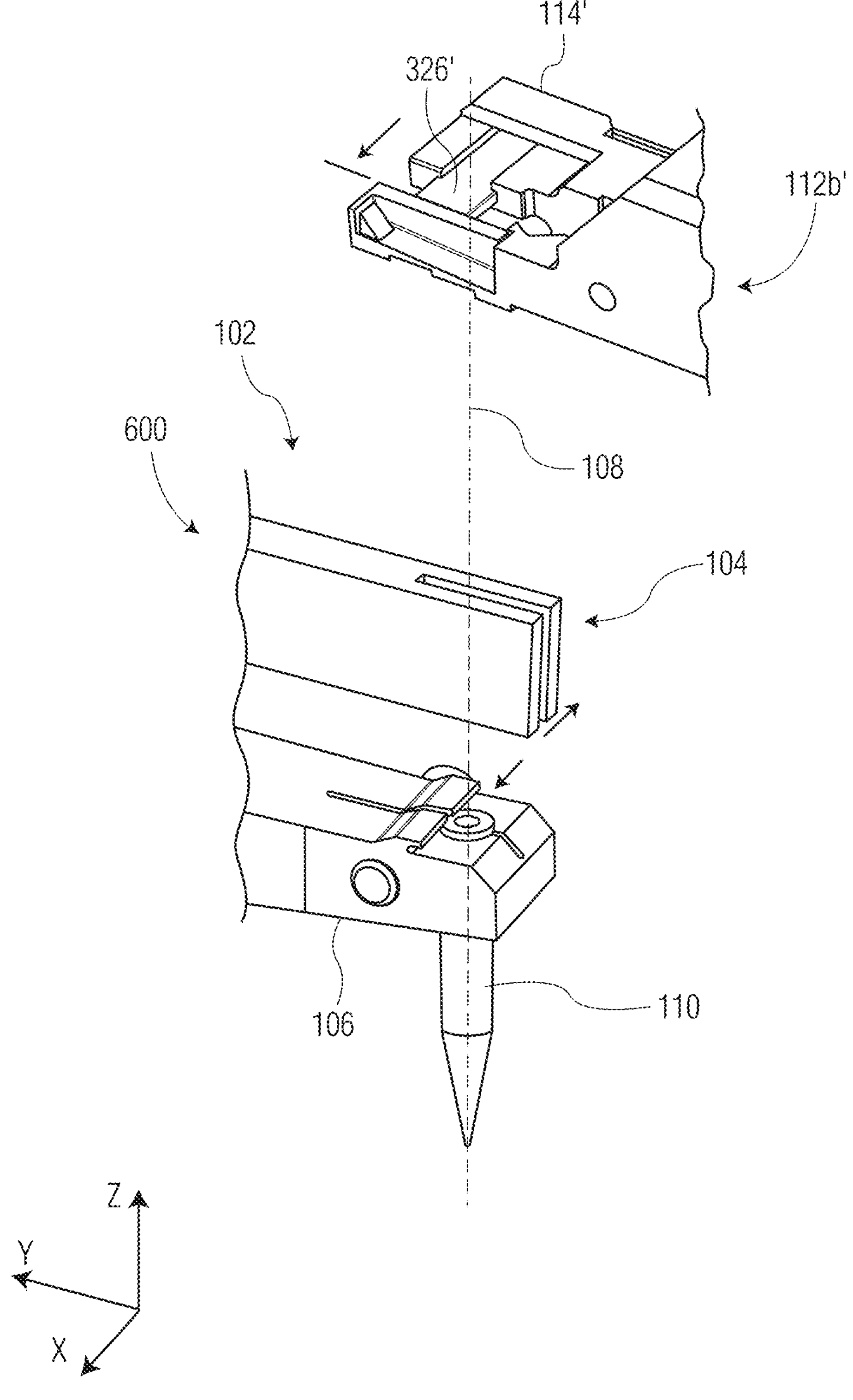
FIGS. 6A-6E are various perspective views illustrating a wire bonding system in accordance with another exemplary embodiment of the invention.

In FIG. 6A, wire replacement system 112*b*' is positioned above bond head assembly 102. Clamping mechanism 114' of wire replacement system 112*b*' is engaged against wire supply 108, preventing wire supply 108 from moving relative to clamping mechanism 114' (e.g., a moving/actuating clamp portion is pressing wire supply 108 against a fixed clamp portion). Wire clamp 104 is in an open position, allowing wire supply 108 to pass through freely.

Figure 6B:
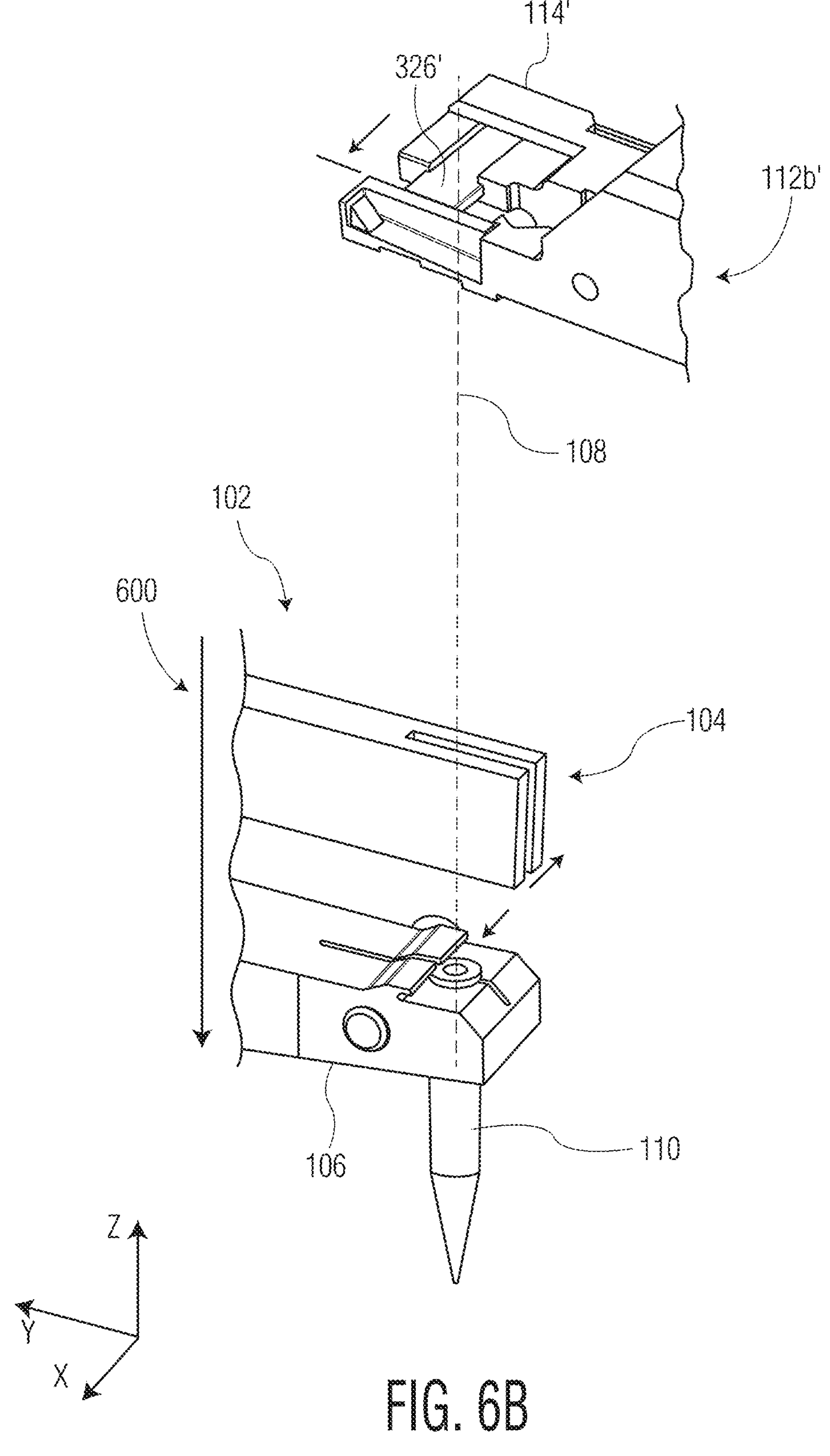

In FIG. 6B, bond head assembly 102, including wire clamp 104, transducer 106, and wire bonding tool 110, moves downward (i.e., away from clamping mechanism 114'). Since wire clamp 104 is open, bond head assembly 102 and transducer 106 pass over wire supply 108, allowing an end of wire supply 108 to move upward relative to wire bonding tool 110.

Figure 6C:
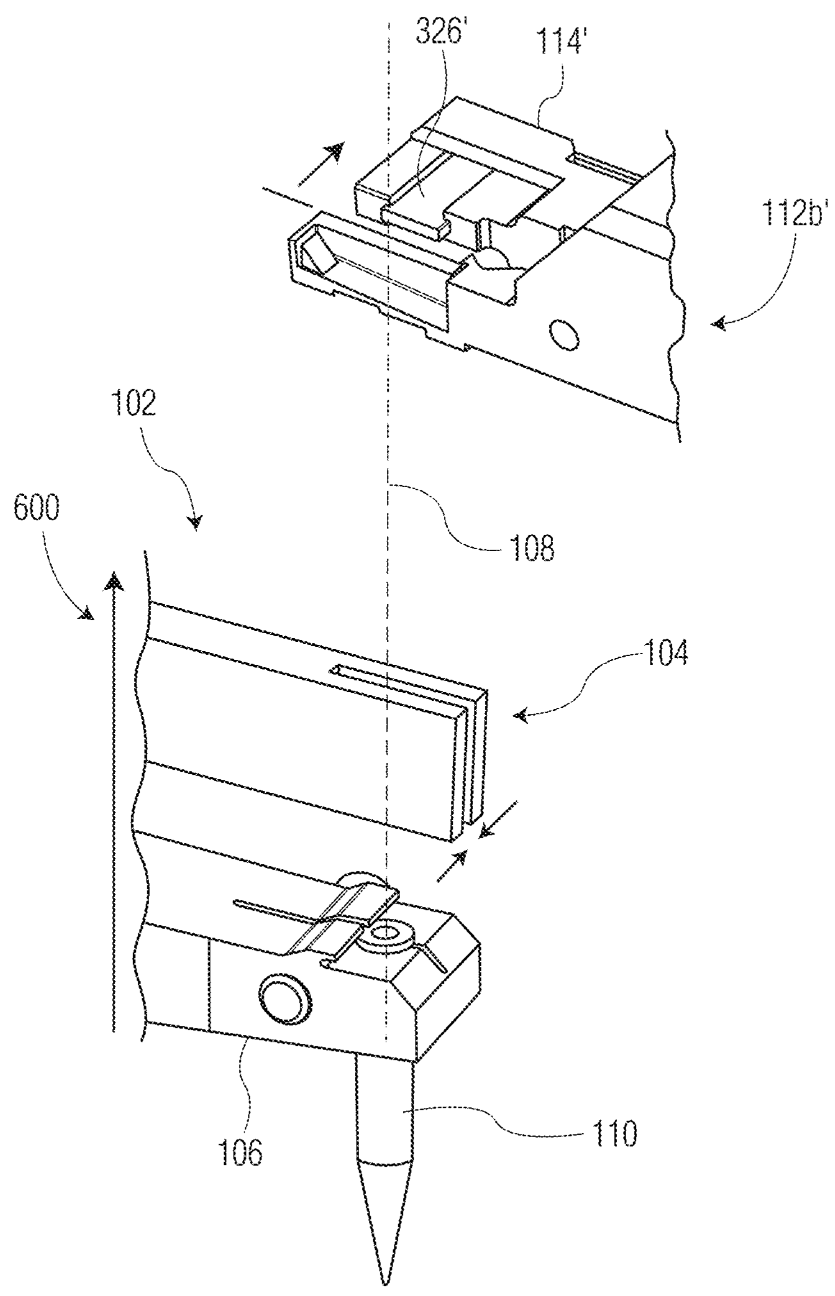
Figure 6C:
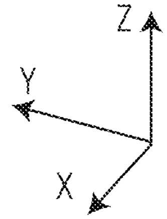

In FIG. 6C, clamping mechanism 114' is open, allowing wire supply 108 to move through clamping mechanism 114'. Wire clamp 104 is closed, preventing wire supply 108 from moving relative to bond head assembly 102. Bond head assembly 102 is moved upward toward clamping mechanism 114'. Since wire clamp 104 is closed, wire supply 108 moves upward with bond head assembly 102 and through clamping mechanism 114'.

Figure 6D:
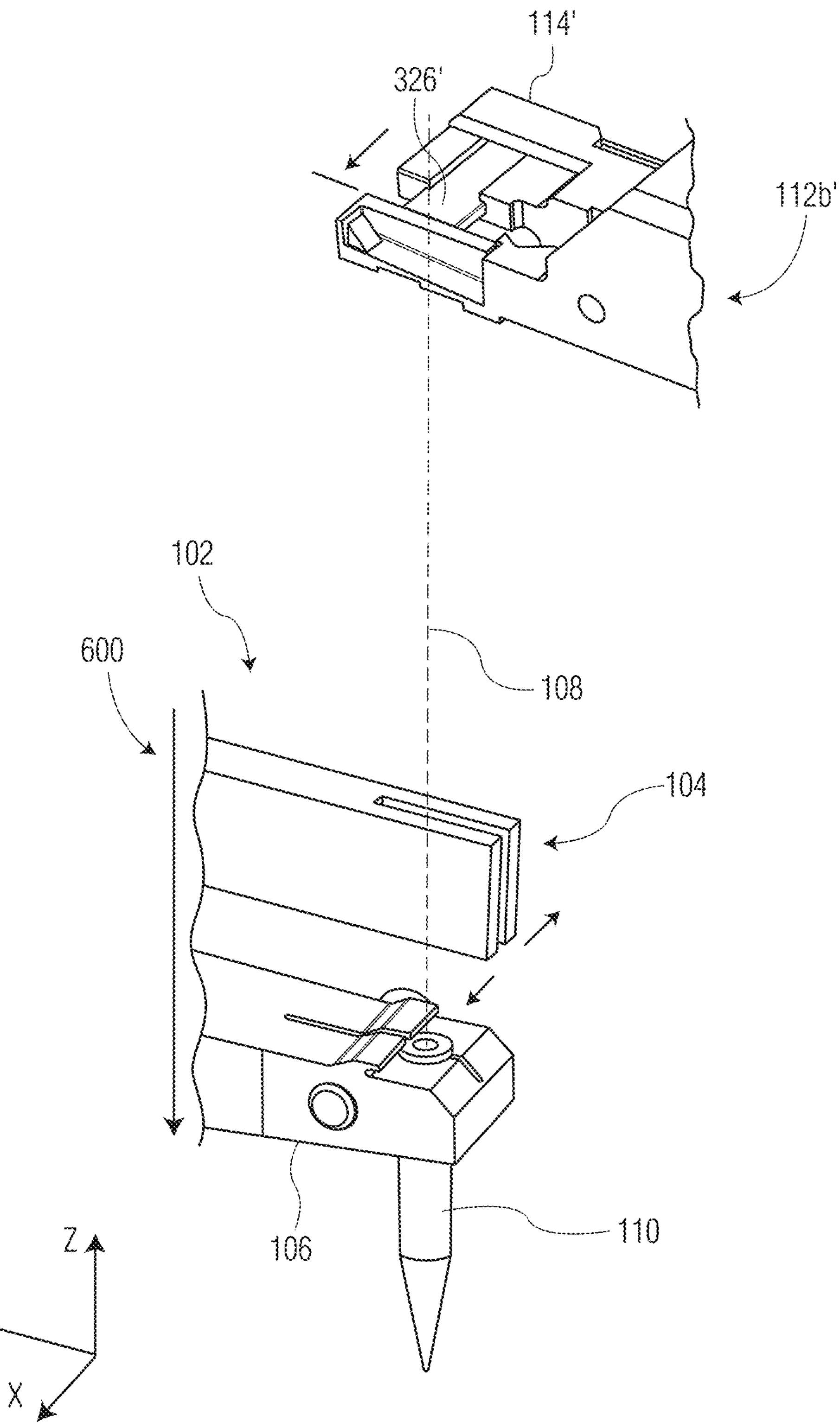

In FIG. 6D, clamping mechanism 114' is closed again, and wire clamp 104 is opened. Bond head assembly 102 is moved downward, allowing wire supply 108 to pass through wire bonding tool 110 until wire supply 108 is removed (e.g., fully removed) from wire bonding tool 110.

Figure 6E:
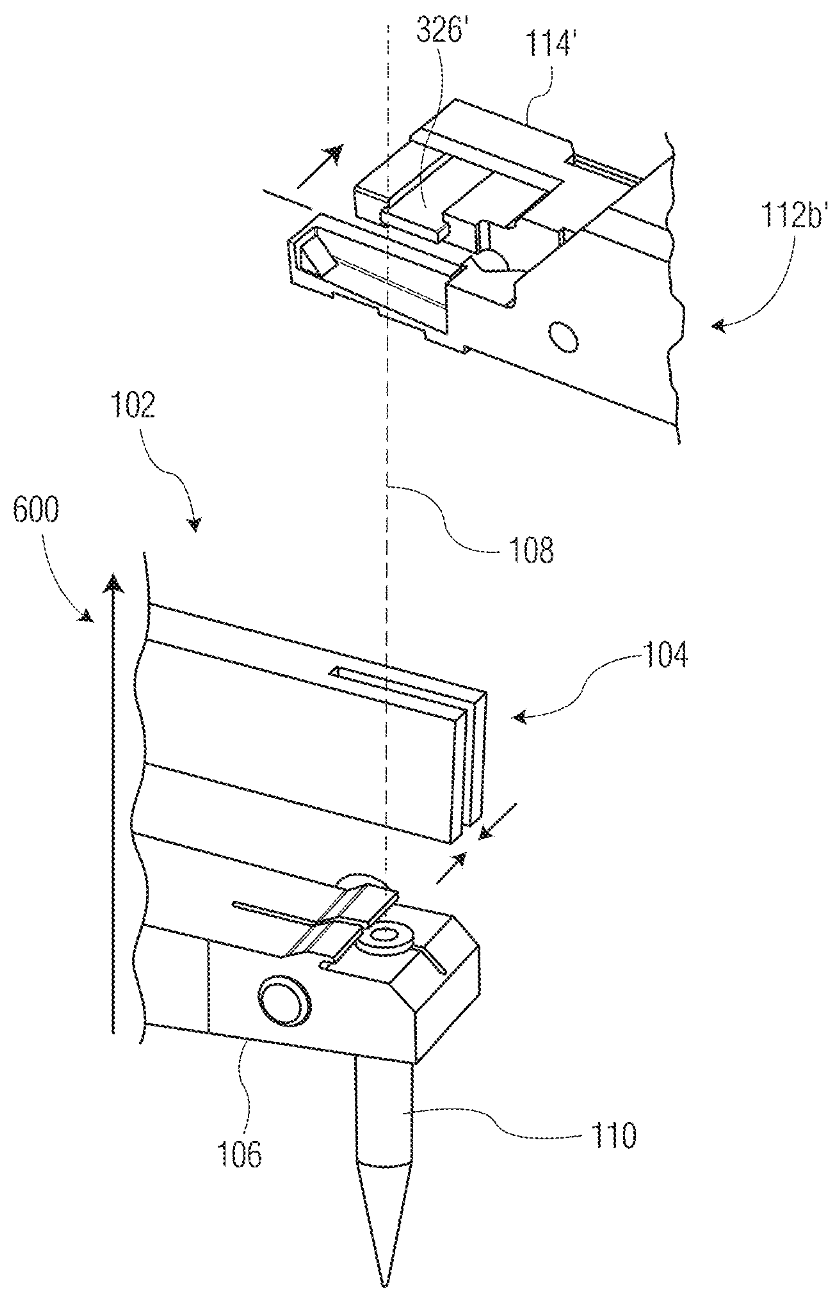
Figure 6E:
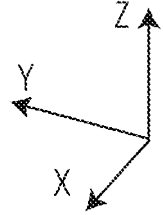

In FIG. 6E, wire supply 108 is removed from wire bonding tool 110 such that wire bonding tool 110 may be removed and replaced as described herein (e.g., see FIGS. 1A-1F, FIGS. 2A-2B, and FIGS. 3A-3H). Further, wire supply 108 can be rethreaded/replaced through wire bonding tool 110 (e.g., see FIGS. 4D and 5G, described herein) after the process described in connection with FIGS. 6A-6D.

FIGS. 7A-7F illustrate various cross-sectional block diagrams of portions of wire bonding system 600 and/or wire replacement system 112*b*', in connection with certain exemplary embodiments of the invention. FIGS. 7A-7F illustrate a similar process as illustrated in FIGS. 6A-6E.

Figure 7A:
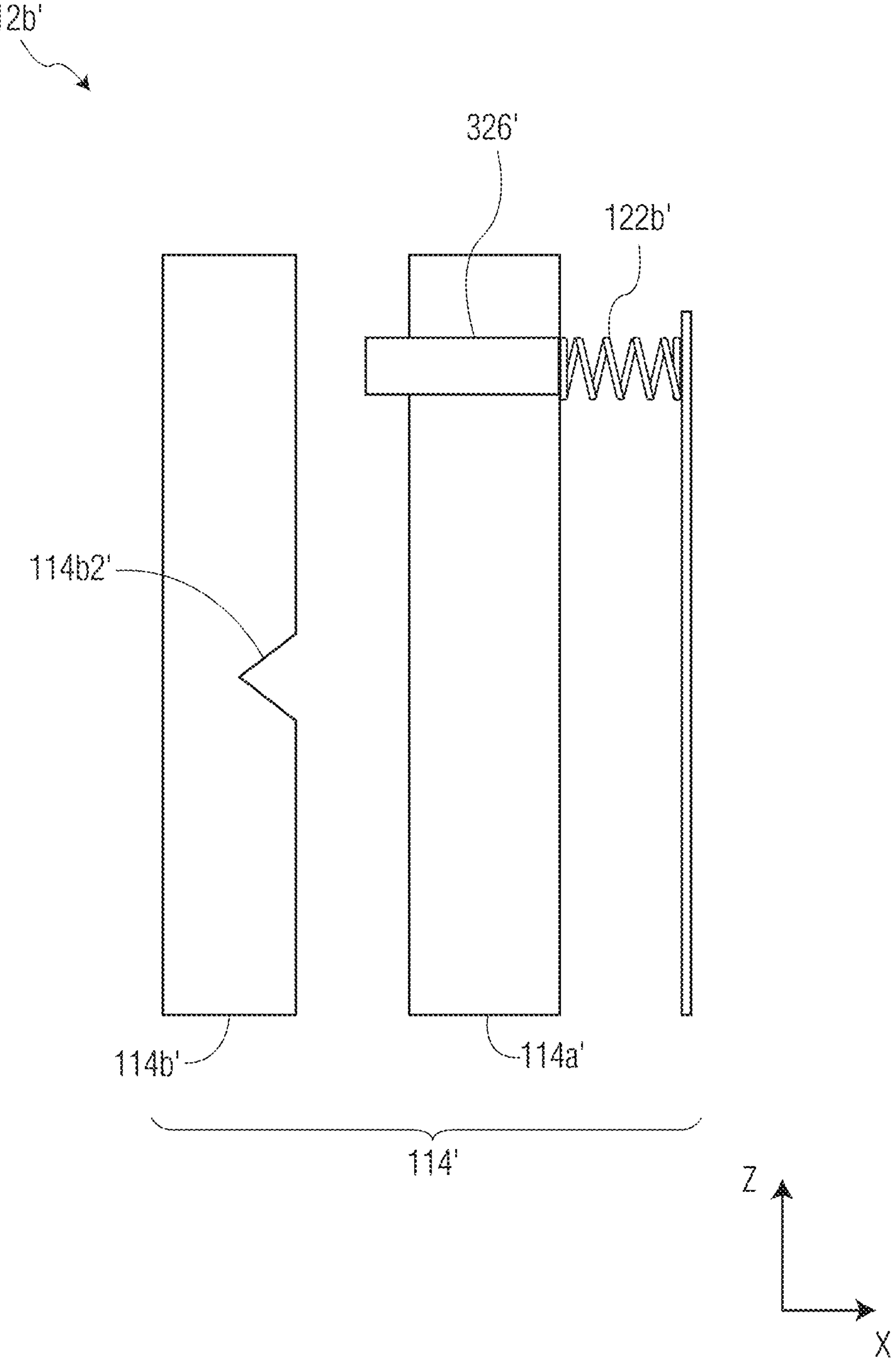
FIGS. 7A-7F are various block diagram side views of elements of the wire bonding system of FIGS. 6A-6E.

FIG. 7A illustrates wire replacement system 112*b*'. Wire replacement 112*b*' includes clamping mechanism 114', which includes a first clamp portion 114*a*' (a moving clamp portion) and a second clamp portion 114*b*' (a fixed clamp portion). First clamp portion 114*a*' includes a threading portion 326'. Threading portion 326' is actuated by a spring 122*b*' (e.g., a leaf spring). Second clamp portion 114*b*' includes a tool clamping portion 114*b*2' for gripping wire bonding tool 110.

Figure 7B:
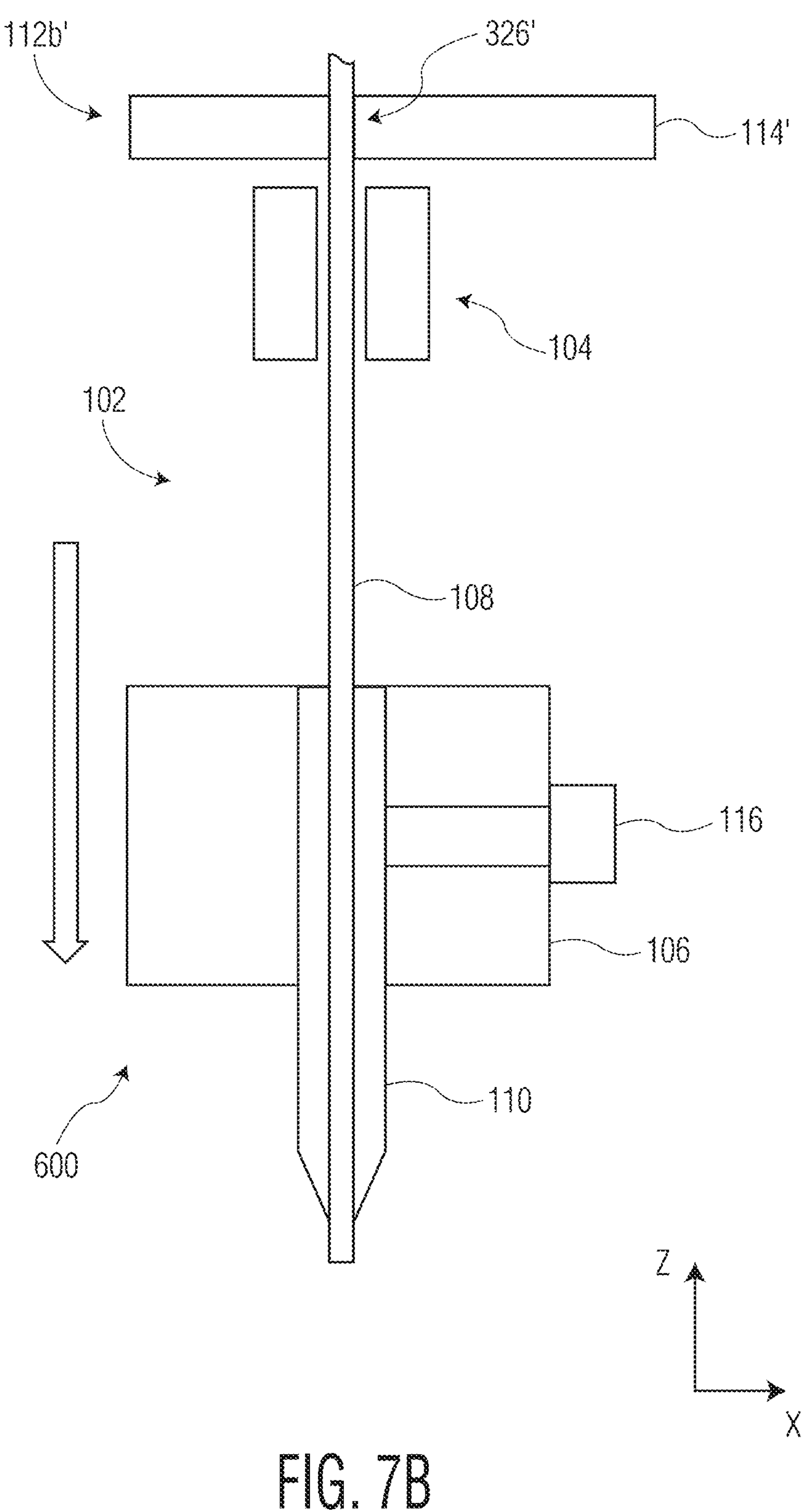

In FIG. 7B, wire supply 108 is illustrated as being engaged by threading portion 326' of clamping mechanism 114' at a position above wire clamp 104. Wire clamp 104 is open. Thus, wire supply 108 cannot move relative to clamping mechanism 114', but bond head assembly 102 (including wire clamp 104, transducer 106, and wire bonding tool 110) can move relative to wire supply 108. FIG. 7B illustrates bond head assembly 102 as it is beginning downward motion. Such a downward motion will result in wire supply 108 moving upward relative to bond head assembly 102.

Figure 7C:
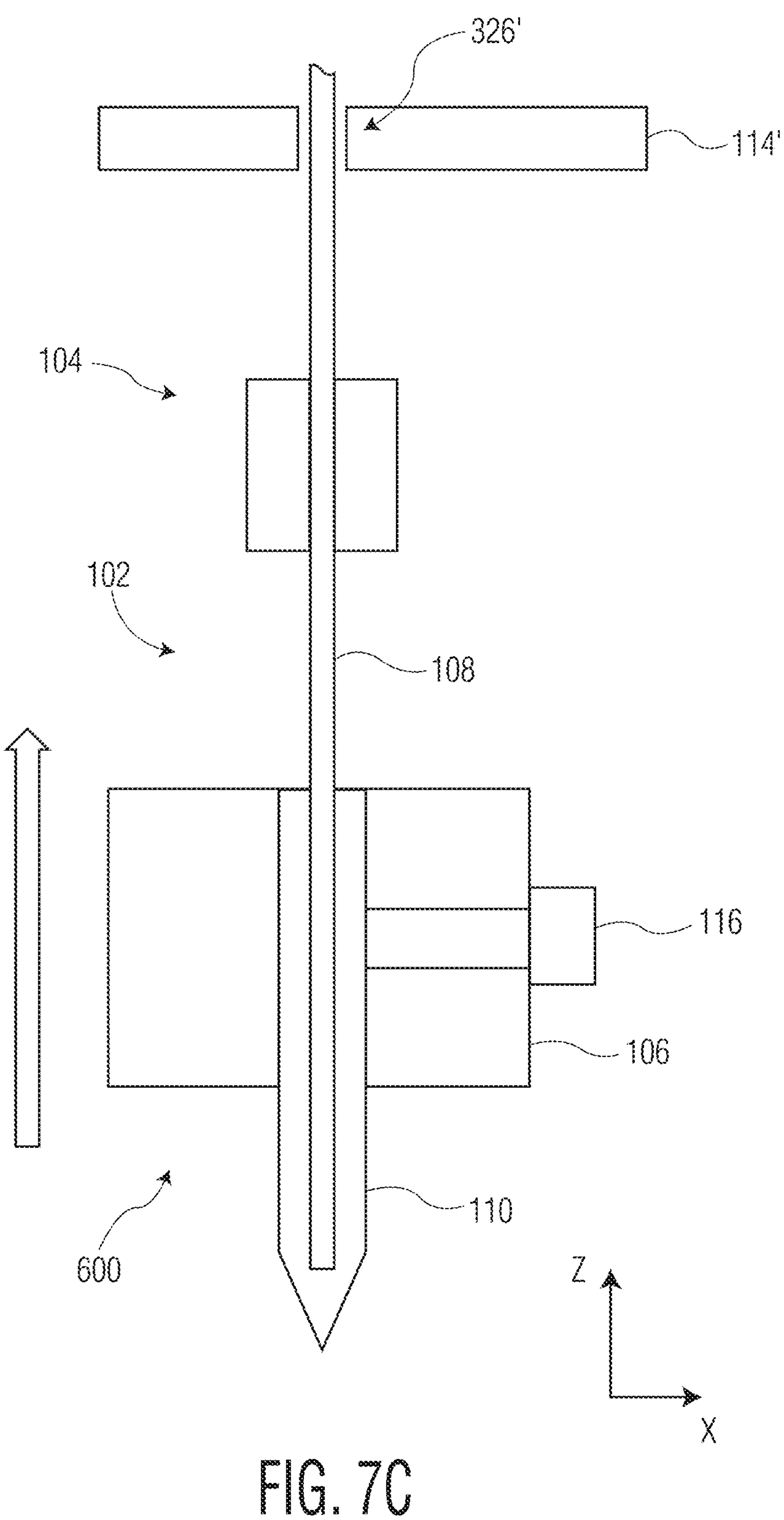

In FIG. 7C, bond head assembly 102 has moved down relative to wire supply 108 (i.e., wire supply 108 is no longer completely threaded through wire bonding tool 110, as in FIG. 7B). Clamping mechanism 114' is now open, and wire clamp 104 is now closed. Thus, wire supply 108 can move relative to clamping mechanism 114', and motion of bond head assembly 102 will be transferred to wire supply 108. FIG. 7C illustrates bond head assembly 102 as it is beginning upward motion. Such an upward motion will result in bond head assembly 102 and wire supply 108 moving upward relative to clamping mechanism 114'. Such an upward motion of the wire may be facilitated by an air guide of wire bonding system 600 (not illustrated).

Figure 7D:
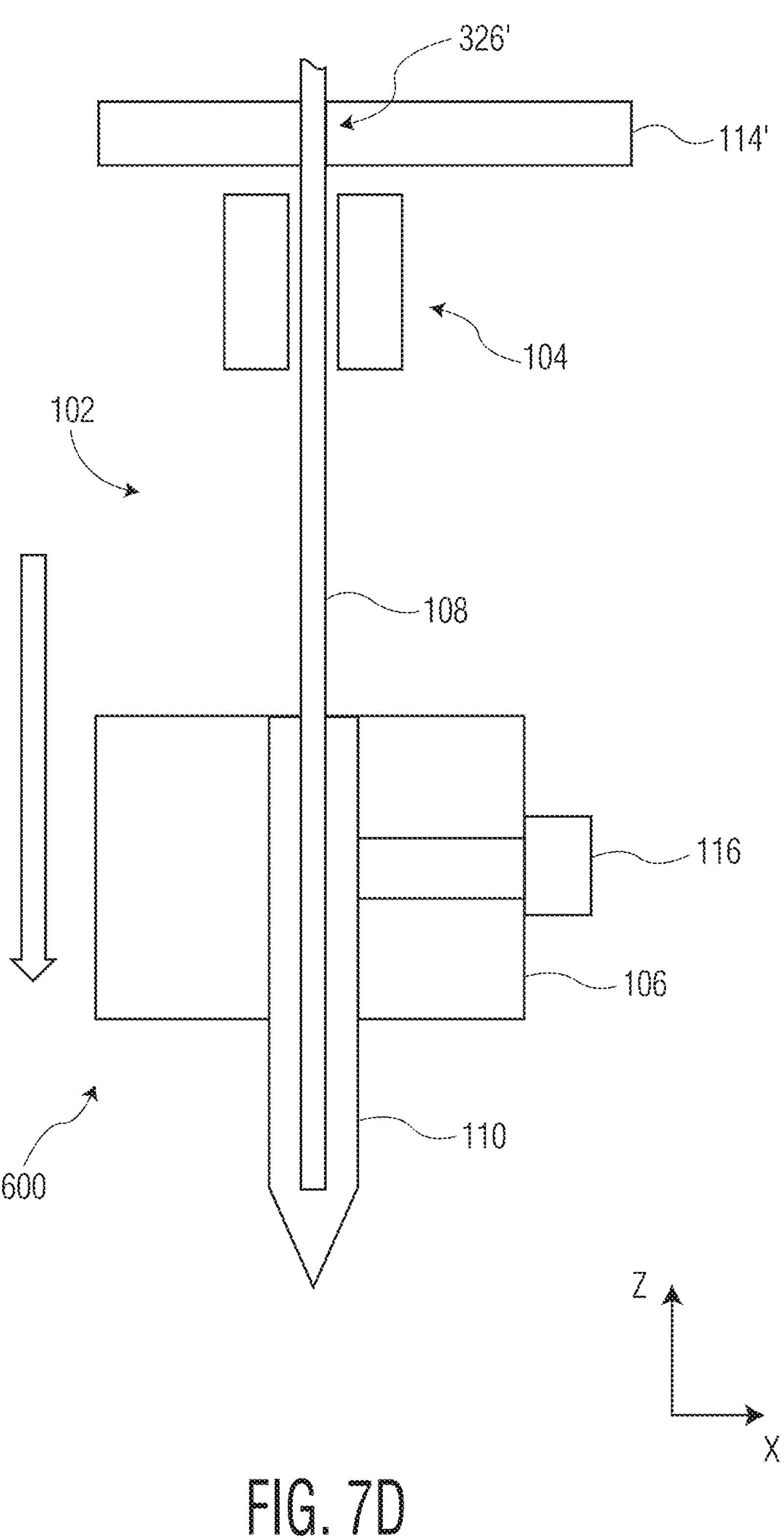
Figure 7E:
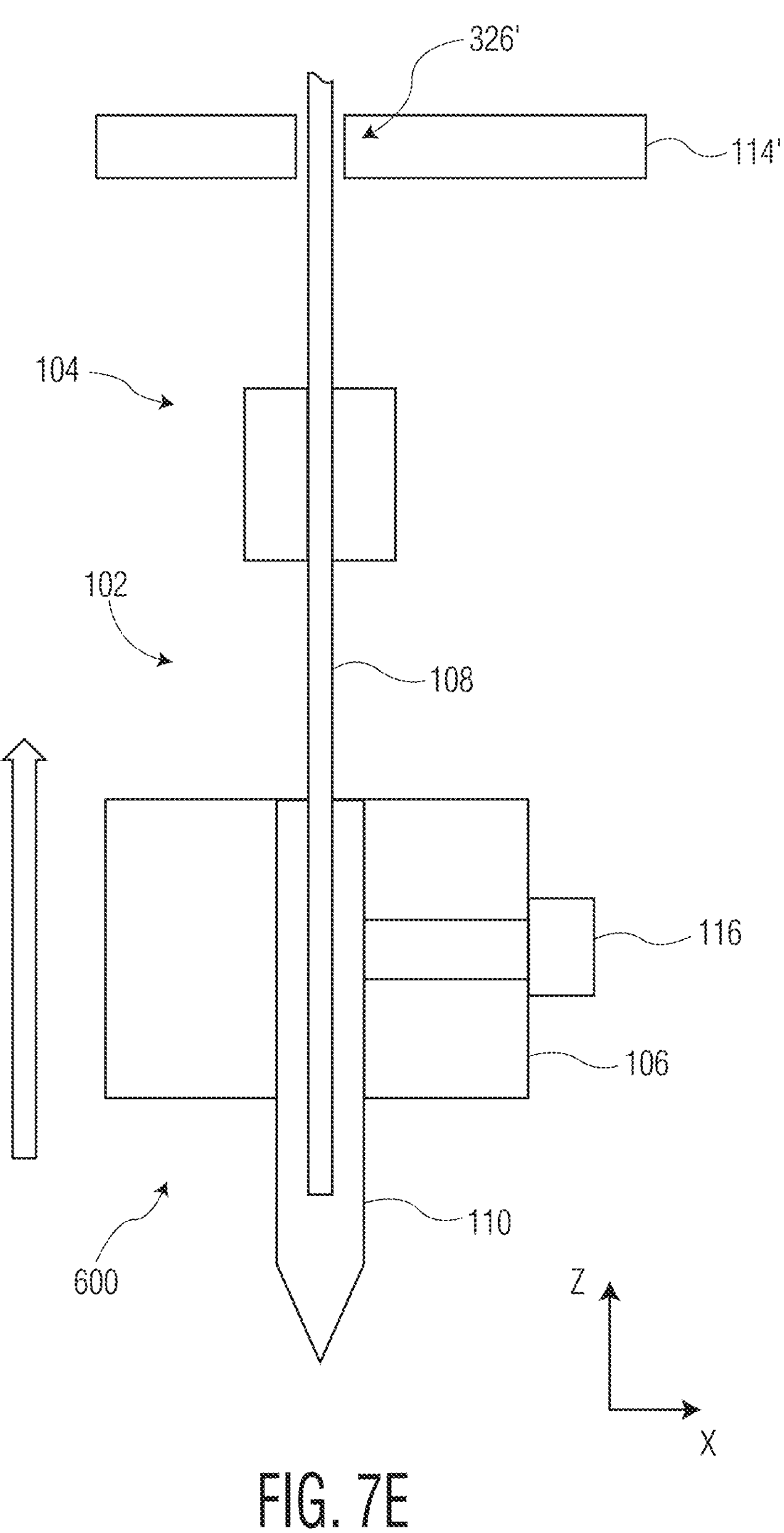

FIG. 7D illustrates bond head assembly 102 having been moved upward. Clamping mechanism 114' is again closed, and wire clamp 104 is again open. Bond head assembly 102 is beginning a downward motion, such that bond head assembly 102 will move downward relative to wire supply 108 and clamping mechanism 114'. FIG. 7E illustrates bond head assembly 102 having moved downward, with wire supply 108 have been further removed from wire bonding tool 110.

Figure 7F:
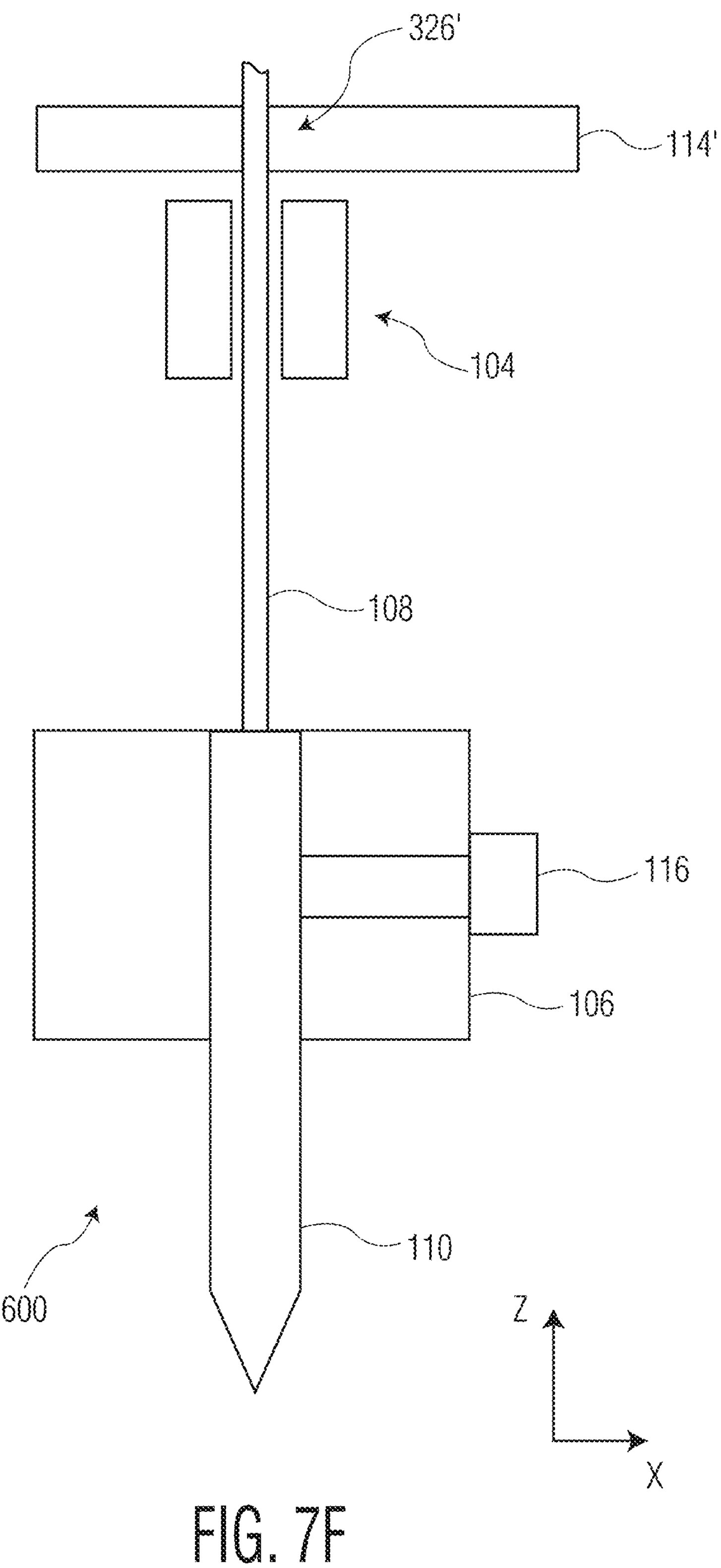

The process illustrated in FIGS. 7B-7E may be repeated several times until wire supply 108 is completely removed from wire bonding tool 110. Such a position is illustrated in FIG. 7F. After wire supply 108 is removed from wire bonding tool 110, wire bonding tool 110 may be replaced with another wire bonding tool 110 (e.g., as illustrated in FIGS. 1A-1F, 2A-2B, and 3A-3H), and wire replacement system 112*b*' may replace wire supply 108 by threading it into wire bonding tool 110 (e.g., as illustrated in FIGS. 4D and 5G-5H).

Figure 8A:
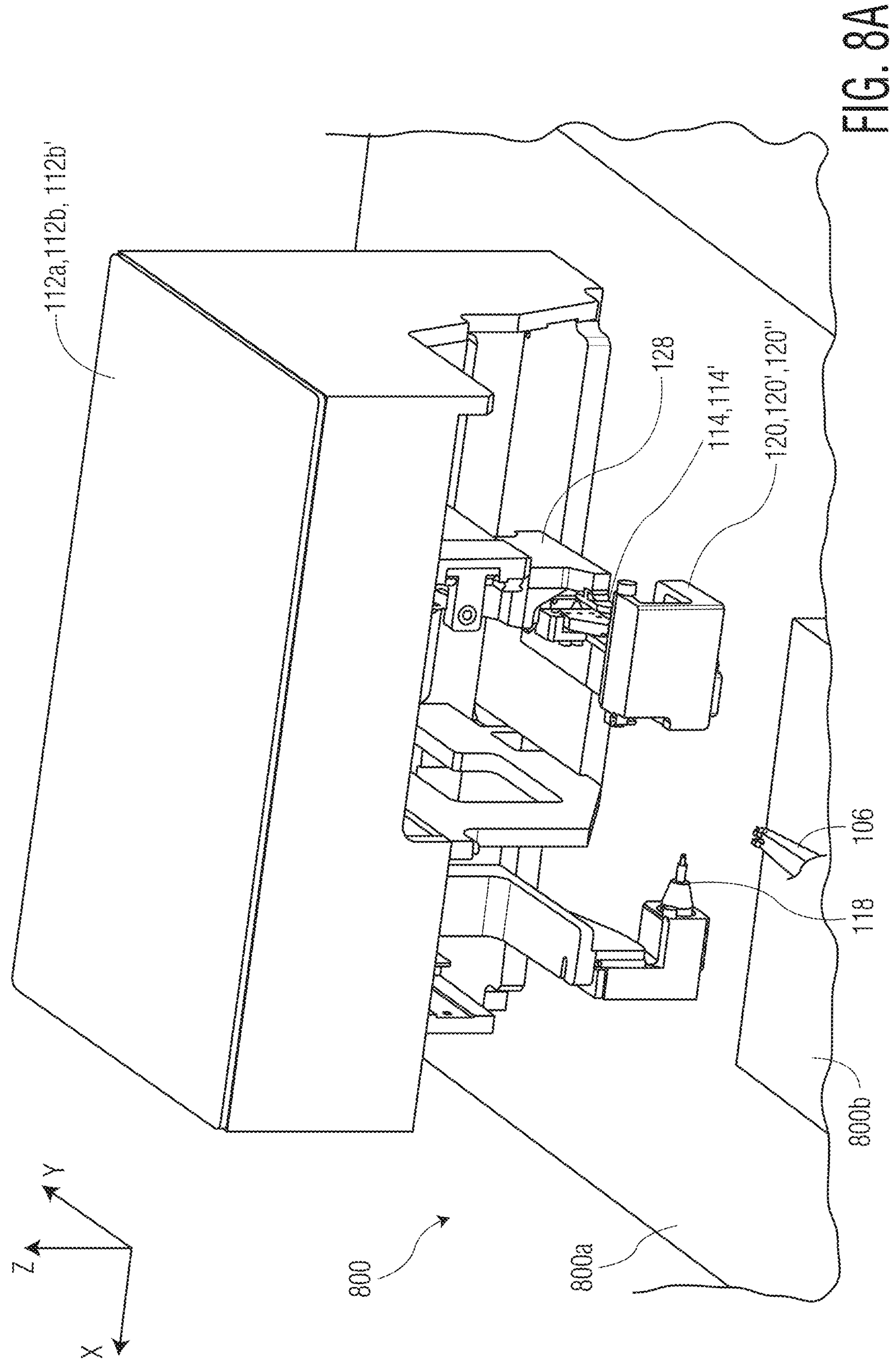
FIGS. 8A and 8B are perspective views illustrating yet another wire bonding system in accordance with an exemplary embodiment of the invention.
Figure 8B:
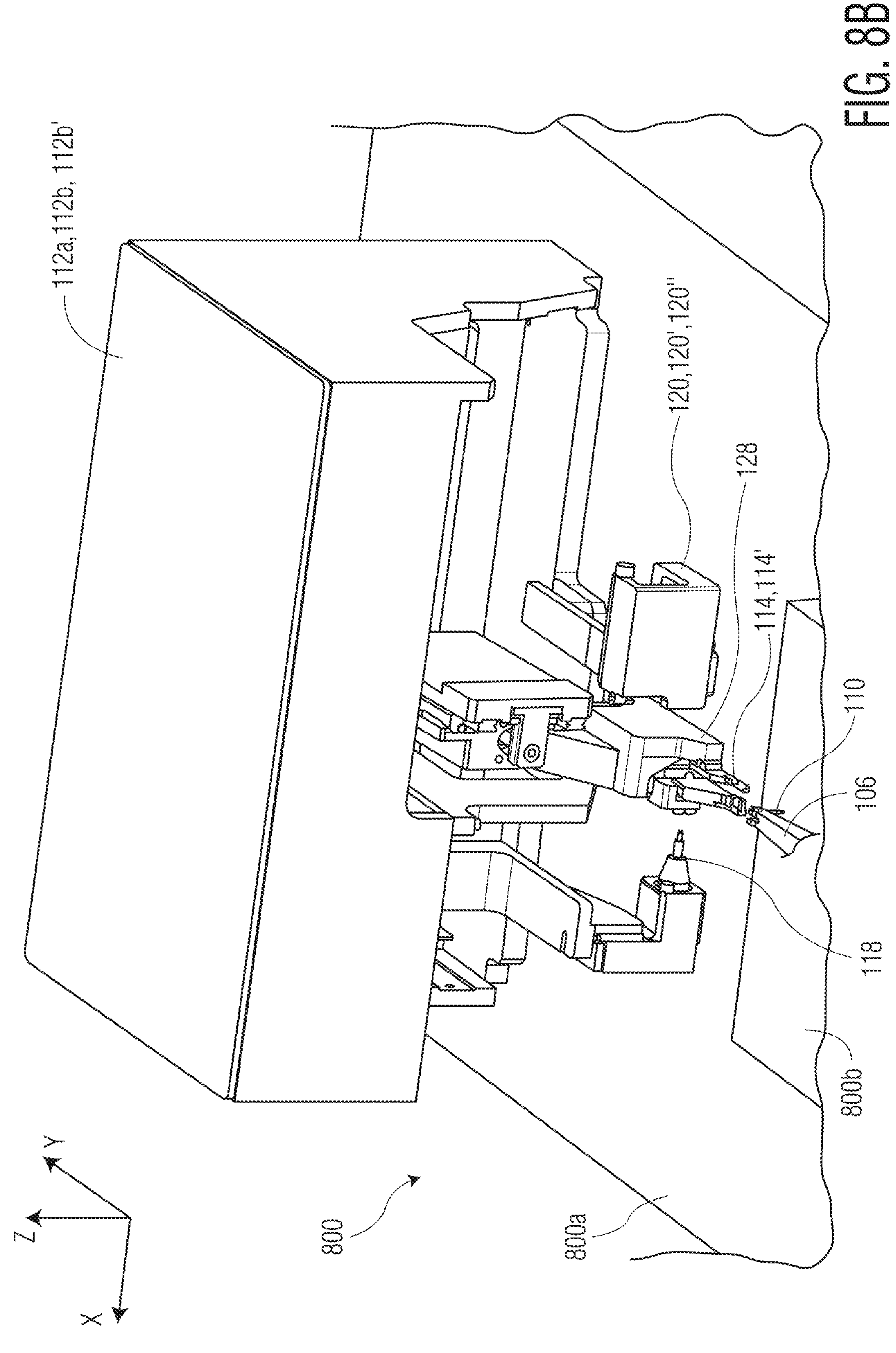

Referring now to FIGS. 8A and 8B, a wire bonding system 800 is illustrated. As illustrated, wire bonding system 800 may include any of wire bonding tool replacement system 112*a*, wire replacement system 112*b*, or wire replacement system 112*b*'. It should be understood that wire bonding tool replacement system 112*a* shares many of the same elements and aspects as a wire replacement system 112*b* and 112*b*' described elsewhere herein (e.g., FIGS. 4A-4D, FIGS. 5A-5H, etc.).

In FIGS. 8A and 8B, wire bonding tool replacement system 112*a* (or wire replacement system 112*b*, 112*b*') is retrieving wire bonding tool 110 from wire bonding tool source 120, 120', 120" and installing wire bonding tool 110 into transducer 106. A support structure 800*b* is configured to support a workpiece during a wire bonding operation. Support structure 800*b* and wire bonding tool replacement system 112*a* (or wire replacement system 112*b*, 112*b*') are supported by a machine base 800*a*. Wire bonding tool replacement system 112*a* (or wire replacement system 112*b*, 112*b*') is illustrated as including (i) clamping mechanism 114/114' carried by moveable arm assembly 128, (ii) wrench 118, and (iii) wire bonding tool source 120, 120', 120".

In FIG. 8A, moveable arm assembly 128 is illustrated at wire bonding tool source 120, 120', 120". In such a position, clamping mechanism 114/114' may be picking a new wire bonding tool 110 (e.g., see FIGS. 1D, 2A, 2C, 3E, and 3F). In FIG. 8B, moveable arm assembly 128 has moved clamping mechanism 114/114' toward wire bonding tool 110 (e.g., to install wire bonding tool 110, as in FIGS. 1A-1F and 3A-3H, and/or to replace wire, as in FIGS. 4A-4D, 5A-5H, and 6A-6E). In FIG. 8B, wire bonding tool 110 has been installed into transducer 106 (e.g., see FIGS. 1E-1F).

It is contemplated that wire bonding tool replacement system 112*a* and/or wire replacement system 112*b*/112*b*' may be removeable from machine base 800*a*. For example, each of machine base 800*a* and wire bonding tool replacement system 112*a* may include, for example, (i) an electrical connector for power and/or data communication, and/or (ii) guide pins/locator holes for alignment.

In many operations performed by wire bonding tool replacement system 112*a* and/or wire replacement system 112*b*, 112*b*', high precision is required to prevent damage or errors (e.g., failing to grip the wire bonding tool, improperly threading the wire, misplacing another wire bonding tool, etc.). As such, it is contemplated that wire bonding tool replacement system 112*a* and/or wire replacement system 112*b*/112*b*' would include a positioning system to control the position of the clamping mechanism, the moveable arm assembly, and/or the wrench. Exemplary positioning systems may communicate with the wire bonding system. The wire bonding tool replacement system may be configured to provide feedback control in connection with the positioning system. The positioning system may be configured to utilize open/short circuit detection, servo controller feedback, and/or a vision system for positioning.

It is contemplated that a vision system of a wire bonding system may be used to determine the precise position of clamping mechanism 114/114' (and/or the moveable arm assembly, and/or the wrench) of wire bonding tool replacement system 112*a* and/or wire replacement system 112*b*/112*b*'. Such a use of a vision system is illustrated and described with reference to FIGS. 9A and 9B and may be utilized with any wire bonding tool replacement system or wire replacement system within the scope of the invention (e.g., wire bonding tool replacement system 112*a*, wire replacement system 112*b*/112*b*', etc.).

Figure 9A:
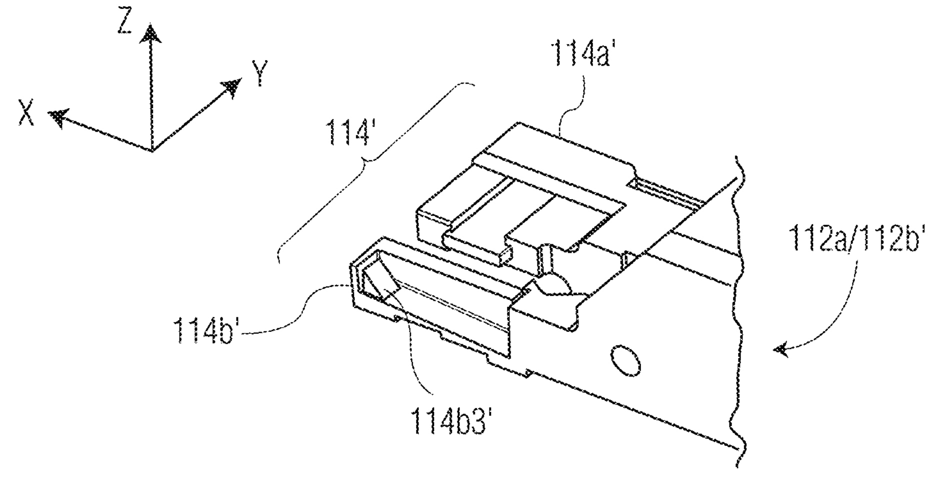
FIGS. 9A and 9B are perspective views illustrating elements of a wire bonding tool replacement system in accordance with an exemplary embodiment of the invention.
Figure 9B:
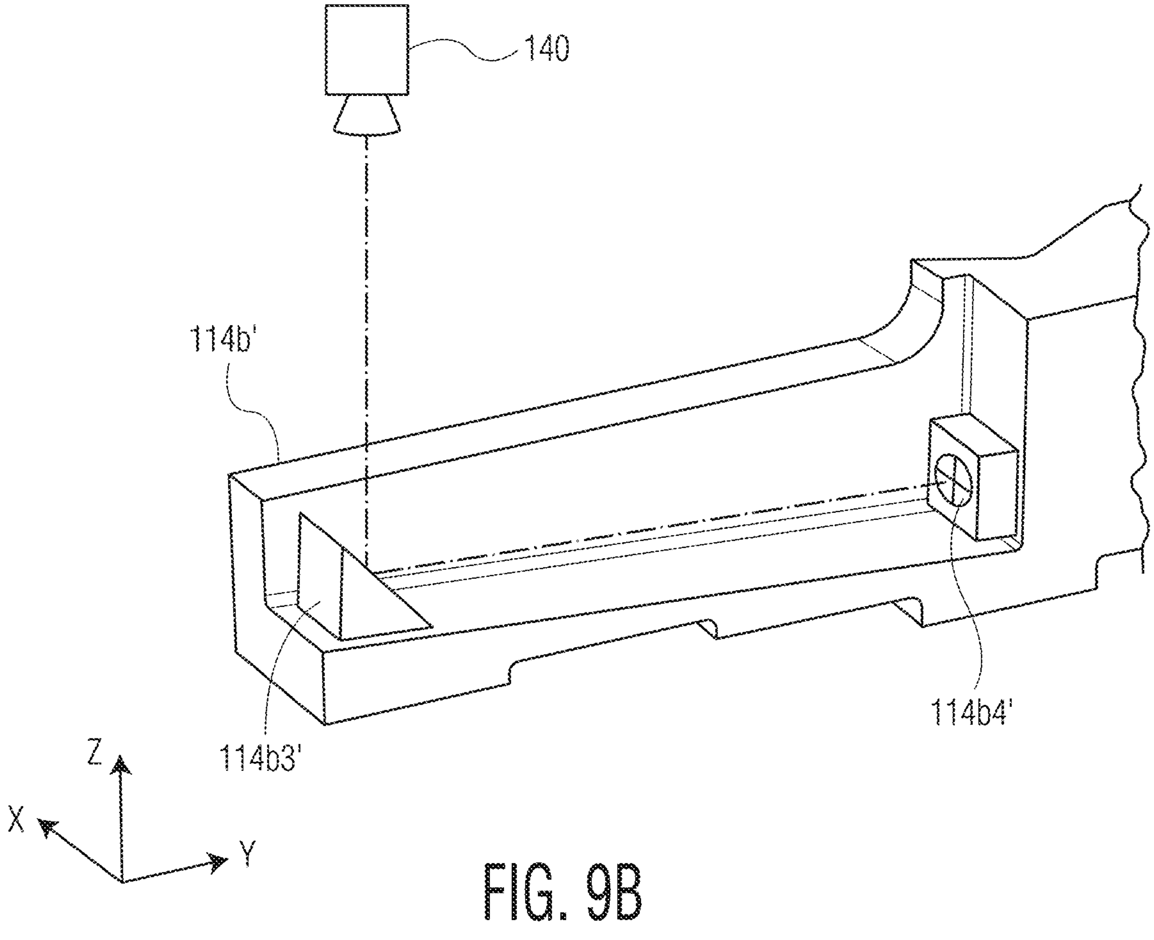

FIG. 9A illustrates certain common features of a wire bonding tool replacement system 112*a* and wire replacement system 112*b*', including clamping mechanism 114', first clamp portion 114*a*' (e.g., a moving clamp portion), and second clamp portion 114*b*' (e.g., a fixed clamp portion). FIG. 9A is provided for reference in relation to FIG. 9B. FIG. 9A and FIG. 9B illustrate a prism 114*b*3', described in greater detail with reference to FIG. 9B.

FIG. 9B illustrates additional detail of second clamp portion 114*b*'. An eye point 114*b*4' is disposed on second clamp portion 114*b*' and is oriented toward the wire bonding system (i.e., pointing toward the negative Y direction, as illustrated). Eye point 114*b*4' provides a reference feature for determining the location of clamping mechanism 114'. Eye point 114*b*4' is illustrated as having a particular image registration feature, but any image registration feature (e.g., a mark or other feature) may be used. Second clamp portion 114*b*' includes prism 114*b*3'. Prism 114*b*3' is configured to reflect an image of eye point 114*b*4' toward a vision system 140 of a wire bonding system. Prism 114*b*3' is a reflective optical element configured to reflect an image of eye point 114*b*4' at an angle of approximately 90° (e.g., within a range of 70°-110°). Vision system 140 includes a computer (or other processing means, not illustrated) configured to determine a location of eye point 114*b*4' (and thus, clamping mechanism 114') based on an image collected by vision system 140. Since eye point 114*b*4' is rigidly attached to clamping mechanism 114', the precise location of clamping mechanism 114' may be determined using images provided by vision system 140. Such position information may be used to determine the movements of clamping mechanism 114' during a wire bonding tool replacement process (e.g., as illustrated and described with respect to FIGS. 1A-1F and 3A-3H) and/or a wire replacement process (e.g., as illustrated and described with respect to FIGS. 4A-4D, 5A-5H, and 6A-6E).

FIGS. 9A-9B illustrate imaging of an eye point 114*b*4' (or other image registration feature) by providing a prism 114*b*3' in the optical path. For example, such a prism may be included to extend the working distance of the imaging path to provide a clear image of the eye point. However, it should be understood that a prism (or other reflective optical element) is not required. For example, a more direct imaging path may be utilized, without a prism or reflective optical element. In a specific example, a refracting optical element (e.g., glass, plastic, etc.) may be provided in the imaging path to reduce the working distance of the imaging path to provide a clear image of the eye point (or other image registration feature). Such a refracting optical element may be provided at (or adjacent) the eye point (or other image registration feature). Of course, other configurations are contemplated.

Figure 10:
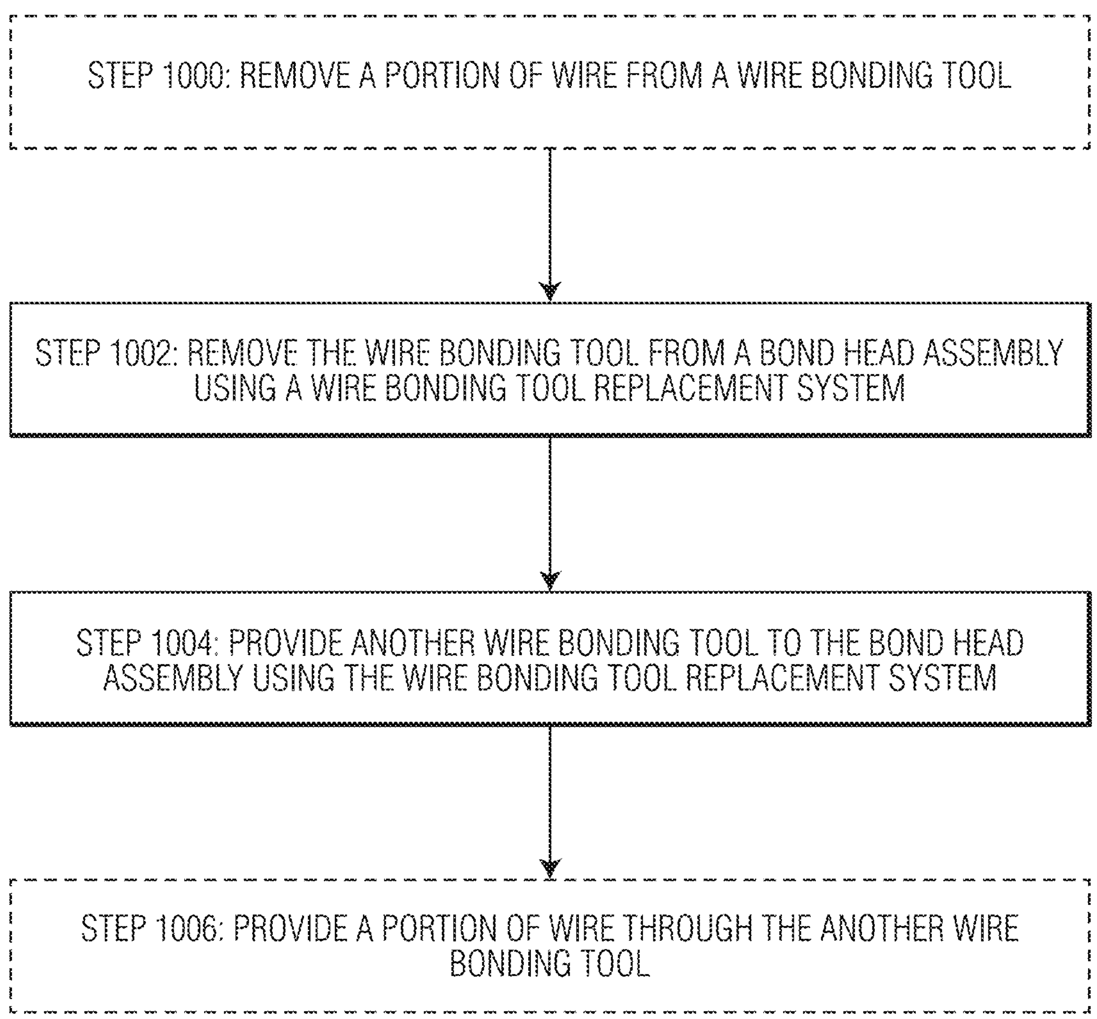
FIGS. 10 and 11 are flow diagrams illustrating various exemplary embodiments of the invention.
Figure 11:
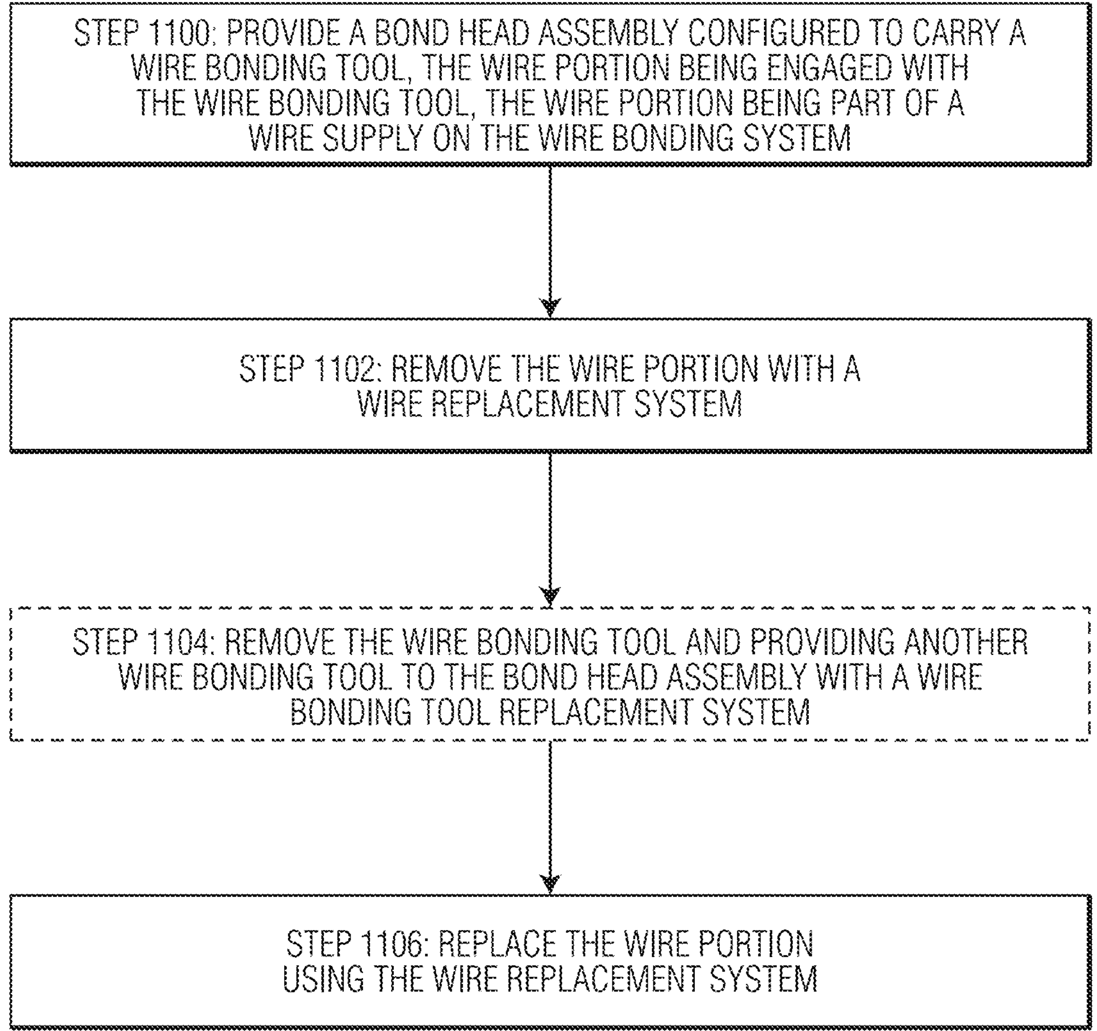

FIGS. 10 and 11 are flow diagrams illustrating exemplary embodiments and/or aspects of the invention. As is understood by those skilled in the art, certain steps included in the flow diagram may be omitted; certain additional steps may be added; and the order of the steps may be altered from the order illustrated-all within the scope of the invention.

Referring now to FIG. 10, a method of replacing a wire bonding tool using a wire bonding tool replacement system on a wire bonding system is illustrated. At optional Step 1000, a portion of wire is removed from a wire bonding tool (e.g., see wire removal process of wire portion 108*a* from wire bonding tool 110 illustrated in FIGS. 5B-5F and in FIGS. 7A-7F). At Step 1002, the wire bonding tool is removed from a bond head assembly using a wire bonding tool replacement system (e.g., see wire bonding tool removal process illustrated in FIGS. 1A-1D and 3A-3D). At Step 1004, another wire bonding tool is provided to the bond head assembly using the wire bonding tool replacement system (e.g., see FIGS. 3E-3H). At optional Step 1006, a portion of wire is provided through the other wire bonding tool (e.g., see FIGS. 5F-5H and FIG. 6E).

Referring now to FIG. 11, a method of replacing a wire portion on a wire bonding system is illustrated. At Step 1100, a bond head assembly configured to carry a wire bonding tool is provided (e.g., see bond head assembly 102 of FIG. 4B). The wire portion is engaged with the wire bonding tool. The wire portion is part of a wire supply on the wire bonding system. At Step 1102, the wire portion is removed with a wire replacement system (e.g., see wire removal process of wire portion 108*a* from wire bonding tool 110 illustrated in FIGS. 5B-5F and wire removal process of 7A-7F). At optional Step 1104, the wire bonding tool is removed and another wire bonding tool is provided to the bond head assembly with a wire bonding tool replacement system (e.g., see FIGS. 1A-1F). At Step 1106, the wire portion is replaced (e.g., with the removed wire portion, or with another wire portion) using the wire replacement system (e.g., see FIGS. 5F-5H and FIG. 6E).

Although aspects of the invention is illustrated and described herein with reference to creating a partial cut in the wire supply, the invention is not limited thereto. It is contemplated that a cutting portion/clamping portion of a wire bonding tool replacement system or a wire replacement system could be used to fully cut a wire during a wire replacement process.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A wire bonding system comprising:

a bond head assembly including a wire clamp, the bond head assembly being configured to carry a wire bonding tool, the wire clamp configured to switch between (i) allowing a wire supply to pass freely, and (ii) gripping the wire supply to prevent relative motion between the wire supply and the bond head assembly, the wire supply including a portion engaged with the wire bonding tool; and a wire replacement system including a clamping mechanism, the clamping mechanism configured to (i) the wire supply with a threading portion in a closed position to prevent the wire supply from moving relative to the clamping mechanism and (ii) allow the wire supply to pass through the clamping mechanism in an open position, the wire replacement system further including a wire bonding tool source to provide a plurality of wire bonding tools, the clamping mechanism being configured to remove and replace the wire bonding tool at the bond head assembly with one of the plurality of wire bonding tools from the wire bonding tool source, the wire bonding tool source being configured to hold a top side of each of the plurality of wire bonding tools such that a portion of each of the plurality of wire bonding tools away from the top portion is accessible by the clamping mechanism.

2. The wire bonding system of claim 1 wherein the clamping mechanism operates in connection with movements relative to the bond head assembly, and opening and closing of the wire clamp, to (i) remove a wire portion from the wire bonding tool, and (ii) rethread the wire portion through the one of the plurality of wire bonding tools from the wire bonding tool source.

3. The wire bonding system of claim 1 wherein the clamping mechanism includes (i) a fixed clamp portion and (ii) a moving clamp portion disposed adjacent the fixed clamp portion, the moving clamp portion being configured to move with respect to the fixed clamp portion in at least one direction.

4. The wire bonding system of claim 2 wherein the wire replacement system is configured to rethread the wire portion by re-engaging the wire portion with the one of the plurality of wire bonding tools from the wire bonding tool source.

5. The wire bonding system of claim 1 wherein the clamping mechanism includes an image registration feature on a clamp arm of the clamping mechanism, the image registration feature being an eye point providing a reference for determining a position of the clamping mechanism.

6. The wire bonding system of claim 5 further comprising a vision system configured to determine the position of the clamping mechanism by collecting an image of the image registration feature.

7. The wire bonding system of claim 3 wherein the clamping mechanism includes a spring configured to actuate the moving clamp portion with respect to the fixed clamp portion.

8. The wire bonding system of claim 1 wherein the clamping mechanism is carried by a moveable arm assembly.

9. The wire bonding system of claim 1 wherein the clamping mechanism includes a tool clamping portion for clamping the wire bonding tool.

10. The wire bonding system of claim 1 further comprising a receptacle for receiving the wire bonding tool after it is removed by the wire replacement system.

11. The wire bonding system of claim 6 wherein an optical path between the vision system and the image registration feature includes a reflective optical element.

12. The wire bonding system of claim 1 wherein the wire replacement system is configured to be moved between a plurality of wire bonding systems.

13. The wire bonding system of claim 1 wherein the clamping mechanism is carried by a moveable arm assembly, wherein the moveable arm assembly is configured to move the clamping mechanism independent of the bond head assembly.

14. The wire bonding system of claim 10 wherein the receptacle is an empty slot of the wire bonding tool source, the clamping mechanism being configured to insert the wire bonding tool into the slot after it is removed by the wire replacement system.

15. The wire bonding system of claim 1 wherein the wire bonding tool source includes a wire bonding tool cartridge containing the plurality of wire bonding tools.

16. A wire bonding system comprising:

a bond head assembly including a wire clamp, the bond head assembly being configured to carry a wire bonding tool, the wire clamp configured to switch between (i) allowing a wire supply to pass freely, and (ii) gripping the wire supply to prevent relative motion between the wire supply and the bond head assembly, the wire supply including a portion engaged with the wire bonding tool;

a vision system; and a wire replacement system including a clamping mechanism, the clamping mechanism configured to (i) engage the wire supply with a threading portion in a closed potion to prevent the wire supply from moving relative to the clamping mechanism and (ii) allow the wire supply to pass through the clamping mechanism in an open position, the clamping mechanism including an image registration feature providing a reference for determining a position of the clamping mechanism, the image registration feature being an eye point, the vision system being configured to determine the position of the clamping mechanism by collecting an image of the image registration feature.

17. The wire bonding system of claim 16 wherein an optical path between the vision system and the image registration feature includes a reflective optical element.

18. The wire bonding system of claim 16 wherein an optical path between the vision system and the image registration feature includes a refractive optical element.

19. The wire bonding system of claim 16 wherein the clamping mechanism includes a prism provided in an imaging path between the vision system and the image registration feature, the prism configured to reflect an image of the image registration feature.

20. A wire bonding system comprising:

a bond head assembly configured to carry a wire bonding tool, the bond head assembly including a wire clamp configured to switch between (i) allowing a wire supply to pass freely, and (ii) gripping the wire supply to prevent relative motion between wire supply and the bond head assembly, the wire supply including a portion engaged with the wire bonding tool; and a wire replacement system including a clamping mechanism, the clamping mechanism configured to (a) engage the wire supply with a threading portion in a closed position to prevent the wire supply from moving relative to the clamping mechanism and (b) allow the wire supply to pass through the clamping mechanism in an open position, the clamping mechanism also being configured for clamping the wire bonding tool to remove the wire bonding tool from the bond head assembly, wherein the wire replacement system engages the wire supply while the bond head assembly, including the wire bonding tool and the wire clamp in an open position, moves downward such that the wire supply passes through the wire bonding tool until the wire supply is fully removed from the wire bonding tool, and further wherein the wire replacement system engages the wire supply while the clamping mechanism moves downward to rethread the wire supply through another wire bonding tool.

* * * * *